(12) United States Patent
Almeida et al.

(10) Patent No.: US 12,539,542 B2
(45) Date of Patent: *Feb. 3, 2026

(54) DISTORTION MITIGATION IN DIRECTED ENERGY DEPOSITION

(71) Applicant: NORSK TITANIUM AS, Hønefoss (NO)

(72) Inventors: Pedro Almeida, Asker (NO); Dale Grigorenko, Moorhead, MN (US); Steven Rondeau, Au Sable Forks, NY (US)

(73) Assignee: Norsk Titanium AS, Hønefoss (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/760,595

(22) Filed: Jul. 1, 2024

(65) Prior Publication Data

US 2025/0065404 A1     Feb. 27, 2025

Related U.S. Application Data

(63) Continuation of application No. 17/303,176, filed on May 21, 2021, now Pat. No. 12,048,965, which is a
(Continued)

(51) Int. Cl.
*B22F 10/25*     (2021.01)
*B22F 10/43*     (2021.01)
(Continued)

(52) U.S. Cl.
CPC ............ *B22F 10/25* (2021.01); *B22F 10/43* (2021.01); *B22F 10/47* (2021.01); *B23K 26/34* (2013.01);
(Continued)

(58) Field of Classification Search
CPC .......... B22F 10/25; B22F 10/47; B22F 10/43; B33Y 10/00; B33Y 30/00; B33Y 40/10; B23K 26/34
See application file for complete search history.

(56) References Cited

U.S. PATENT DOCUMENTS 4,090,697 A     5/1978  Perrine
4,321,310 A     3/1982  Ulion et al.
(Continued)

FOREIGN PATENT DOCUMENTS

CN      102762323 A     10/2012
CN      106662439 A     5/2017
(Continued)

OTHER PUBLICATIONS

Office Action for U.S. Appl. No. 16/952,559, mailed on Dec. 21, 2023, Pedro.
(Continued)

*Primary Examiner* — David H Banh
(74) *Attorney, Agent, or Firm* — Lee & Hayes, P.C.

(57) ABSTRACT

Provided are a mount system and systems and methods using the mount system for manufacturing objects, especially titanium and titanium alloy objects, by directed energy deposition. The methods include thermally pre-bending the substrate onto which the object is to be manufactured to form a pre-bent substrate, attaching the pre-bent substrate to a jig using the mount system as an underlying support, pre-heating the substrate, and forming the object on the pre-heated, pre-bent substrate using a directed energy deposition technique.

20 Claims, 39 Drawing Sheets

Related U.S. Application Data continuation of application No. PCT/EP2021/063608, filed on May 21, 2021, and a continuation-in-part of application No. 16/952,559, filed on Nov. 19, 2020, now Pat. No. 12,162,069.

(60) Provisional application No. 62/938,734, filed on Nov. 21, 2019.

(51) Int. Cl.
  *B22F 10/47* (2021.01)
  *B23K 26/34* (2014.01)
  *B33Y 10/00* (2015.01)
  *B33Y 30/00* (2015.01)
  *B33Y 40/10* (2020.01)

(52) U.S. Cl.
  CPC ............... *B33Y 10/00* (2014.12); *B33Y 30/00* (2014.12); *B33Y 40/10* (2020.01)

(56) References Cited

U.S. PATENT DOCUMENTS

| | | | |
|---|---|---|---|
| 5,304,519 | A | 4/1994 | Jackson et al. |
| 5,789,330 | A | 8/1998 | Kondo et al. |
| 5,874,175 | A | 2/1999 | Li |
| 6,387,539 | B1 | 5/2002 | Subramanian |
| 6,390,115 | B1 | 5/2002 | Rohwer et al. |
| 6,998,064 | B2 | 2/2006 | Gadow et al. |
| 7,381,364 | B2 | 6/2008 | Yamashita |
| 9,555,475 | B2 | 1/2017 | Sidhu et al. |
| 9,950,476 | B2 | 4/2018 | Nguyen et al. |
| 10,022,797 | B2 | 7/2018 | Abe et al. |
| 12,048,965 | B2 * | 7/2024 | Almeida ................ B22F 10/25 |
| 2004/0040653 | A1 | 3/2004 | Nuzzo et al. |
| 2006/0248718 | A1 | 11/2006 | Szela et al. |
| 2008/0190888 | A1 | 8/2008 | Heejoon et al. |
| 2010/0034983 | A1 | 2/2010 | Fuwa et al. |
| 2014/0367894 | A1 | 12/2014 | Kramer et al. |
| 2015/0209908 | A1 | 7/2015 | Peters et al. |
| 2015/0306665 | A1 | 10/2015 | Sidhu et al. |
| 2016/0108483 | A1 | 4/2016 | Meyer et al. |
| 2017/0173891 | A1 | 6/2017 | Bosveld et al. |
| 2017/0207193 | A1 | 7/2017 | Bower et al. |
| 2017/0326681 | A1 | 11/2017 | Sidhu et al. |
| 2017/0333990 | A1 | 11/2017 | Garry |
| 2018/0326670 | A1 | 11/2018 | Peters |
| 2019/0001437 | A1 | 1/2019 | Mathisen et al. |
| 2019/0061061 | A1 | 2/2019 | Fischer et al. |
| 2019/0283161 | A1 | 9/2019 | Yun et al. |
| 2021/0022470 | A1 | 1/2021 | Chu |
| 2021/0154732 | A1 | 5/2021 | Almeida |
| 2021/0276096 | A1 | 9/2021 | Almeida |
| 2025/0187075 | A1 | 6/2025 | Almeida |

FOREIGN PATENT DOCUMENTS

| | | |
|---|---|---|
| CN | 108393628 A | 8/2018 |
| CN | 112536542 A | 3/2021 |
| GB | 2491472 A | 12/2012 |
| GB | 2550855 A | 12/2017 |
| JP | S5542129 A | 3/1980 |
| JP | 2017144446 A | 8/2017 |
| KR | 20180124542 A | 11/2018 |
| WO | WO2016102876 A1 | 6/2016 |
| WO | WO2018153656 A1 | 8/2018 |
| WO | WO2020128169 A1 | 6/2020 |

OTHER PUBLICATIONS

Office Action for Chinese Application No. 2020800810905, Dated May 27, 2024, 9 pages.
PCT International Preliminary Report on Patentability mailed Aug. 18, 2023 for PCT Application No. PCT/US22/14879, 22 pages.
Office Action for U.S. Appl. 17/303,176, mailed on Jun. 21, 2023, Almeida, "Distortion Mitigation in Directed Energy Deposition", 10 Pages.
Office Action for U.S. Appl. No. 16/952,559, mailed on Mar. 3, 2023, Almeida, "Distortion Mitigation in Directed Energy Deposition", 6 pages.
International Preliminary Report on Patentability for PCT Application No. PCT/EP20/82678, mailed Jun. 2, 2022, 10 pages.
PCT Search Report and Written Opinion mailed Feb. 2, 2021 for PCT application No. PCT/EP20/82678, 16 pages.
PCT Search Report and Written Opinion mailed Apr. 11, 2023 for PCT Application No. PCT/EP2021/063608, 47 pages.
International Search Report and Written Opinion for PCT Application No. PCT/EP2021/063608, mailed Mar. 24, 2022.
Office Action for Chinese Application No. 2020800810905, Dated May 22, 2025, 16 pages.
Office Action for Chinese Application No. 2020800810905, Dated Dec. 16, 2024, 14 pages.
Office Action for Japanese Application No. 2022-529819, Dated Jan. 28, 2025, 6 pages.
Examination Report for Singapore Application No. 11202205318Q, Dated Jan. 14, 2025, 8 pages.
Office Action for Japanese Application No. 2022-529819, Dated Sep. 9, 2025, 6 pages.
Search Report for Singapore Application No. 11202308556V, dated Oct. 10, 2025, 6 pages.

* cited by examiner

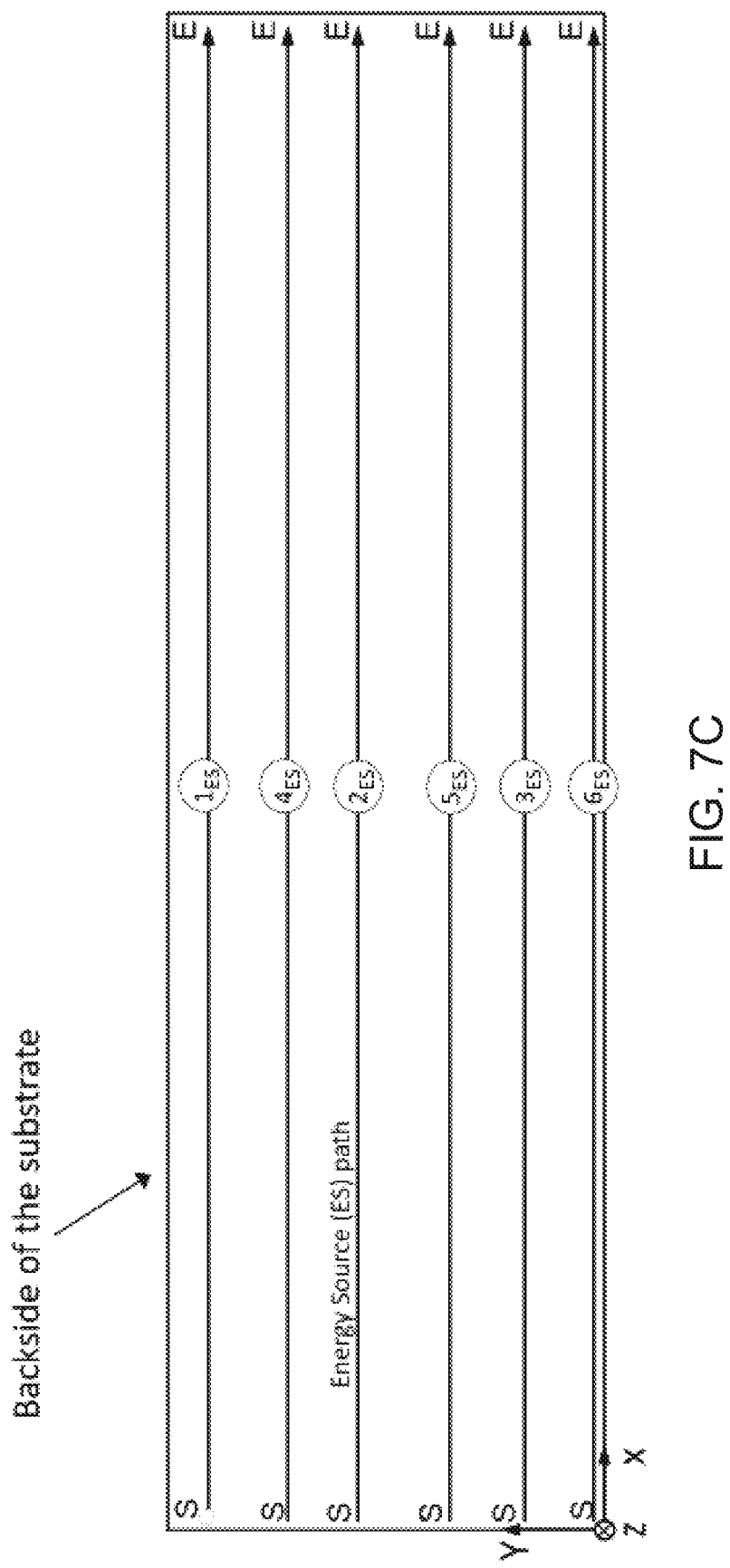

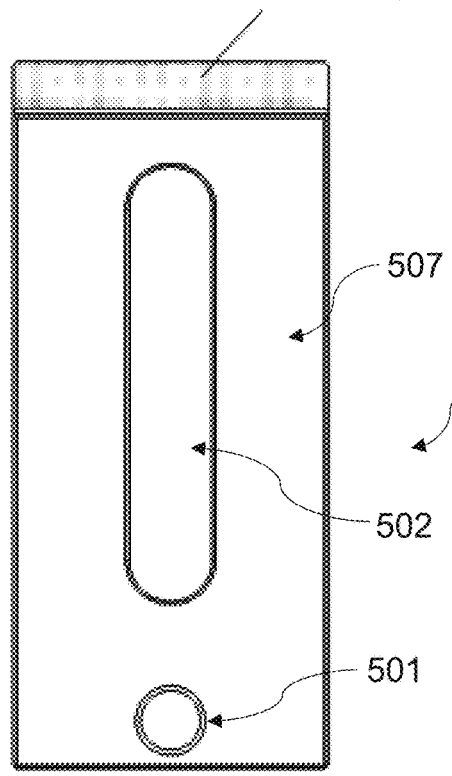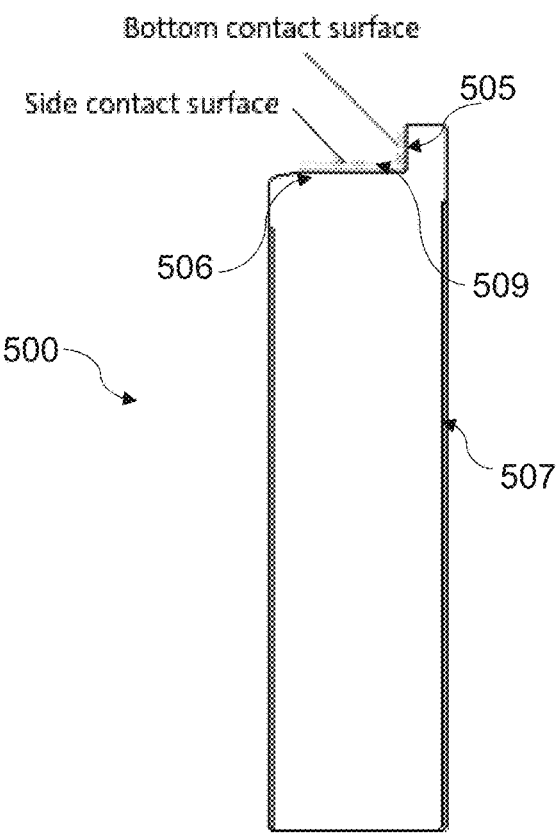
FIG. 9A
FIG. 9B
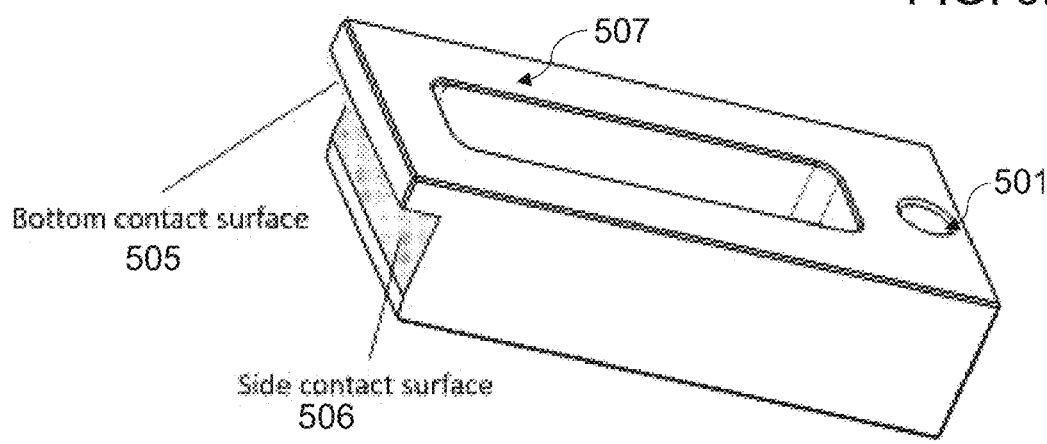
FIG. 9C

DISTORTION MITIGATION IN DIRECTED ENERGY DEPOSITION

CROSS-REFERENCE TO RELATED APPLICATIONS

This application is a continuation of U.S. application Ser. No. 17/303,176, filed May 21, 2021, which is a continuation-in-part of application Ser. No. 16/952,559, filed Nov. 19, 2020, which claims the benefit of U.S. Provisional Patent Application No. 62/938,734, filed Nov. 21, 2019. U.S. application Ser. No. 17/303,176 also is a continuation of International Application No. PCT/EP2021/063608, filed May 21, 2021. The entire contents of each of the foregoing applications hereby are incorporated herein by reference in their entirety.

FIELD OF THE INVENTION

The present invention relates to a device and method for mitigating distortion in metal objects manufactured using a directed energy deposition additive manufacturing process, also known as solid freeform fabrication, especially in titanium and titanium alloy objects.

RELATED ART

Structural metal parts, such as those made of titanium or titanium alloys, are made by conventional manufacturing methods such as casting, forging or machining from a solid billet. These techniques have a disadvantage of high material waste of the expensive titanium metal that often is machined away, and large lead times associated with the fabrication of the metal part.

Fully dense physical objects can be made by a manufacturing technology known as Directed Energy Deposition (DED), rapid prototyping, rapid manufacturing, layered manufacturing, additive layer manufacturing, shaped metal deposition or additive manufacturing. DED of metals is an additive manufacturing process in which focused thermal energy is used to fuse materials by melting as they are being deposited. Additive manufacturing offers great fabrication freedom and potential cost-savings due to the layered build-up of near-net-shape products. Also it is desirable to match the material properties of conventional bulk forming processes such as forging while utilizing the same established metal alloys. DED is used for repair, rapid prototyping and low/high volume part fabrication.

DED systems include multiple categories of machines using one or a combination of DED energy sources, such as laser beam (LB), electron beam (EB), or arc-based energy sources such as plasma arc (PA), gas tungsten arc (GTA) and gas metal arc (GMA). The metal feedstock used in DED systems typically includes metal in the form of a powder and/or wire. DED typically is performed under an inert gas (e.g., DED using arc-based or LB systems) or in a vacuum (EB systems) atmospheres. Although these are the predominant methods employed in practice, the use of other energy sources, feedstocks and atmospheres can be used in any combination.

Residual stresses can be defined as self-equilibrating stresses which exist in an elastic body even in absence of external loads, such as thermal and/or mechanical. Owing to localized heat and cooling cycling, as the thermal source melts a metal material and deposits each new metal layer and re-melts previously solidified metal layers, large amounts of welding-induced residual stress can arise and accumulate during DED of metal preforms. The incompatible elastic and/or plastic strain field involved in DED of metals, caused by non-uniform thermal loading near the processing region, leads to an inevitable build-up of complex thermally induced residual stresses and distortion during layer upon layer fabrication. Thermal expansion and contraction can occur as a result of transient thermal excursions and steep thermal gradients that can be present during DED. The formation and relaxation of residual stresses during DED of metals can cause unwanted plastic deformation in areas bordering the processing zone, which can carry over to the as-deposited preform. The residual stress locked in the as-deposited DED preform can lead to permanent loss of tolerance in the workpiece, because the workpiece self-equilibrates the residual stress field that still exists in the structure when released from the clamping fixture platform or jig. Residual stress-induced deformation is of greater concern for larger components, since larger temperature differentials coexist along the DED build up process. Adverse distributions of residual stress in engineered components also can lead to unexpected or premature failure, i.e. in areas of high tensile stresses prone to fracture and fatigue. Stress relieve heat treatment is commonly used to relieve stresses that remain locked in the as-deposited preform due to the DED manufacturing sequence. Tolerance loss remains however one of the primary concerns in most DED processes.

Residual stress during DED of metals typically results from the fact that different areas of a component being manufactured experience different cycles of thermal expansion and contraction. The resulting thermal stress can cause a non-uniform distribution of irreversible material deformation, and some of this deformation can remain after the material has cooled, resulting in an internal and completely self-equilibrating stress field in the workpiece. This self-equilibration can result in metal structures that are geometrically out of tolerance due to distortion or warping. All forms of DED processing involve a large amount of localized heat delivery to the top of the new deposited layer (exposed to the thermal source), the interface between the newly deposited and the previous layer, and/or the substrate for achieving appropriately fused interfaces.

Typically, a thermal source with high heat concentration is used in a DED manufacturing process to generate rapid heating. The heat generated can cause thermal dilation of material, accompanied by a gradual decrease in yield strength. The heat generated by the thermal source is utilized to melt the powder and/or wire feedstock and to create a weld pool in a portion of the workpiece. This locally applied energy causes the welding area to heat up sharply relative to the surrounding area which remains at relatively low temperature throughout, causing it to fuse locally. Because molten material will not support a load, stress underneath the thermal source is close to zero. At a short distance from the area of energy application, i.e. material in the immediate vicinity of the melt pool and in underlying build layers, the material expands as a result of being heated, but is restricted by the adjacent and underlying colder material, inducing elastic compressive strains. As a consequence, stresses in adjacent areas from the thermal source are compressive. Since the temperatures in adjacent areas of the thermal source are high and the material's yield strength low, stresses in these areas can be as high as the yield strength of the material at corresponding temperatures. As the thermal energy source travels away from the area of energy application, the heated molten material cools and contracts as a solid, but the contracting metal is mechanically inhibited by the adjacent and underlying layers of material. Upon continued cooling, residual stresses within the object are distributed, typically exhibiting large tensile stresses at the top layer, where the material was prevented from contracting, and balancing compressive stresses below. In some applications, the tensile stress developing at the top layer can approach the magnitude of the yield strength of the material. For the balancing compressive forces, if the distortion and compressive loads they include exceed the critical buckling load, buckling of the metal structural members can occur.

Due to the layer-by-layer nature of DED processes, the differences in heating and cooling loads imposed by each successive layer will cause a spatial competition between material expansion and contraction, ultimately resulting in the accumulation of residual stress in the object being produced. Because hot layers of molten metal are deposited on the previous cooler layer of the object being built, there can be a large thermal gradient and significant contraction locally as the heat from the thermal source travels across the workpiece, introducing residual stresses into the workpiece caused by incompatible strain fields. The longitudinal and transverse shrinkage that occurs during solidification of layer upon layer can amplify the buildup of residual stresses within the as-deposited preform. The stresses can be a function of tensile modulus of the material, the coefficient of thermal expansion, and percent shrinkage upon cooling. If the stresses resulting from these incompatible strains remain in the finished object and are not relieved, the residual stresses can combine and react to produce internal forces that cause unwanted distortion of the object, such as bending, buckling and rotation of the object. The residual stresses that can be formed during conventional additive manufacturing processes are sometimes large enough to cause significant distortion, mismatch, tearing or formation of stress-induced cracks in the additively manufactured object (see FIGS. 1A-1H).

Methods are known in the art for measuring, or modelling to predict, stress induction in a formed product (e.g., see U.S. Pat. No. 9,555,475 (Sidhu et al. (2017); U.S. Pat. No. 9,950,476 (Nguyen et al. (2018)). Prior techniques developed to address these shortcomings have met with limited success. For example, post-weld high pressure mechanical rolling for plastically deforming consolidated material before formation of a subsequent layer has been used (see, e.g., Colegrove et al., UK Patent Application GB2491472 (2012). Peening processes, such as those taught in and U.S. Pat. App. Pub. Nos. US2017/0326681 (Sidhu et al. (2015)) are taught to be useful in mitigating distortion for each metal layer deposited during the building of additive layer manufactured parts. In these processes one or more impact treatment devices are used to peen or strike a common point on the workpiece to plastically deform at least a part of a deposited layer after it has cooled. Each impact treatment device may strike the workpiece one or more times, and can strike at a frequency of up to 20 Hz. Laser peening also has been used to impart residual compressive stress into a workpiece (see U.S. Pat. App. Pub. No. US2014/0367894 Kramer et al. (2014)). These methods are not suitable for complex shaped pieces to relieve residual stress in areas that cannot be accessed by the peening or rolling tools. They also can increase the time and complexity for manufacturing a workpiece, and thus can be overly costly or impractical to utilize.

These methods also can increase waiting times between layers, which can negatively affect productivity and potentially limit fabrication freedom. Excessive cooling between layer deposition also can increase the temperature differential between layers and further exacerbate residual stress development. For the methods that physically work the deposited layer, contaminations from tooling also will be a concern since any contaminations can get enclosed between layers of the final product in an additive process.

Accordingly, there exists a need in this art for an economical method of performing direct metal deposition at a rate of metal deposition in an additive manufacturing system that yields metal products having reduced or minimized residual stress, or distortion, or both, than is achieved in traditional additive manufacturing processes. It would be desirable to provide DED processes that reduce the incidence of residual stresses or cracking in the DED manufactured object. It also would be desirable to provide DED processes that reduce the incidence of local distortion of the object being manufactured as additional metal layers are deposited.

SUMMARY OF THE INVENTION

Accordingly, embodiments provided herein are directed to production of workpieces having reduced or minimized residual stress, or distortion, or both using additive manufacturing processes that substantially obviates one or more of the problems due to limitations and disadvantages of the related art. As embodied and broadly described, provided are devices, systems and methods to reduce or minimize residual stress or distortion or both during metal additive manufacturing to achieve products with improved material quality. DED manufactured products having these reductions in residual stress or distortion demonstrate increased strength, fatigue resistance, and durability. In examples, the devices, system and methods provided can increase throughput and yield of DED formed products, and yield workpieces within specified tolerances.

In examples, provided herein is a method and system that may mitigate undesired heat transfer without imparting substantial or any defects onto a workpiece. In examples, a method and system as described may be configured to control the substrate contact interface of a structure underlying a substrate during DED manufacturing to reduce heat transfer from a substrate to the welding jig or other underlying structure. In examples, decreased heat transfer may be achieved by providing a reduced surface area through which heat energy may transfer, increased solid/gas/solid thermal insulation boundary between a substrate and an underlying structure, or a combination of both. In examples, the method and system as described may avoid or minimize any undesirable defects onto a workpiece.

In examples, the methods and system provided herein may also improve DED manufacturing by promoting an atmosphere with a reduced content of oxidizing agents and pollutant particles. In examples, the methods and system as provided herein may reduce or eliminating the need for ceramic sheets, plates, or pylons as part of the support. In examples, the thermal insulation a ceramic sheet, plate, or pylon is able to provide may be achieved by increasing the presence of solid/gas/solid interface that may take advantage of the low thermal conductivity of the inert atmosphere used during DED manufacturing. In examples, by eliminating the use of ceramic sheets, plates, or pylons as support it may be possible to reduce the amount of moisture in the DED manufacturing atmosphere. In examples, by eliminating the use of ceramic sheets, plates, or pylons it may be possible to avoid introducing unwanted ceramic particulates into the DED manufacturing atmosphere.

In examples, the methods and system provided herein may also provide a resilient, durable system that may provide repeatable and predictable manufacturing uniformity.

In examples, the methods provided herein can be used to fabricate DED formed components of a medium to large size (e.g., up to 3 m), which cannot easily be produced using conventional additive manufacturing processes. In addition, because of the reduction or elimination of the typical large amounts of residual stress, distortion or a combination thereof in conventional DED metal structure, manufactured metal structures can be produced that are geometrically within tolerances and specifications.

Because residual stress and distortion often can be seen as key barriers for mainstream acceptance of DED technologies for metals, particularly in safety-critical applications, the devices, systems and methods provided herein that can minimize residual stress or distortion can open new markets or engender wider acceptance of DED produced components. Devices, systems and methods provided herein also can result in effective control over residual stress and distortion in DED metal structures so that material utilization efficiencies of both substrate and DED material can be improved. These improvements in material utilization, in conjunction with production of DED produced products within tolerances, can result in less waste and reworking, which can significantly reduce DED manufacturing costs.

In examples, provided are methods for DED manufacturing that include pre-bending a metallic substrate to form a plastically pre-bent substrate prior to DED of single-sided metallic structures. Also provided are methods for DED manufacturing that include pre-bending a metallic substrate to form a plastically pre-bent substrate and pre-heating the pre-bent substrate prior to DED of metallic structures. Also provided is an apparatus for manufacturing components having reduced residual stress and distortion by DED. The apparatus can be used with conventional DED energy supply sources used to melt a metal powder and/or wire feedstock. The apparatus may include a mount system as an underlying support structure for a plastically pre-bent substrate. Also provided are systems using conventional DED energy supply sources modified using CAD-CAM program instructions that when executed cause the DED process to follow the shape of the underlying mount system.

Provided are methods for DED manufacturing that minimize or prevent distortion in a DED manufactured product. This can increase the efficiency of the manufacturing process, such as by minimizing waste of substrate and the amount of deposited material that must be used. In particular, because the highest thermally induced stress fields can be introduced in the first deposited layers, and the distortion effect can particularly be seen in the substrate, methods provided herein can conserve substrate material sacrificed or lost in conventional additive manufacturing processes. The methods can result in improved material utilization efficiencies of both substrate and DED material compared to conventional methods. Methods provided herein can provide effective control over residual stress and distortion in DED structures. This can lead to reducing material waste, buy-to-fly or BTF ratios can be driven close to unity. Reducing material waste, as well as reducing or eliminating rework time, can significantly reduce cost of manufacture.

Provided is a mount system that may include a first side configured to interface with a welding jig. The mount system may include a second side defining a curved profile and configured to interface with a substrate. The second side may include a substrate interface area sized to accommodate a surface of the substrate with which the second side is configured to interface. The second side may also include a substrate contact area over which the mount system is configured to physically contact the substrate when the second side interfaces with the substrate. The mount system may have a substrate contact interface defined as the ratio of substrate contact area to the substrate interface area. The substrate contact interface may be defined in terms of a percent of the substrate interface area occupied or comprised by the substrate contact area. In examples, the substrate contact area may include or be equal to 0.1 to 20 percent of the substrate interface area.

In examples, the percent of the substrate interface area comprised by the substrate contact area may be equal to or greater than 0.1, 0.2, 0.3, 0.4, 0.5, 0.6, 0.7, 0.8, 0.9, or 1, and equal to or less than 1, 2, 3, 4, 5, 6, 7, 8, 9, 10, 11, 12, 13, 14, 15, 16, 17, 18, 19, or 20. In examples, the second side is configured so that the percent of the substrate interface area comprised by the substrate contact area may be in the range of 0.1 and 15, 0.1 and 10, 0.1 and 5, or 0.1 and 1. In examples, the second side is configured so that the percent of the substrate interface area comprised by the substrate contact area may be in the range of 0.1 and 15, 0.1 and 10, 0.1 and 5, or 0.1 and 1. In examples, the second side is configured so that the percent of the substrate interface area comprised by the substrate contact area may be in the range of 0.2 and 20, 0.2 and 15, 0.2 and 10, 0.2 and 5, or 0.2 and 1. In examples, the second side is configured so that the percent of the substrate interface area comprised by the substrate contact area may be in the range of 0.3 and 20, 0.3 and 15, 0.3 and 10, 0.3 and 5, or 0.3 and 1. In examples, the second side is configured so that the percent of the substrate interface area comprised by the substrate contact area may be in the range of 0.4 and 20, 0.4 and 15, 0.4 and 10, 0.4 and 5, or 0.4 and 1. In examples, the second side is configured so that the percent of the substrate interface area comprised by the substrate contact area may be in the range of 0.5 and 20, 0.5 and 15, 0.5 and 10, 0.5 and 5, or 0.5 and 1. In examples, the second side is configured so that the percent of the substrate interface area comprised by the substrate contact area may be in the range of 0.6 and 20, 0.6 and 15, 0.6 and 10, 0.6 and 5, or 0.6 and 1. In examples, the second side is configured so that the percent of the substrate interface area comprised by the substrate contact area may be in the range of 0.7 and 20, 0.7 and 15, 0.7 and 10, 0.7 and 5, or 0.7 and 1. In examples, the second side is configured so that the percent of the substrate interface area comprised by the substrate contact area may be in the range of 0.8 and 20, 0.8 and 15, 0.8 and 10, 0.8 and 5, or 0.8 and 1. In examples, the second side is configured so that the percent of the substrate interface area comprised by the substrate contact area may be in the range of 0.9 and 20, 0.9 and 15, 0.9 and 10, 0.9 and 5, or 0.9 and 1.

The mount system can include or be made out of a non-magnetic metal. The mount system can include or be made out of a metal having a melting point of 1350° C. or greater. The mount system can include or be made out of a metal that is or includes an austenitic stainless steel. The austenitic stainless steel can include carbon, chromium, copper, manganese, molybdenum, nickel, nitrogen, phosphorus, silicon or a combination of any two or more thereof. The austenitic stainless steel can include at least 18% chromium. The austenitic stainless steel can be a 300 series stainless steel. The austenitic stainless steel can include a 304 stainless steel, a 309 stainless steel, a 310 stainless steel, a 316 stainless steel, a 318 stainless steel, a 321 stainless steel or a 330 stainless steel or a combination thereof.

The ceramic coating of the mount system can be applied to any one or more surfaces. The ceramic coating can include zirconium dioxide, zirconium dioxide stabilized by addition of yttrium oxide, yttrium aluminium oxide, alkaline earth metal silicates, $ZrV_2O_7$, $Mg_3(VO_4)_2$ or a combination thereof. The mount system can include a nominal curved profile deflection of from about 3 mm to about 35 mm. The mount system can include a bond coat onto which the ceramic coating is applied.

In examples, the mount system may be reconfigurable. In examples, the curved profile may be defined by one or more pins. In examples, the mount system may include at least a first pin of the one or more pins arranged to have a first substrate support height, and at least a second pin of the one or more pins arranged to have a second substrate support height, wherein the first substrate support height is different from the second substrate support height.

In examples, the curved profile may be defined by a lattice support structure. In examples, the curved profile may be defined by a curved clamping mold. Also provided is a pin support system having one or more pins in a reconfigurable arrangement on a welding jig, wherein the one or more pins are arranged to have varying substrate support heights and define a curved profile.

In examples, at least one of the one or more pins includes a pin head portion comprising a substrate contact area, a collar portion, and a base portion configured to engage the welding jig. In examples, the pin head portion may include a flat portion on at least a portion of a lateral profile. In examples, the pin head portion may include a welding jig interface area. In examples, the one or more pins comprise an austenitic stainless steel.

Also provided is a directed energy deposition method for producing a metal workpiece. The method can include pre-bending a substrate of a metal material with thermal energy by forming a plurality of melting tracks on a first surface of the substrate using a first melting tool to produce a pre-bent substrate; using the mount system or pin support system described herein as an underlying support structure to support the pre-bent substrate when it is secured to a jig, and securing the pre-bent substrate and the mount system or pin support system supporting the pre-bent substrate to the jig using a plurality of clamps. After the pre-bent substrate and the mount system or pin support system are secured to the jig, the method includes forming the metal workpiece on a second surface of the substrate by an additive manufacturing process that can a) deposit a layer of molten metal on the second surface of the substrate to form a base material and deposits subsequent layers of molten metal on the base material to form the workpiece; or b) deposit a layer of metal powder and melts the metal powder on the second surface of the substrate to form a base material, and deposits subsequent layers of metal powder and melts the powder on the base material to form the workpiece, where the second surface of the substrate is opposite the first surface of the substrate. The method can include pre-heating the pre-bent substrate while secured to the jig to a temperature of about 400° C. to about 900° C. by applying thermal energy to the second side of the substrate. The pre-bending the substrate can include inducing thermal gradients in the substrate. In the methods, a melting tool that includes a thermal source selected from among a laser beam, an electron beam, a plasma arc, a gas tungsten arc, a gas metal arc and any combination thereof can be used. During the pre-bending the first surface of the substrate, an area of application of thermal energy can reach a temperature that is a melting point of the metal material, or a temperature from about 5° C. to about 50° C. less than or greater than the melting point of the metal material. During the pre-bending of the first surface of the substrate, formation of the melting tracks can result in formation of tensile stress at a centerline of each of the melting tracks and formation of a compressive stress in an area away from the centerline of each of melting tracks upon cooling of the substrate. The tensile stress at the centerline of the melting track can be within about 10% of a yield strength of the substrate. The tensile stress at the centerline of the melting track can exceeds the magnitude of a yield strength of the substrate.

The pre-bending step can include directing a cooling gas toward the melting tracks using a gas jet device to accelerate cooling of the melting track. Directing the cooling gas toward the melting tracks can form a thermal gradient in the substrate, and can impart a residual stress in the substrate upon cooling. The gas jet device can direct the cooling gas toward of the melting tracks at a rate from about 50 L/min to about 500 L/min. The cooling gas can be applied in a constant stream, or applied intermittently, or applied in a pulsed flow. The cooling gas can include an inert gas selected from among argon, helium, neon, xenon, krypton and combinations thereof. The cooling gas can be applied at a temperature 100° C. or less. The cooling gas can be applied at a temperature of 25° C. or less. The gas jet device can produce a turbulent flow of the cooling gas, a laminar flow of the cooling gas, or a combination of a turbulent flow and laminar flow of the cooling gas. The gas jet device can include a plurality of nozzles, and the nozzles can direct the cooling gas in a direction away from the thermal source of the melting tool, and at least one nozzle can direct the cooling gas to an as-solidified metal of the melting track.

In the methods provided herein, the melting tracks can be produced equidistant from each other. The distance between the melting tracks can be from about 10 mm to about 60 mm. The method can include determining a centerline of each wall of a preform that is to be formed on the second surface of the substrate; and positioning the melting tracks on the first surface of the substrate from about 10 mm to about 20 mm away from the centerlines of the majority of walls of the preform or workpiece to be formed on the second surface of the substrate. A majority of the melting lines can be formed on the first surface at one or more locations other than those corresponding to one or more areas occupied by of one or more walls of the workpiece to be formed on the second side of the substrate.

In the methods, the pre-bending can form a pre-bent substrate having a uniform elasto-plastic bend. The pre-bending of the substrate can be performed while the substrate is clamped to a jig and thermally insulated from the jig. The substrate can be clamped to the jig using a plurality of clamps, where one or more of the clamps can include an insulating coating on each surface that comes into contact with the pre-bent substrate. The insulating coating can include a ceramic material, a silicon carbide, a silicon nitride, a boron carbide or a combination thereof. The ceramic material can include an alumina, a zirconia, titanium oxide, an alkaline earth metal silicate, an aluminium titanate, a zirconium dioxide, a zirconium dioxide stabilized by addition of yttrium oxide, an yttrium aluminium oxide, $ZrV_2O_7$, $Mg_3(VO_4)_2$ or a combination thereof. The thickness of the insulating coating can be from 0.1 mm to 5 mm. The clamps can include a knurling pattern or corrugation on a surface in contact with the pre-bent substrate. The clamps can be tightened to bring the pre-bent substrate to conform to a curved profile defined by the mount system or the pin support system. Each of the clamps can be tightened to a torque of from about 10 N·m to about 100 N·m. The clamps can be positioned so that the clamps meet at a start or an end of a wall of the workpiece being produced.

In the methods provided herein, the pre-heating of the pre-bent substrate can be done using one or more melting tools including a DED thermal source under conditions that a) form melting tracks but do not melt the surface of the pre-bent substrate; or b) form melting tracks and melt the surface of the pre-bent substrate at the melting tracks. Positioning of the melting tool can be at a standoff position greater than a standoff position used for forming the workpiece.

The methods can include pre-heating the pre-bent substrate, which includes a first short edge and an opposite second short edge, and a first long edge and an opposite second long edge, by a) positioning a melting tool comprising a DED thermal source at the first short edge and within about 10 mm to about 60 mm of the first long edge of the pre-bent substrate secured to the jig; b) applying the thermal energy form the DED thermal source of the melting tool across the surface of the pre-bent substrate starting at the first short edge and across the surface to the second opposite short edge to form a first line of energy application to the surface; c) repositioning the DED thermal source of the melting tool to the first short edge and displaced a distance of about 10 mm to about 60 mm from the first line of energy application and toward the second long edge; and d) repeating steps b) and c) until lines of energy application are applied across the surface of the pre-bent substrate to a position from about 10 mm to about 60 mm from the second opposite long edge. The pre-heating can raise the temperature of the pre-bent substrate to a temperature of about 350° C. to about 650° C.

The forming of the metal workpiece can include providing a metallic material in the form of a wire; using a single melting tool to heat and melt the metallic material such that molten metallic material is deposited onto an area of the substrate to form a base material; moving the base material relative to a position of the melting tool in a predetermined pattern such that the successive deposits of molten metallic material onto the base material solidifies and forms the three-dimensional object.

The forming of the metal workpiece can include a) providing a metallic material in the form of a wire; b) using a first melting tool to heat at least a portion of a surface of the substrate to form a preheated area on the substrate; c) using a second melting tool to heat and melt the metallic material such that molten metallic material is deposited onto the preheated area to form a base material; d) moving the base material relative to a position of the first melting tool and second melting tool in a predetermined pattern; e) using the first melting tool to heat at least a portion of a surface of the base material to form a preheated area on the base material and depositing molten metallic material produced by the second melting tool melting the metallic material onto the preheated area on the base material; and f) repeating steps d) and e) such that the successive deposits of molten metallic material onto the preheated areas on the base material solidifies and forms the three-dimensional object.

The methods can include using a gas jet device to direct a cooling gas to impinge upon a surface of the as-solidified material adjacent to the liquid-solid boundary of the molten metallic material, or any combination thereof; and moving the base material relative to the position of the melting tool(s) and the gas jet device in a predetermined pattern such that the successive deposits of molten metallic material solidifies and forms the three-dimensional object. The first melting tool can include a PTA torch, a laser device, a coaxial powder feed nozzle laser system, an electron beam device, or any combination thereof, and the second melting tool can include a PTA torch, a laser device, a coaxial powder feed nozzle laser system, an electron beam device, or any combination thereof. The first melting tool can include a first PTA torch and the second melting tool can include a second PTA torch. The first melting tool can include laser device and the second melting tool can include a PTA torch. The first melting tool can include a PTA torch and the second melting tool can include a laser device. The first melting tool can include a coaxial powder feed nozzle laser system and the second melting tool can include a laser device. The first melting tool can include a coaxial powder feed nozzle laser system and the second melting tool can include a PTA torch. The first melting tool can include a PTA torch and the second melting tool can include an electron beam device. The first melting tool can include an electron beam device and the second melting tool can include a PTA torch. The first melting tool can include an electron beam device and the second melting tool can include a laser device. The first melting tool can include laser device and the second melting tool can include an electron beam device. When the second melting tool includes a PTA torch, the PTA torch can be electrically connected to a direct current power source such that an electrode of the PTA torch becomes the cathode and the metallic material can be a consumable electrode that becomes the anode.

In the methods provided herein, every step of the methods, including each of pre-bending the substrate, pre-heating the pre-bent substrate, and forming the metal workpiece, can be performed within a closed chamber containing an inert atmosphere. The inert atmosphere can include argon, neon, xenon, krypton, helium or a combination thereof.

Also provided is a system for directed energy deposition. The system can include a jig for securing a pre-bent substrate; a mount system or pin support system as described herein to be positioned between the jig and when the pre-bent substrate is secured to the jig; insulated clamps for securing the pre-bent substrate to the jig; one or more melting tools comprising a DED thermal source to melt a source of metal into metallic molten material that is deposited on a surface of a base material; a gas jet device to direct a cooling gas to impinge upon the as-solidified material adjacent to the liquid-solid boundary of the liquid molten pool, or any combination thereof; a supply of the cooling gas; and an actuator for positioning and moving the base material relative to the melting tool and the gas jet device.

Additional features and advantages of the embodiments described herein will be set forth in the description which follows, and in part will be apparent from the description, or may be learned by practice of the invention. The objectives and other advantages of the exemplary embodiments will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 7C illustrates an exemplary heating path that can be used to move a DED energy source to create melting tracks on the top surface of a backside or first side of a substrate in order to pre-bend the substrate towards the thermal source.

FIG. 9A illustrates a bottom view, FIG. 9B illustrates a side view, and FIG. 9C illustrates a skewed overhead three-dimensional view of an exemplary insulated high-strength steel clamp. The figures depict exemplary surfaces that can be coated with a ceramic coating to minimize heat flow by conduction between the insulated high-strength steel clamp and the pre-bent substrate when the clamp is used to attach the plastically pre-bent substrate and the jig.

DETAILED DESCRIPTION OF THE ILLUSTRATED EMBODIMENTS

Figure 1A:
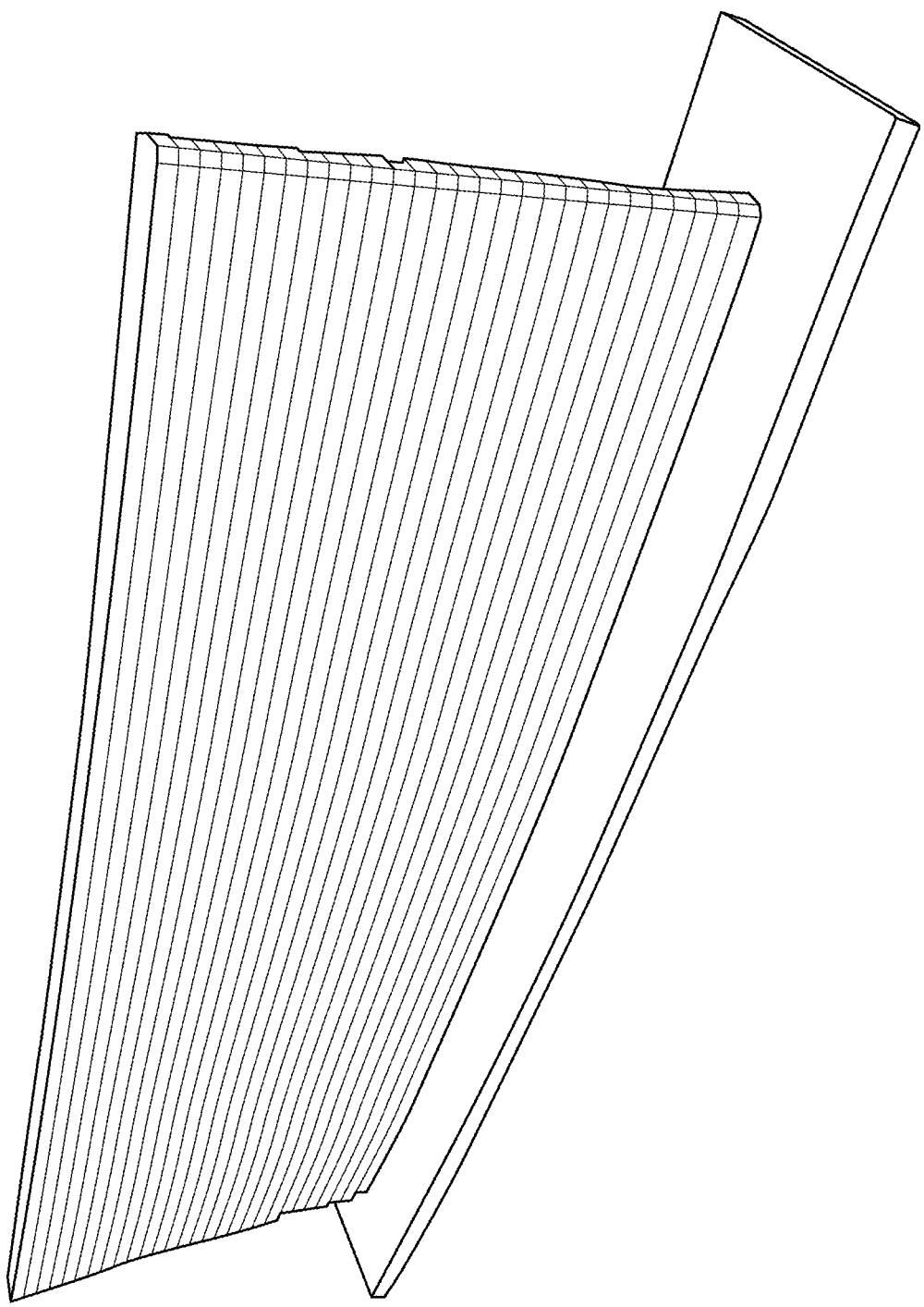
FIG. 1A is a photograph of a workpiece produced using conventional DED additive manufacturing without stress mitigation.
Figure 1C:
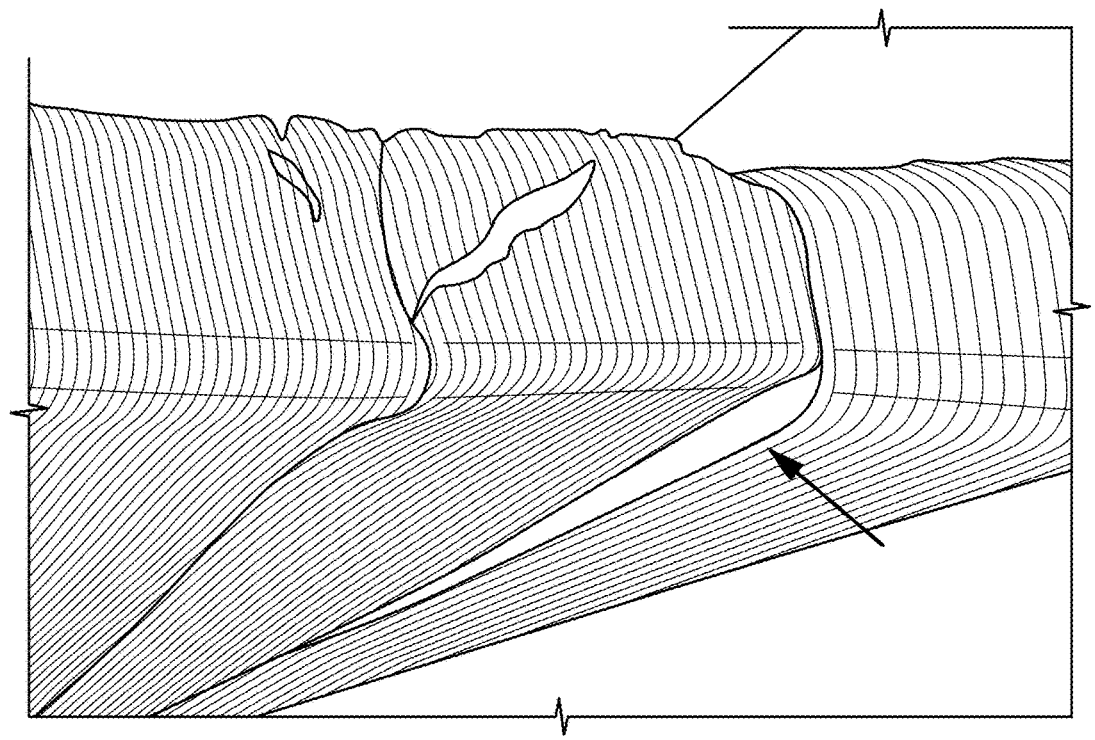
FIGS. 1B and 1C shows mismatch (the arrows point to the mismatched positions).
Figure 1B:
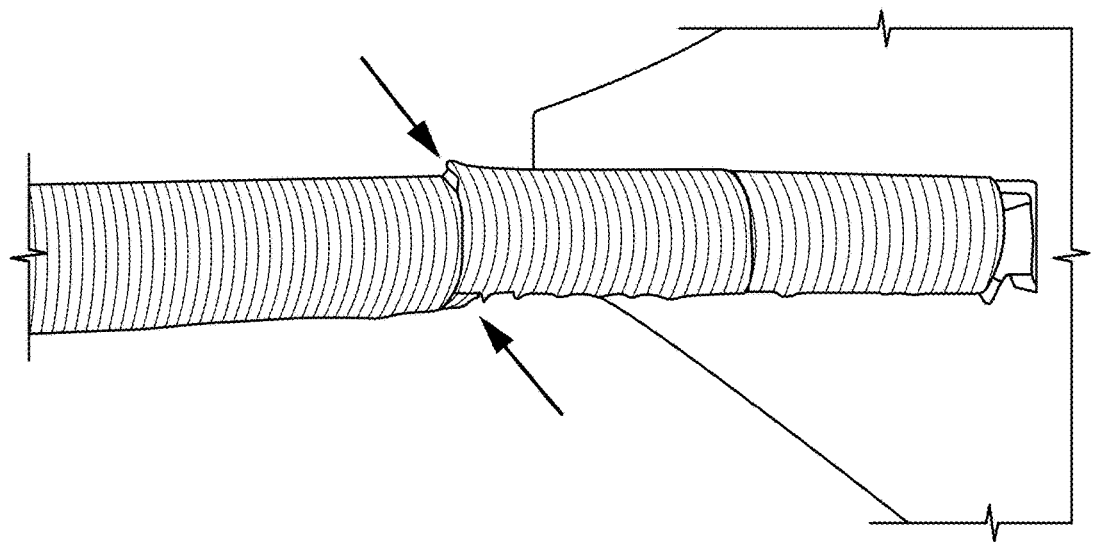
Figure 1D:
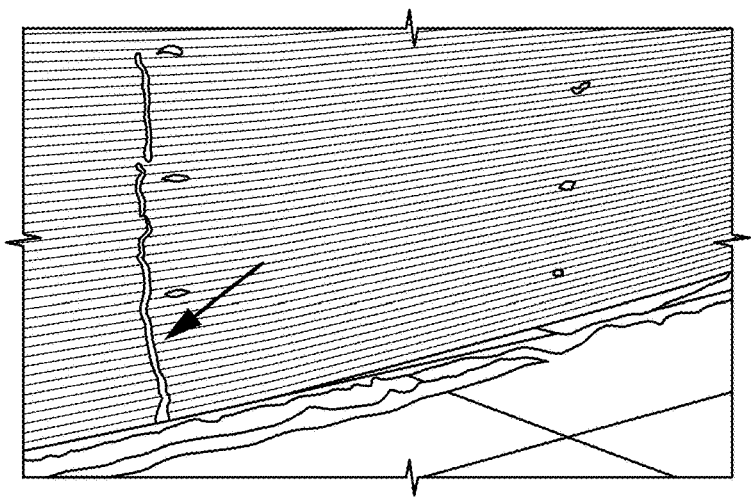
FIGS. 1D, 1E, and 1F show cracking of the workpiece (the arrows point to cracks).
Figure 1E:
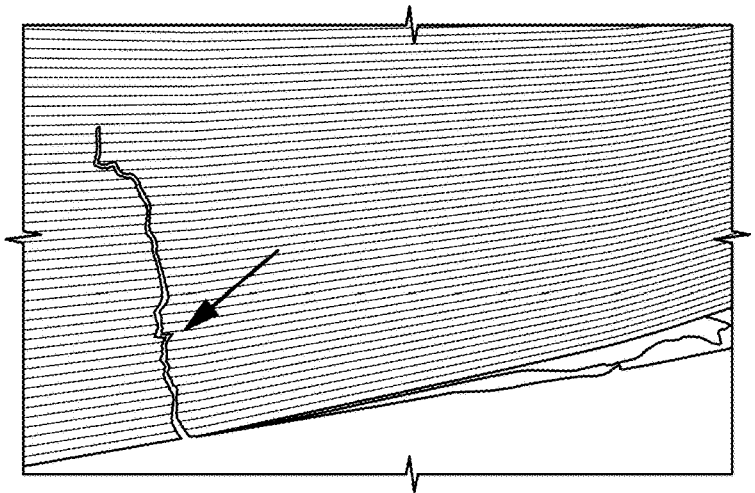
Figure 1F:
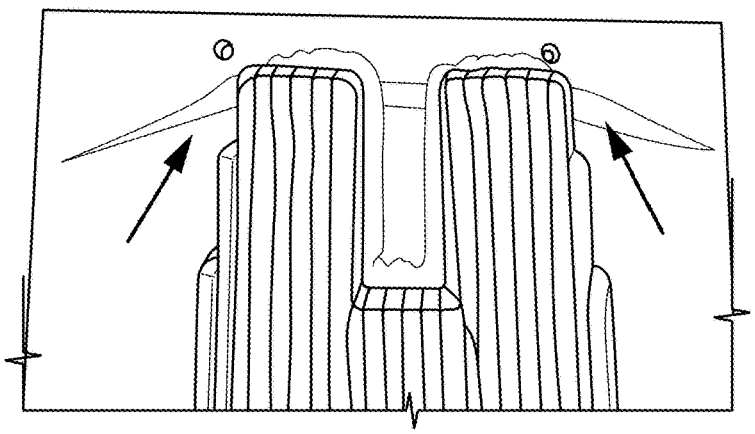

Reference will now be made in detail to an embodiment of the present invention, example of which is illustrated in the accompanying drawings.

A. DEFINITIONS

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail.

As used herein, the singular forms "a," "an" and "the" include plural referents unless the context clearly dictates otherwise.

As used herein, ranges and amounts can be expressed as "about" a particular value or range. "About" also includes the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where the event or circumstance occurs and instances where it does not. For example, an optional component in a system means that the component may be present or may not be present in the system.

As used herein, a "combination" refers to any association between two items or among more than two items. The association can be spatial or refer to the use of the two or more items for a common purpose.

As used herein, the terms "comprising", "including" and "containing" are synonymous, and are inclusive or open-ended. Each term indicates that additional, unrecited elements or method steps optionally can be included.

As used herein, "and/or," means "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "additive manufacturing" is also known as "additive fabrication" and "additive layer manufacturing" and "solid free form fabrication" and "shaped metal deposition" and "layered manufacturing" and refers to an additive process implementing the manufacturing, layer after layer, of an object. The process can employ a 3D model data, a metal feedstock source, such as wire or powder, a thermal source (such as a plasma arc, laser or electron beam) to melt the metal source, or a combination thereof.

As used herein, "additive manufacturing system" refers to the system used for additive manufacturing.

As used herein, "Directed Energy Deposition" or "DED" refers to an additive manufacturing process in which a thermal source is used to fuse materials, particularly metals, by melting as they are being deposited.

The term "plasma transferred arc torch" or "PTA torch" as used interchangeably herein refers to any device able to heat and excite a stream of inert gas to plasma by an electric arc discharge and then transfer the flow of plasma gas including the electric arc out through an orifice (such as a constricting nozzle) to form a highly collimated arc column of ionized plasma gas that exits the nozzle orifice at high speed and transfers the intense heat of the arc to a target region, such as a metal wire or a substrate.

The term "metallic material" as used herein refers to any known or conceivable metal or metal alloy which can be employed in a directed energy deposition process to form a three-dimensional object. Examples of suitable materials include, but are not limited to, titanium and titanium alloys such as i.e. Ti-6Al-4V alloys.

As used herein, a "thermal source" refers to a part of a device from which thermal energy can be transferred to a metallic material, such as a metal wire or metal powder, or to a substrate or base material, or any combination thereof. Exemplary thermal sources include a plasma arc, a laser beam, and an electron beam.

As used herein, a "melting tool" refers to a device that produces a thermal source for pre-heating or melting a metallic material or a portion of a surface of a workpiece or both in a DED additive manufacturing process. Examples include a PTA torch that produces an electric arc plasma as a thermal source, a laser device that produces a laser beam as a thermal source, and an electron beam device that produces an electron beam as a thermal source.

The term "base material" as used herein refers to the target material onto which molten metal is to be deposited to form a workpiece. This will be the substrate when depositing the first layer of metallic material. When one or more layers of metallic material have been deposited onto the substrate, the base material will be the upper layer of deposited metallic material onto which a new layer of metallic material is to be deposited.

As used herein, the term "workpiece" refers to a metal body or object being produced using directed energy deposition.

The term "computer assisted design model" or "CAD-model" as used interchangeably herein refers to any known or conceivable virtual three-dimensional representation of the object that is to be formed which can be employed in the DED system to regulate the position and movement of the substrate and to operate the DED thermal source and source of metallic material, such as a metal powder supply or metal wire feeder, such that a physical object is built by fusing successive deposits of the metallic material onto the substrate in a pattern which results in building a physical object according to the virtual three-dimensional model of the object. This may, for instance, be obtained by forming a virtual vectorized layered model of the three-dimensional model by first dividing the virtual three-dimensional model into a set of virtual parallel layers and then dividing each of the parallel layers into a set of virtual quasi one-dimensional pieces. Then, the physical object can be formed by engaging the controller to deposit and fuse a series of quasi one-dimensional pieces of the metallic material feed onto the substrate in a pattern according to the first layer of the virtual vectorized layered model of the object.

Then, repeating the sequence for the second layer of the object by depositing and fusing a series of quasi one-dimensional pieces of the weldable material onto the previous deposited layer in a pattern according to the second layer of the virtual vectorized layered model of the object. Repetition continues the deposition and fusing process layer by layer for each successive layer of the virtual vectorized layered model of the object until the entire object is formed. However, the invention is not tied to any specific CAD-model and/or computer software for running the controller of the arrangement according to the invention, and nor is the invention tied to any specific type of controller. Any known or conceivable controller (CAD-model, computer software, computer hardware and actuators etc.) able to build metallic three-dimensional objects by directed energy deposition can be used.

As used herein, a "cooling gas" is a gas directed at the as-solidified surface, such as towards the melting tracks, to directly influence and accelerate cooling and solidification of the as-solidified metal. The temperature of the gas can be any temperature that cools the surface with which it interacts. The temperature can be less than 100° C., or less than 50° C., or less than 30° C., or less than 25° C., or less than 10° C., or less than 5° C., or less than 0° C. or in a range of from about −10° C. to about 100° C., or from about −5 C to about 90° C., or from about 0° C. to about 80° C. The temperature can be about 25° C. or less.

As used herein, "residual stresses" are stresses that would exist in a structure even if all external loads were removed due to residual strain inhomogeneity. Residual stresses typically are self-equilibrating.

As used herein, "jig" refers to a device used to hold or secure the workpiece, mount system, and clamps in place during deposition. For example, a jig can include a tray, pedestal or platform to which a substrate or other part of a workpiece can be secured during the DED process.

As used herein, a "preform" is the workpiece produced by an additive manufacturing process. A preform can be an intermediate of the final finished part or a semi-finished part. The preforms can have a near-net shape to the final finished product, and can require some, if minimal, further processing. For example, a preform can require a final finish machining to high tolerance configurations.

As used herein, a "buy-to-fly ratio" or "BTF ratio" refers to the weight ratio of the weight of the raw material used to fabricate the component and the weight of the finished product. This ratio can depend on how close the shape of the initial as-deposited DED preform shape is relative to the shape of the finished component. The more material that needs to be removed from the DED preform in order to fabricate the final component, the higher the BTF ratio.

As used herein, the "length" or "length direction" with reference to a substrate, refers to the direction along the greatest of the three dimensions of the substrate.

As used herein, the "width" or "width direction" with reference to a substrate, refers to the direction along the second greatest of the three dimensions of the substrate, typically referring to a measurement from one short side to the other short side.

As used herein, the "thickness" or "thickness direction" with reference to a substrate, refers to the direction along the smallest of the three dimensions of the substrate.

As used herein, a "high-strength steel" refers to a steel having a tensile strength of 300 MPa or greater.

As used herein, a "high-strength low-alloy steel" refers to a steel having a tensile strength of 370 MPa or greater.

As used herein, an "ultra high-strength steel" refers to a steel having a tensile strength of 780 MPa or greater.

As used herein, a "warm forming temperature" is a temperature below a material's recrystallization temperature that maximizes the material's malleability without allowing re-crystallization, grain growth, or metallurgical fracture. Warm forming temperature can range from about 200° C. to about 850° C., depending on the material.

As used herein, a "hot forming temperature" is a temperature above a material's recrystallization temperature. Hot forming temperature can be in the range of about 600° C. to about 2000° C., depending on the material.

As used herein, "backside of the substrate" refers to a side of the substrate that during DED manufacturing faces away from the deposition apparatus. For example, the backside of the substrate can be directed toward the jig during deposition. The backside of the substrate is the side opposite of the side onto which deposition occurs.

As used herein, the "frontside of the substrate" refers to the side of the substrate facing the deposition apparatus. For example, the front side of the substrate can be the side onto which molten material is deposited during DED. The front side of the substrate can be the side on which the workpiece is formed by DED. The frontside of the substrate is the side reverse of the backside of the substrate.

As used herein, a "cavity" refers to any unfilled space or void within a mass that does not traverse the mass to form a hole. The cavity can be a hollowed-out space or carved-out space, or a space formed by adding additional material.

As used herein, the "nominal deflection" or "h (bow)" of the mount system is the difference between the maximum height of the bowed surface measured at the center of the bowed surface and the top surface of an edge of the mount system.

It should also be understood that, unless clearly indicated to the contrary, in any methods claimed herein that include more than one step or act, the order of the steps or acts of the method is not necessarily limited to the order in which the steps or acts of the method are recited.

B. SUBSTRATE MOUNT SYSTEM

Figure 1G:
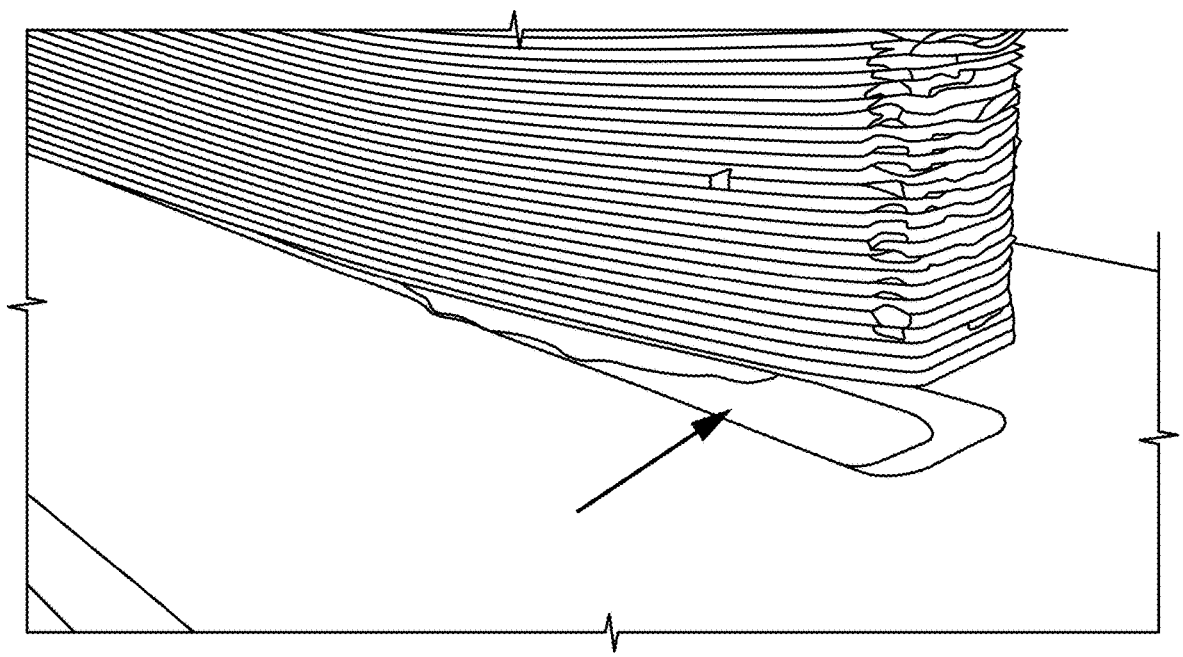
FIGS. 1G and 1H show tearing of the workpiece (the arrows point to the tears).
Figure 1H:
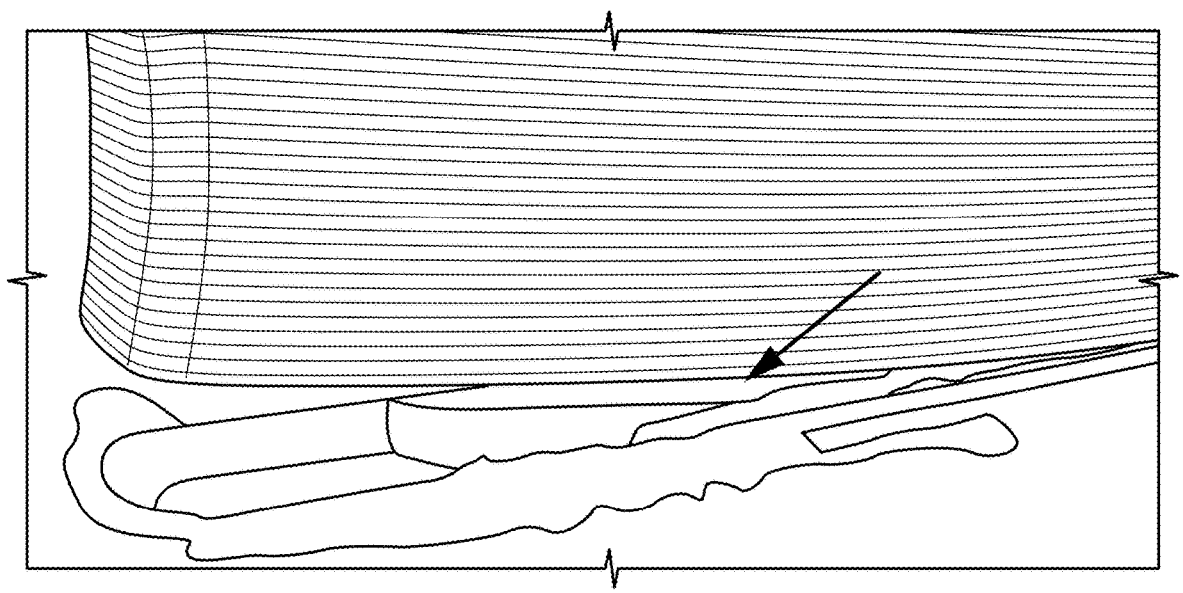

Conventional DED of metals to produce a preform can introduce residual stress in the preform. Residual stress during DED of metals typically results from the fact that different areas of a component being manufactured experience different cycles of thermal expansion and contraction. The resulting thermal stress can cause a non-uniform distribution of irreversible material deformation, and some of this deformation can remain after the material has cooled, resulting in an internal and completely self-equilibrating stress field in the workpiece. The stress, if not mitigated, can promote a large number of manufacturing failures. As shown in FIGS. 1A through 1H, a workpiece produced using conventional DED additive manufacturing without stress mitigation (FIG. 1A) can exhibit mismatch (FIGS. 1B and 1C), cracking (FIGS. 1D, 1E and 1F), and tearing (FIGS. 1G and 1H). Provided is substrate mount system 100 as an underlying support structure for a pre-bent substrate for manufacturing residual stress-free and distortion-free single-sided metallic components by DED, or metallic components having reduced residual stress or reduced distortion. The mount system 100 can be used with conventional DED thermal sources used to melt a metal powder or wire feedstock, or a combination thereof.

In examples, mount system 100 may be employed as an intervening structure between a pre-bent substrate and a jig. One or more clamps can be used to secure the pre-bent substrate to the jig. This can result in the pre-bent substrate being pressed toward the jig, so the forces necessary to secure the pre-bent substrate to the jig will be between the clamps and the jig, with the mount system 100 as a support between the substrate and the jig. In embodiments, the pre-bent substrate is pressed axially downward.

In examples, the mount system 100 as provided herein can allow redesign of jigs to be simpler i.e. lighter, cheaper and more versatile. Current jigs may be over-designed to accommodate anticipated reaction forces and stresses encountered when directly clamping the substrate to the jig and during DED. The mount system 100 can reduce these anticipated forces and stresses. The mount system 100 provided herein also can allow modification of the clamping arrangement compared to traditional clamping arrangements. In some application, the entire periphery of the substrate can be clamped to the jig when the mount system 100 is used.

In examples, mount system 100 can allow for low or decreased thermal energy transfer between the substrate and the welding jig during DED manufacturing, reduce or eliminate the need for insulating ceramic, obtain a manufactured product that is defect-free or substantially defect-free, or any combination thereof.

Ceramic sheets, plates, or pylons used as a thermal insulator, as described earlier, can absorb moisture that is then released during DED manufacturing. Release of moisture in the environment increase the presence of oxygen that can be detrimental to the process as it may result in oxidation of the metal being deposited. In examples, mount system 100 may exclude any ceramic sheets, plates, or pylons. In examples, mount system 100 may be used ceramic-free. In examples, no ceramic coating is used in mount system 100. In examples, mount system 100 does not include any ceramic material. In examples, mount system 100 does not include any ceramic sheet, plate, or pylon. In examples, mount system 100 may include ceramic material and/or ceramic coating.

Figure 2A:
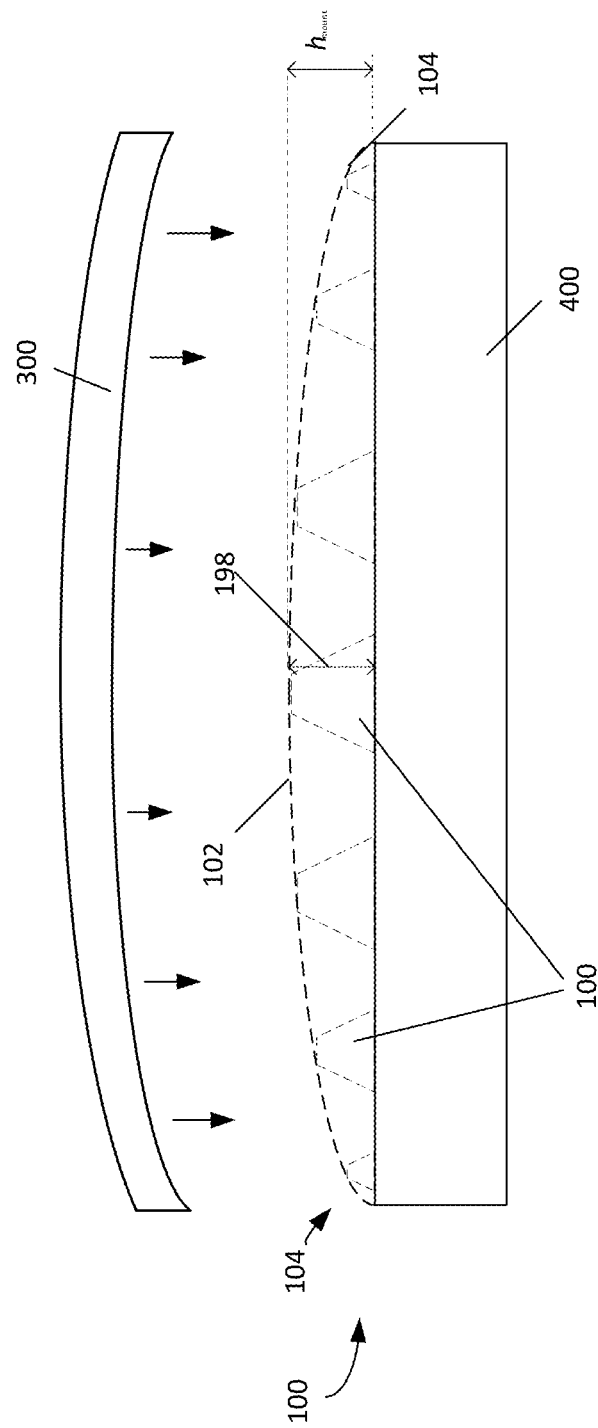
FIG. 2A is a diagram illustrating an example curve profile as may be defined by a mount system as described herein.
Figure 2B:
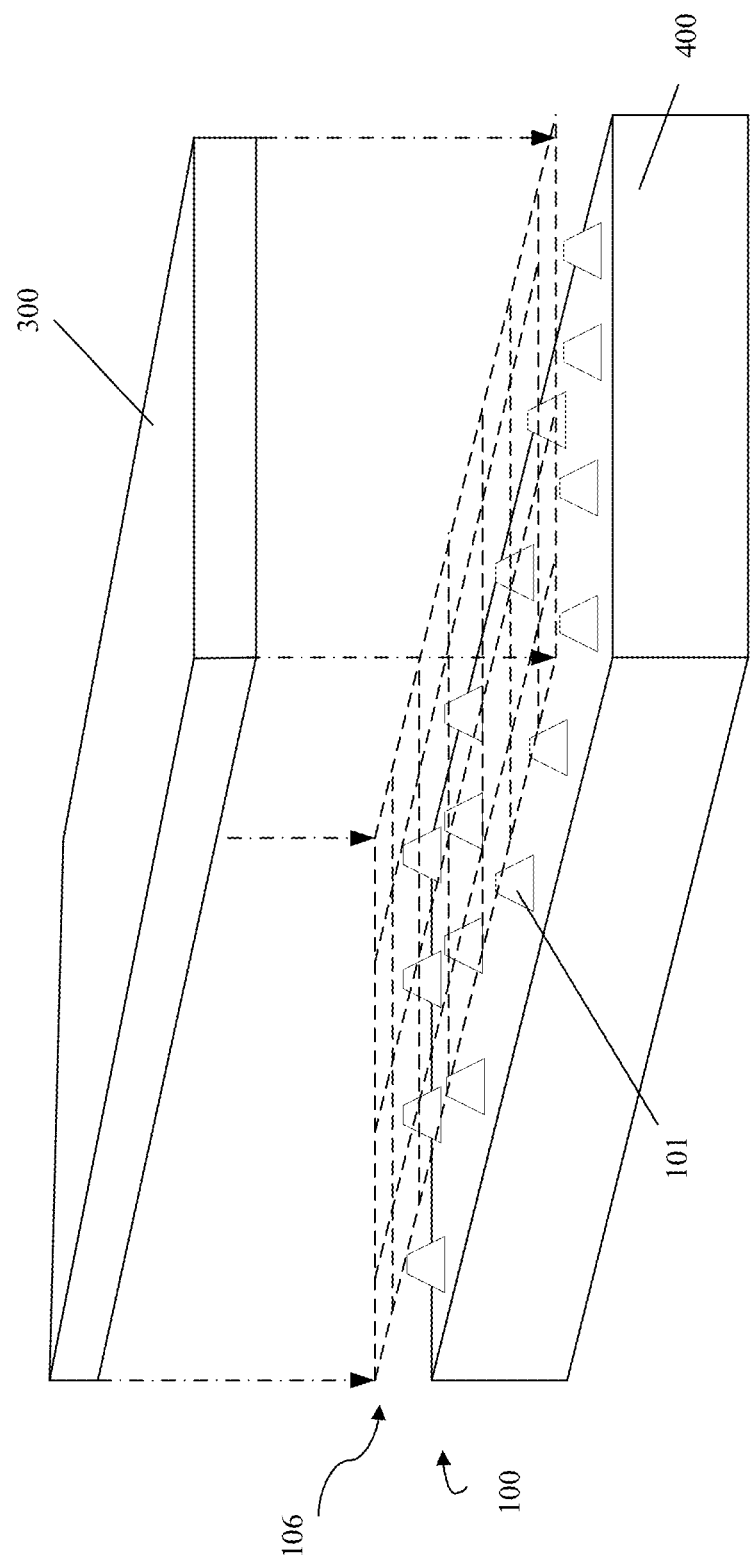
FIG. 2B is a diagram illustrating a substrate interface area for a mount system as described herein.

Mount system 100 may be configured to include a predetermined "substrate contact interface." As used herein, the term "substrate contact interface" in reference to mount system 100 refers to the ratio of substrate contact area of mount system 100 to the substrate interface area of mount system 100. The "substrate interface area" of mount system 100 refers to the area on one side of mount system 100 that is configured to be occupied by the surface of a substrate or pre-bent substrate facing mount system 100 when in use, and thus, corresponds to the area of the surface of a substrate or pre-bent substrate facing mount system 100 when mount system 100 in use. A diagram of an example substrate interface area 106 (shown as a plane in broken line) of mount system 100 is illustrated in FIG. 2B (curvature has been omitted for clarity). In examples, the substrate interface area of mount system 100 may be the same or different from the surface area of the physical surface of mount system 100 configured to face a substrate or pre-bent substrate when mount system 100 is in use. For instance, in the example illustrated in FIG. 2B where mount system 100 may include a set of separate elements 101, the substrate interface area 106 may be larger than an aggregate surface area of the elements 101 configured to face a substrate or pre-bent substrate when mount system 100 is in use. The term "substrate contact area" as used herein refers to the area at which a physical contact is made between mount system 100 and a substrate or pre-bent substrate when the mount system 100 is in use. For purposes of this description, reference to the "substrate contact area" of mount system 100 as a whole should be understood as the aggregate surface area of mount system 100 that is configured to be in physical contact with a surface of a substrate or pre-bent substrate when mount system 100 is in use as described herein. Physical contact for purposes of this definition also includes contact made with an intervening ceramic coating, bond coat, or both. For ease of reference the ratio representing the substrate contact interface may be expressed as a percentage of the portion of the substrate interface area of mount system 100 that is the substrate contact area of mount system 100. In other words, the ratio may be expressed herein as a percentage or proportion of the area of the side of mount system 100 configured to be overlaid by a substrate or pre-bent substrate when mount system 100 is in use that is occupied by the area over which mount system 100 is configured to physically contact the substrate or pre-bent substrate when mount system 100 is in use. The substrate contact interface may equally be understood to be the proportion of the surface area of a side of a substrate or pre-bent substrate that mount system 100 is configured to physically contact when supporting the substrate or pre-bent substrate.

In examples, mount system 100 may be configured to include a substrate contact interface that is equal to or greater than 0.1, 0.2, 0.3, 0.4, 0.5, 0.6, 0.7, 0.8, 0.9, or 1, and equal to or less than 1, 2, 3, 4, 5, 6, 7, 8, 9, 10, 11, 12, 13, 14, 15, 16, 17, 18, 19, or 20. In examples, mount system 100 may be configured to have a substrate contact interface in the range of 0.1 and 15, 0.1 and 10, 0.1 and 5, or 0.1 and 1. In examples, mount system 100 may be configured to have a substrate contact interface in the range of 0.1 and 15, 0.1 and 10, 0.1 and 5, or 0.1 and 1. In examples, mount system 100 may be configured to have a substrate contact interface in the range of 0.2 and 20, 0.2 and 15, 0.2 and 10, 0.2 and 5, or 0.2 and 1. In examples, mount system 100 may be configured to have a substrate contact interface in the range of 0.3 and 20, 0.3 and 15, 0.3 and 10, 0.3 and 5, or 0.3 and 1. In examples, mount system 100 may be configured to have a substrate contact interface in the range of 0.4 and 20, 0.4 and 15, 0.4 and 10, 0.4 and 5, or 0.4 and 1. In examples, mount system 100 may be configured to have a substrate contact interface in the range of 0.5 and 20, 0.5 and 15, 0.5 and 10, 0.5 and 5, or 0.5 and 1. In examples, mount system 100 may be configured to have a substrate contact interface in the range of 0.6 and 20, 0.6 and 15, 0.6 and 10, 0.6 and 5, or 0.6 and 1. In examples, mount system 100 may be configured to have a substrate contact interface in the range of 0.7 and 20, 0.7 and 15, 0.7 and 10, 0.7 and 5, or 0.7 and 1. In examples, mount system 100 may be configured to have a substrate contact interface in the range of 0.8 and 20, 0.8 and 15, 0.8 and 10, 0.8 and 5, or 0.8 and 1. In examples, mount system 100 may be configured to have a substrate contact interface in the range of 0.9 and 20, 0.9 and 15, 0.9 and 10, 0.9 and 5, or 0.9 and 1.

In examples, a mount system 100 may be configured to have a desired substrate contact interface for a given size substrate or pre-bent substrate by controlling or adjusting the portions of mount system 100 that are configured to come into physical contact with a substrate or pre-bent substrate. In examples, the substrate contact area of a mount system 100 may be controlled by making the surface of mount system 100 configured to face and physically contact a substrate or pre-bent substrate when in use ("substrate contact surface") to be uneven or discontinuous. In examples, as described herein, the substrate contact surface of mount system 100 may be corrugated, knurled, or otherwise include ridges and troughs or other like uneven surface contour. In examples, substrate contact surface of mount system 100 may be designed to have a stepped, curved, convex, concave, hollow, irregular, or have any other uneven profile that may result in a substrate contact area that is only a portion of the total area of the substrate contact surface of mount system 100. In examples, mount system 100 may be configured to support a substrate or pre-bent substrate only at spaced apart locations, such as by way of a set of pins or pin structures, or by way of a lattice structure.

In examples, by reducing the substrate contact area, may result in a reduction of conduction heat transfer from the substrate or pre-bent substrate to the mount system 100, welding jig, or both. In examples, this may promote heat accumulation in the substrate during the DED process, thus minimizing the degree of spring-back. In examples, because the thermal gradients across the thickness of the substrate or pre-bent substrate can be substantially less during deposition of first layers, the welding-induced residual stress arising during DED of metal preforms may be reduced. Also, because titanium and titanium alloys such as i.e. Ti-6Al-4V have high yield stress and comparatively low elastic modulus, these metals exhibit a high degree of spring-back at room temperature.

In examples, the reduced substrate contact area may result in the formation of one or more gaps or spaces between the substrate or pre-bent substrate and the mount system 100, welding jig, or both. In examples, it may be possible to allow these gaps or spaces to be filled with the atmosphere of the DED chamber, or a noble gas, such as argon, which can act as a thermal insulator. A noble gas such as argon gas may be a very effective thermal insulator. Also, solid/gas/solid interfaces are considerably less heat conductive, and thus these particular interfaces between pre-bent substrate/argon gas/mount system and/or welding jig may effectively work as thermal barriers. Accordingly, in examples, the one or more gaps or spaces also can help to minimize the average heat transfer coefficient between the substrate or pre-bent substrate and the mount system 100.

In examples, mount system 100 may include a single, integral structure, an array of elements or structures, or a combination of both. Any structure reflecting the design properties of mount system 100 described herein may be used to implement mount system 100. In examples, mount system 100 may include a pin support system 110, one or more pins 112, a lattice support system 150, a mold 170, any like structure, or any combination thereof. These example structures of mount system 100 are provided as examples and should not be viewed as limiting. In examples where mount system 100 includes an array of elements or structures, each element or structure having its own substrate contact surface and substrate contact area, the previously defined substrate contact interface when referring to mount system 100 as a whole should be understood as a function of the aggregate substrate contact areas from all the elements or structures in the array that are part of mount system 100.

In examples, mount system 100 as provided herein can be free standing. In examples, the mount system 100 can be separate and apart from the jig. In examples, the mount system 100 can be integrated as a part of a welding jig. In exemplary embodiments, the mount system 100 can be configured to be installed on a welding jig.

In examples, mount system 100 may be configured to define a curved profile 102 at least on one side. In examples, curved profile 102 corresponds to the surface profile of mount system 100. In examples, curved profile 102 is the profile of a surface of a plane that is defined mount system 100. In examples, curved profile 102 is the surface profile of mount system 100. In examples, where the mount system 100 is an integral structure such as a mold or as may be provided in a lattice as described herein, the curved profile 102 may be the surface profile of mount system 100. In examples, where mount system 100 includes a discontinuous surface such as may be provided in a lattice as described herein or where mount system 100 includes an array of elements or structures 101, such as pin support system as described, curved profile 102 may be the profile defined as a plane crossing a distal end of each of substrate contact areas on the discontinuous surface or on the elements or structures in the array as illustrated in FIG. 2A.

In examples, mount system 100 may be configured to define a curved profile 102 at least on a side facing away from the welding jig. In examples, mount system 100 can be configured to define a planar profile on one side. In examples, mount system 100 may be configured to define a planar profile on a first side and a curved profile on an opposite second side. In examples, mount system 100 may define a planar or flat profile on a first side that, when in use, is intended to face or be directed toward the welding jig. In examples, mount system 100 may define a curved profile 102 on a second side, opposite the first side. In examples, mount system 100 may define a curved profile 102 on a side that, when in use, is intended to face away from or be directed away from the welding jig and to face or be directed toward a substrate or pre-bent substrate. In examples, curved profile 102 of mount system 100 is configured to face a substrate or pre-bent substrate when mount system 100 is in use. In examples, the curved profile 102 is provided on the side of mount system 100 that is configured to interface with a substrate or pre-bent substrate when mount system 100 is in use. In examples, the curved profile 102 of mount system 100 is configured to interface with a substrate or pre-bent substrate.

In examples, the curvature of the curved profile 102 of mount system 100 can be empirically determined based on data gathered on initial trials performed using ceramic plates. Ceramic plates were cut into different sizes which were then used to produce different current curvatures and tested for their ability to minimize distortion in preforms prepared on the curved supports. Modelling was used thereafter to confirm that the curvature used experimentally provided the targeted end results, i.e., a close to distortion free preform. In cross-section when viewed from the side, the shape of the curved profile 102 of mount system 100 can resemble an upper half of an ellipse whose semi-minor axis is much smaller than its semi-major axis. The ellipse can have an eccentricity close to, but less than 1 (an eccentricity of 1 would be a flat surface).

In examples, mount system 100 may include a peripheral rim portion 104. An example of this is illustrated in FIG. 2A. In examples, peripheral rim portion 104 may be along at least a side edge or along a perimeter of an area defined by the first side, second side, or both first and second side of mount system 100. In examples, the peripheral rim portion 104 of mount system 100 may be configured to underly at least in part a substrate or pre-bent substrate at a portion where the substrate or pre-bent substrate is clamped to the welding jig when mount system 100 is in use. In examples, at least a portion of the peripheral rim portion 104 of mount system 100 may be configured to underly a substrate or pre-bent substrate at a location where the substrate or pre-bent substrate is clamped to the welding jig when the mount system 100 is in use.

In examples, some compressive stress can be felt on the mount system 100 due to the contact between the mount system 100 and the substrate or pre-bent substrate. In examples, mount system 100 can be made of a stiff material that is resistant to twisting and deformation to help maintain its shape. In addition, the mount system 100 can be made of a material that is resistant to thermal shock, corrosion, and/or is non-magnetic.

In examples, mount system 100 can act as a support structure for the pre-bent DED substrate, positioned between the pre-bent DED substrate and the jig. An exemplary arrangement can include the jig as the lowermost surface, unto which the mount system 100 is positioned.

In examples, the backside (first side) of pre-bent substrate, on which the melting tracks can be present, may be positioned so that it faces the side of the mount system 100 facing away from the jig. In this configuration, the backside of the pre-bent substrate is facing downward toward the curved profile 102 of mount system 100 and the jig. In examples, one or more clamps can secure the pre-bent substrate to the jig, with the mount system 100 between the pre-bent substrate and the jig. In examples, the force exerted by the clamps on the pre-bent substrate can straighten the pre-bent substrate and forcing it to conform to the curvature of the curved profile 102 of mount system 100. The one or more clamps around at least a portion of the periphery of the DED substrate can uniformly compress the pre-bent substrate downwards toward the jig and can secure the pre-bent substrate to the jig.

In examples, mount system 100 can help to mitigate or can eliminate deformations such as welding-induced buckling distortion, which are caused by an elastic instability produced by compressive residual stresses, if the critical buckling stress of the substrate is exceeded. Because of a reduced contact interface mount system 100 is configured to have with a substrate or pre-bent substrate, the controlled substrate interface, or a combination thereof, in examples mount system 100 may be able to minimize the development of local temperature gradients that can induce large local stains, and a resultant deformation pattern. In examples, mount system 100 can maintain a consistent interface with the pre-bent substrate to optimize thermal and mechanical homogeneity across the pre-bent substrate.

In examples, the dimensions of the substrate may be selected to accommodate one or more workpieces to be constructed on the substrate. Typically, the only limitation as to size of a curved profile 102 defined by mount system 100 with respect to the substrate is that the substrate or pre-bent substrate must be able to be clamped to the jig with mount system 100 positioned between the substrate and the jig. Mount system 100 can be designed to define a curved profile 102 that has the same size as the substrate or pre-bent substrate. In examples, mount system 100 can be configured to define a curved profile 102 that is from 0.5% to 10% larger than the interfacing surface of the substrate or pre-bent substrate so long as to the substrate or pre-bent substrate can be clamped to the jig.

The mount system 100 can be designed to define a curved profile 102 having a size that is from 0.05% to 2.5% smaller than the substrate so long as to the substrate does not come into contact with the jig when clamped to the jig with the mount system 100 between the substrate and the jig.

In embodiments provided herein, measuring from the surface of the welding jig facing mount system 100 when mount system 100 is placed on the welding jig, the height of the curved profile 102 defined by mount system 100 at or near the center or apex of the curved profile 102 can be in the range of from about 3 mm to about 60 mm, or from about 12 mm to about 50 mm, or from about 15 mm to about 45 mm. The height of the curved profile 102 measured at or near the outer edges or peripheral rim portion can be in the range of from about 0.5 mm to about 55 mm, or from about 3 mm to about 45 mm, or from about 10 mm to about 40 mm. The thickness profile of the curved profile 102 when viewed from the side has the greatest height in the center or apex, and the height may gradually decrease toward the outer edges or peripheral rim portion to from a curved surface. The differences in height across the cross-section of the curved profile 102 defined by mount system 100 can result in a concave downward curve in the top surface of the curved profile 102. In cross-section when viewed from the side, the shape of the curved profile 102 can resemble an upper half of an ellipse whose semi-minor axis is much smaller than its semi-major axis. The ellipse can have an eccentricity close to, but less than 1 (an eccentricity of 1 would be a flat surface).

In examples, mount system 100 can be constructed from any metal having sufficient strength and temperature resistance for use under typical conditions of DED processing. Mount system 100 can be made of a corrosion-resistant metal. Mount system 100 can be made of a heat-resistant metal. Mount system 100 can be made of a non-magnetic metal. Mount system 100 can be made of a metal having a melting point of 1350° C. or greater. In some configurations, mount system 100 may include an austenitic stainless steel. The austenitic stainless steel can contain carbon, chromium, copper, manganese, molybdenum, nickel, nitrogen, phosphorus, silicon or combinations thereof. The austenitic stainless steel can contain at least 18% chromium. Mount system 100 can be made of a 300 series stainless steel. Mount system 100 can be made of stainless steel series 304, 309, 310, 316, 318, 321 or 330. Mount system 100 can be made of grade AISI 330 stainless steel. Mount system 100 can be made of a non-magnetic metal in order to avoid unbalanced magnetic field conditions surrounding the weld arc in arc-based DED systems, which can cause a number of processing issues such as i.e. magnetic arc blow.

In examples, mount system 100 can be employed without the use of or exclude any ceramic sheet, plate, or pylon. As previously states, elimination of a ceramic elements such as ceramic sheets, plates, or pylons may be advantageous in maintaining low levels of oxygen or an oxygen-free atmosphere. In examples, replacing conventional ceramic insulation sheets with mount system 100 can result in a significantly more stable processing chamber atmosphere, as less or no water vapor is released from the ceramic coating of the mount system 100 into the chamber during DED processing, compared to the amount of water vapor released from conventional alumina ceramic plates.

In examples, the use of a ceramic coating may be implemented with mount system 100 if desired. In examples, ceramic coatings as described herein may not present the same issues as discussed with respect to ceramic sheets, plates, or pylons. The benefit of a ceramic coating may be to further minimize or better prevent thermal energy transfer from the substrate or pre-bent substrate to mount system 100 during the DED process, from mount system 100 to the welding jig, or both. Further reduction of thermal energy transfer can lead to reduced heat loss from the substrate or pre-bent substrate during DED.

In examples, ceramic coating may be applied to the portions or areas of mount system 101 that are configured to be the contact interfaces between mount system 101 and the substrate or pre-bent substrate. In examples, a ceramic coating may be applied to the portions or areas of mount system 101 that are configured to be a contact interface between mount system 101 and the welding jig. Any combination of the above may also be employed. Also, in examples, additional ceramic coating or elements may be employed. In examples, mount system 100 can be contoured by a metal material, and not coated with a ceramic coating or bond coat at the perimeter edges or peripheral rim of curved profile 102 defined by mount system 100.

In examples, a ceramic coating 108 can be applied directly to a surface of mount system 100, or the ceramic coating can be applied to a bond coat 107 that is directly applied to a surface of mount system 100.

The ceramic coating can be applied using any process, including atmospheric plasma spray, magnetron sputtering, chemical or electrochemical deposition, such as electrophoretic deposition, or physical vapor deposition, such as electron beam physical vapor deposition. Any high temperature ceramic coating known in the art can be used (e.g., see U.S. Pat. No. 4,321,310 (Ulion et al., 1982), U.S. Pat. No. 5,789,330 (Kondo et al., 1998), U.S. Pat. No. 5,304,519 (Jackson et al., 1994); U.S. Pat. No. 6,387,539 (Subramanian, 2002); and U.S. Pat. No. 6,998,064 (Gadow et al., 2006). Exemplary types of ceramic coatings include zirconium dioxide, zirconium dioxide stabilized by addition of yttrium oxide, yttrium aluminium oxide, alkaline earth metal silicates, $ZrV_2O_7$, $Mg_3(VO_4)_2$ and combinations thereof. A mount system 100 can be coated with zirconium dioxide stabilized by addition of yttrium oxide, such as a plasma sprayed $ZrO_2$ $8Y_2O_3$, such as those commercially available as Metco™ 22xx and 23xx powders, including Metco 222A, 231A, 233A, 233B, 233C and 234A (available from Oerlikon Metco, Frankfurt, Germany). The coating can include multiple layers of different types of ceramics, or multiple layers of one type of ceramic.

A ceramic coating used on mount system 100 can be selected to be less hygroscopic than conventional alumina insulation. A ceramic coating used on mount system 100 can be selected to be non-hygroscopic compared to conventional alumina insulation.

In examples, mount system 100 can include a bond coat 107. A bond coat is a coating of material that can increase the adhesion between a substrate and a ceramic coating. A bond coat can provide corrosion resistance to a substrate to which it is applied. The bond coat can be used alone or in combination with a ceramic coating. The bond coat can include chromium and aluminium. The bond coat can include MCrAlY, where M is a metal selected from the group consisting of Co, Ni, Fe, Cr, Co, and a Ni/Co combination. In some applications the bond coat includes MCrAlY, where M is Ni, Co or a combination thereof. Exemplary bond coat materials include Amdry™ powder products, such as Amdry™ 962, 9621, 9624, 9625, 963 and 964 (available from Oerlikon Metco, Frankfurt, Germany). The bond coat can be present at a thickness of from about 1 to 250 μm.

The thickness of the ceramic coating applied to mount system 100 can vary depending on the type of ceramic used, and its ability to support both mechanical and thermal loads. In some configurations, the thickness of the entire ceramic coating can be from about 0.1 mm to about 5 mm, or from about 0.25 to about 4 mm, or from about 0.3 to about 3 mm. Each deposited layer can be thinner than the entire amount of ceramic coating to be applied, but in aggregate all applied layers of the ceramic together can form a ceramic coating that is at least 0.1 mm, or at least 0.25 mm, or at least 0.5 mm, or at least 0.75 mm, or at least 1 mm, or at least 1.25 mm, or at least 1.5 mm, or at least 2.0 mm, or at least 2.5 mm, or at least 3.0 mm, or at least 3.5 mm, or at least 4.0 mm, or at least 4.5 mm. The ceramic coating can have a thickness of 0.1 mm, or 0.25 mm, or 0.5 mm, or 0.75 mm, or 1 mm, or 1.25 mm, or 1.5 mm, or 2.0 mm, or 2.5 mm, or 3.0 mm, or 3.5 mm, or 4.0 mm, or 4.5 mm or 5 mm.

In examples, mount system 100 may include knurls at least on a portion of the surface area configured to contact a substrate or pre-bent substrate either directly or with an intervening ceramic coating, when mount system 100 is in use. The knurled surface can produce a straight-line pattern, a diagonal line pattern, a diamond pattern, or a combination thereof on the substrate contact surface. A diamond knurling can be done to result in a male or a female knurling pattern. In a male diamond pattern, raised points are produced. In a female diamond pattern, diamond impressions are produced. The knurling can result in columns each of which have straight sides substantially perpendicular to the arc of curvature of the curved profile 102 defined by mount system 100. The columns can have a planar top surface. The columns can have a curved top surface. The columns can have a cross section that is square, rectangular, circular, oval, rhomboid, trapezoidal, triangular, pentagonal, hexagonal, heptagonal nonagonal, decagonal, a frustum-type shape, a truncated pyramidal shape, or any combination thereof. The columns can be separated from each other by a space. The gap between columns can be substantially constant.

In examples, mount system 100 can include corrugations or a corrugated surface at least on a portion of the surface area configured to contact a substrate or pre-bent substrate either directly or with an intervening ceramic coating 108, when mount system 100 is in use. In examples, a surface of mount system 100 can be corrugated to include alternating ridges and grooves. In examples, the corrugation can run across a substrate contact surface of mount system 100. In examples, the corrugation can run from one long edge to the other long edge of mount system 100. In examples, the corrugation can run from a first edge to a second edge of mount system 100. In examples, the corrugation may result in a plurality of columns that are perpendicular to the arc of curvature of curved profile 102. In examples, the corrugation can run along at least one edge of one or more elements or structures from an array of elements or structures that make us a mount system 100.

Figure 2C:
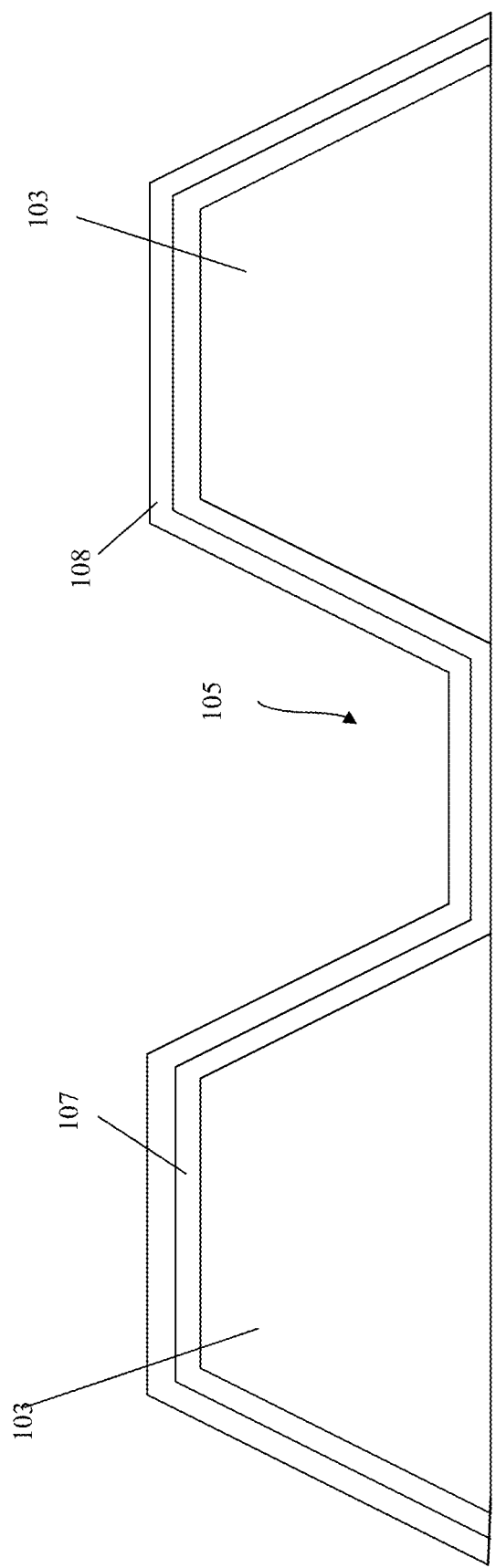
FIG. 2C is a diagram of an example of knurls and knurl spacing or trough illustrated as coated with a bond coat and a ceramic coating.

In examples, the knurls 103 can be columns having a planar top surface as illustrated in FIG. 2C. In examples, the ridges can be columns having a curved top surface. As also illustrated, the knurl spacing 105 can have a planar bottom surface. In examples, the grooves can have a curved or U-shape bottom surface. The grooves can include a rounded corner to protect against stress concentration and crack propagation. The ridges can each have a taper of increasing cross section along their longitudinal axis. In cross-section, the ridges can have a trapezoidal shape. In cross-section, the ridges can have an isosceles trapezoid shape, where the long base of the trapezoid forms the bottom the of the ridge, and the short base of the trapezoid forms the top of the ridge. In cross-section, the ridges can have a shape of a convex isosceles trapezoid. In cross-section, the ridges can have the shape of a frustum of a regular pyramid.

A ridge having in cross-section a frustum-type shape, particularly a truncated pyramid shape, can transfer stresses from the top of the ridge to the base while avoiding stress deformation of the ridge due to application of pressure to the curved profile 102 of mount system 100 when it supports the pre-bent substrate when the pre-bent substrate is pressed against the jig. A ridge having in cross-section a frustum-type shape can withstand the applied loads, forces and moments that can be applied during the DED process. The forces and moments acting at the plateau of the ridge (the upper flat surface) can be transferred to the base of the ridge, and ultimately to the backside of the mount system 100. When the ridge has in cross-section a frustum-type shape, it can transfer applied loads to a larger surface area at the base of the ridge. In examples, the knurled surface or troughs between the ridges may form additional gaps between mount system 100 and the substrate or pre-bent substrate when mount system 100 is brought into contact with the pre-bent substrate. As discussed earlier, gaps can be filled with the atmosphere of the DED chamber, or a noble gas, such as argon, which can act as a thermal insulator. Argon gas is a very effective thermal insulator. Solid/gas/solid interfaces are considerably less conductive, and thus may effectively work as thermal barriers.

In examples, the knurled pattern or corrugation of mount system 100 may be covered by a ceramic coating layer 108 and optionally a bond coat 107, as discussed above and, for example, as illustrated in FIG. 2C. In examples, the ceramic coating also can be present in the troughs of the knurled pattern or troughs of corrugations. The thickness of the ceramic coating only is limited by the limitations of application to mount system 100 and the ability of the thickness of the ceramic to support the pre-bent substrate, and the axial downward clamping forces, without damage to the ceramic coating when the substrate is clamped to the jig. Due to limitations in the coating technology, thicker layers of ceramic can be more difficult to achieve while maintaining the ability of the ceramic layer to support the pre-bent substrate without damage to the ceramic coating when the support is clamped to the jig. The exact support strength of the ceramic and its thermal conductivity can be determined by the composition of the ceramic. For example, a 2 mm coating of a ceramic based on zirconium dioxide stabilized by addition of yttrium oxide can provide good thermal isolation as well as good mechanical support of the substrate without damage to the ceramic coating when the substrate is clamped to the jig.

In examples, mount system 100 can serve as a shaping back structure. In examples, mount system 100 can serve as a supporting/shaping back structure. The mount system 100 can be positioned between the pre-bent substrate and the jig when the pre-bent substrate is secured to the jig. In examples, when the DED manufacturing process is complete, a self-equilibrating residual stress state may be achieved that allows an upward recovery (spring-back) of the substrate and DED structure built upon the substrate after releasing the clamps holding the substrate to the jig. The substrate straightens out after it is released from the clamps.

In examples, the nominal deflection provided by mount system 100, $h_{mount}$ (bow) may be the difference between the maximum height at the center of curved profile 102, measured from a surface of the welding jig when mount system 100 is positioned on the welding jig, and the upper surface of an edge or peripheral rim portion 104 of the curved profile 102, as illustrated in FIG. 2A. In FIG. 2A, the difference between the maximum height 198 of the curved profile 102 and an edge or peripheral rim portion 104 is $h_{mount}$. The length ratio $L_r$ and a surface area defined by mount system 100 is the ratio between the new x dimension of the surface area defined by mount system 100 $L_i$ and the original length $L_0$ of the surface area defined by mount system 100. The predicted maximum mount system 100 deflection $h_{L_r}$ is approximately proportional to the product between the nominal deflection $h_{mount}$ and the square of the length ratio $L_r$ of the surface area defined by mount system 100, which may be calculated according to the formula:

$$L_r = L_i/L_0$$

and thus $$h_{L_r} \approx h_{mount} \times L_r^2.$$

Hence, for example, for a mount system 100 defining a surface area with xy dimensions of 635 mm×190 mm (L×W), the predicted maximum deflection $h_{L_r}$ is about 3.8 mm. A longer defined surface area, such as one with xy dimensions of 1905 mm×635 mm would have a length ratio of three ($L_r$=1905/635=3) and a maximum deflection $h_{L_r}$ of 3.8×3²≈34.2 mm. The nominal deflection can be from about 3 mm to about 35 mm. The amount of deflection of the thus can depend on the characteristics of the mount system 100. The longer the mount system 100 needs to be to accommodate a longer substrate, the higher/larger the deflection will need to be.

1. Pin Support System and Pins

In examples, the mount system 100 can include a pin support system 110. In examples, a pin support system 110 can include one or more pin structures or other solid standoff structures (referred to herein as "pins") 112. Examples of mount system 100 implemented as pin support system 110 with one or more pins 112 are illustrated in FIGS. 3A-3M. In examples, pin support system 110 may include a single pin 112. In examples, pin support system 110 may include two or more pins 112. In examples, the one or more pins 112 of pin support system 110 may be arranged engaged to a surface of a structure. In examples, the one or more pins 112 of pin support system 110 may be installed on structure configured to be used in DED manufacturing. In examples, the one or more pins 112 of pin support system 110 may be arranged engaged to welding jig. In examples, the one or more pins 112 of pin support system 110 may be installed on a welding jig. In examples, the one or more pins 112 of pin support system 110 may be arranged on a welding jig In examples, implementing a mount system 100 as a pin support system 110 can provide one or more advantages. In examples, a pin support system 110 may be implemented without the use of ceramic sheets and/or ceramic coating while still achieving low heat transfer. In examples, a pin support system 110 may be implemented without the use of ceramic sheets. In examples, a pin support system 110 may reduce costs. In examples, the use of an array of pins 112 may involve less material than would be required to form other types of supporting structures such as a lattice or mold. In examples, a pin support system 110 may exhibit extended life cycle when compared to other types support structures.

In examples, a pin support system 110 may be reconfigurable. In examples, one or more pins 112 may be installed and reinstalled as desired. In examples, the pin support system 110 may be reconfigured for use with different size substrates or pre-bent substrates. In examples, pin support system 110 may include an array of pins 112 configured to be removably installed. In examples, pin support system 110 may include an array of pins 112 that may be installed and reinstalled to achieve any arrangement as desired. In examples, the reconfigurability of pin support system 110 by the arrangement flexibility of the array of pins 112 may lead to an improved or a more effective distortion mitigation when compared to other supporting structures such as a lattice or mold. In examples, the pins 112 may be arranged based on the design of a part being manufactured. In examples, arranging the pins 112 based on the design of the part being manufactured may allow a user to provide support where most required to mitigate distortion.

In examples, the spacing between the pins 112 may be varied depending on the desired support. In examples, pins 112 may be arranged on a welding jig spaced apart by 10 mm to 50 mm, and in examples, the distance between two pins 112 may be 10 mm, 15 mm, 20 mm, 25 mm, 30 mm, 35 mm, or 40 mm. These ranges and measurements are only an example. In examples, all pins 112 of a pin support system 110 may be equidistant from each other. In examples, the pins 112 of a pin support system 110 may not be equidistant from each other. In examples, two or more pins 112 of pin support system 110 may be arranged to be in closer proximity to each other than two or more other pins 112 of pin support system 110. Any combination or variation of these arrangements is also possible.

In examples, pin support system 110 including one or more pins 112 may have the advantage over other types of support structures by being able to provide an increased space or gap between a substrate or pre-bent substrate and a surface of the welding jig. In examples, pin support system 110 may be configured to occupy less space than other support structures since the one or more pins 112 may be arranged only at desired support locations without any interconnecting structure spanning across other areas. In examples, pin support system 110 may provide the flexibility to increase the space or gap between a substrate or pre-bent substrate and a surface of the welding jig by employing one or more pins 112 having a large pin support height.

As previously explained, it may be possible to allow gaps or spaces formed between a substrate or pre-bent substrate and a welding jig to be filled with the atmosphere of the DED chamber, or a noble gas, such as argon, which can act as a thermal insulator. These gaps and spaces also provide solid/gas/solid interfaces that are considerably less heat conductive. Thus, these interfaces between pre-bent substrate/argon gas/mount system and/or welding jig may effectively work as thermal barriers. Accordingly, in examples, the one or more gaps or spaces also can help to minimize the average heat transfer coefficient between the substrate or pre-bent substrate and the welding jig. In examples, this may help maintain more heat in the pre-bent substrate, thereby further reducing uneven temperature distribution and reducing thermal stresses in the pre-bent substrate.

In examples, one or more pins 112 of pin support system 110 may be arranged to support a substrate or pre-bent substrate at a location proximate to the clamps. In examples, one or more pins 112 of pin support system 110 may be arranged to support a central region of a substrate or pre-bent substrate. In examples, one or more pins 112 of pin support system 110 may be arranged to support a central region of a substrate or pre-bent substrate to prevent bowing.

In examples, one or more clamps can be used to secure the pre-bent substrate to the jig. This can result in the substrate or pre-bent substrate being pressed toward the jig, so the forces necessary to secure the substrate or pre-bent substrate to the jig will be between the clamps and the jig, with the pin support system 110 having one or more pins 112 as a support between the substrate or pre-bent substrate and the welding jig. In embodiments, the pre-bent substrate is pressed axially downward. In examples, the backside (first side) of pre-bent substrate, on which the melting tracks can be present, may be positioned so that it faces the pin support system 110. In this configuration, the backside of the pre-bent substrate is facing downward toward the pin support system 110 and the jig. One or more clamps can secure the pre-bent substrate to the jig, with the pin support system 110 between the pre-bent substrate and the jig as previously discussed.

In examples, pins 112 of pin support system 110 can be constructed from any metal having sufficient strength and temperature resistance for use under typical conditions of DED processing as previously mentioned when discussing mount system 100. In examples, all pins 112 of a pin support system 110 are made of the same material. In examples, the material for each pin 112 can be independently selected. In examples, at least a first pin of a plurality of pins includes the same material as at least a second pin of the plurality of pins in pin support system 110. In examples, at least a first pin of a plurality of pins includes a material that is different from the material includes in at least a second pin of the plurality of pins in pin support system 110.

As discussed earlier, in examples, no ceramic sheet, plate, or coating is used in the implementation of mount system 100. In examples, the pin support system 110, one or more pins 112, or both are free of ceramic and/or of ceramic coating. In examples, the pin support system 110 may be free of any ceramic sheet, plate or pylon. In examples, if desired, one or more ceramic elements or coating may be used in conjunction with pin support system 110. In examples, one or more pins 112 may include a coating of ceramic and/or bond coating as described earlier. In examples, a ceramic coating and/or bond coating may be applied to at least a pin substrate contact surface 119. In examples, one or more 128 may be employed as described herein where the one or more spacers 128 are ceramic spacers, ceramic coated spacers, or a combination of both. The type of ceramic, coating processes, and characteristics of a ceramic element and/or coating already discussed equally applies to implementation in pin support system 110 and/or to one or more pins 112.

Figure 3A:
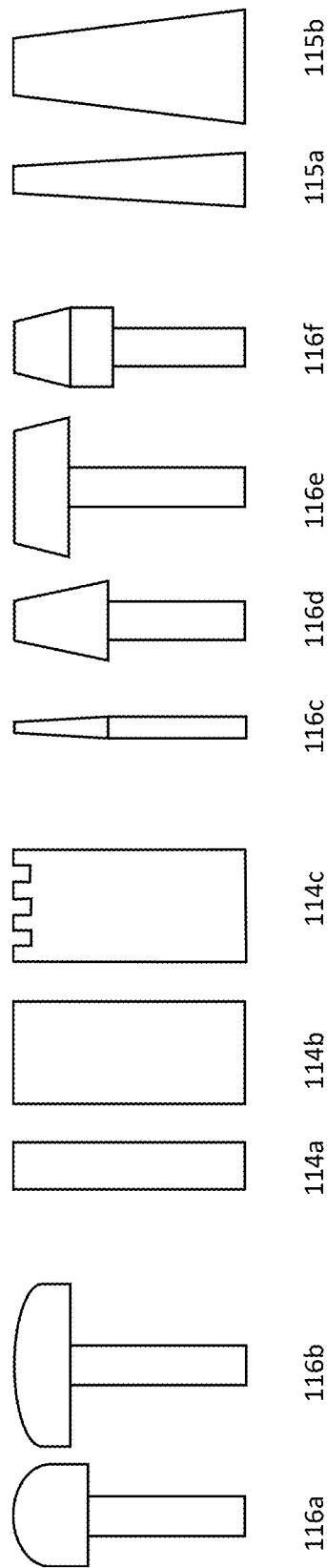
FIGS. 3A-3M illustrate examples of a mount system implemented as examples of pin support systems as described herein.
Figure 3B:
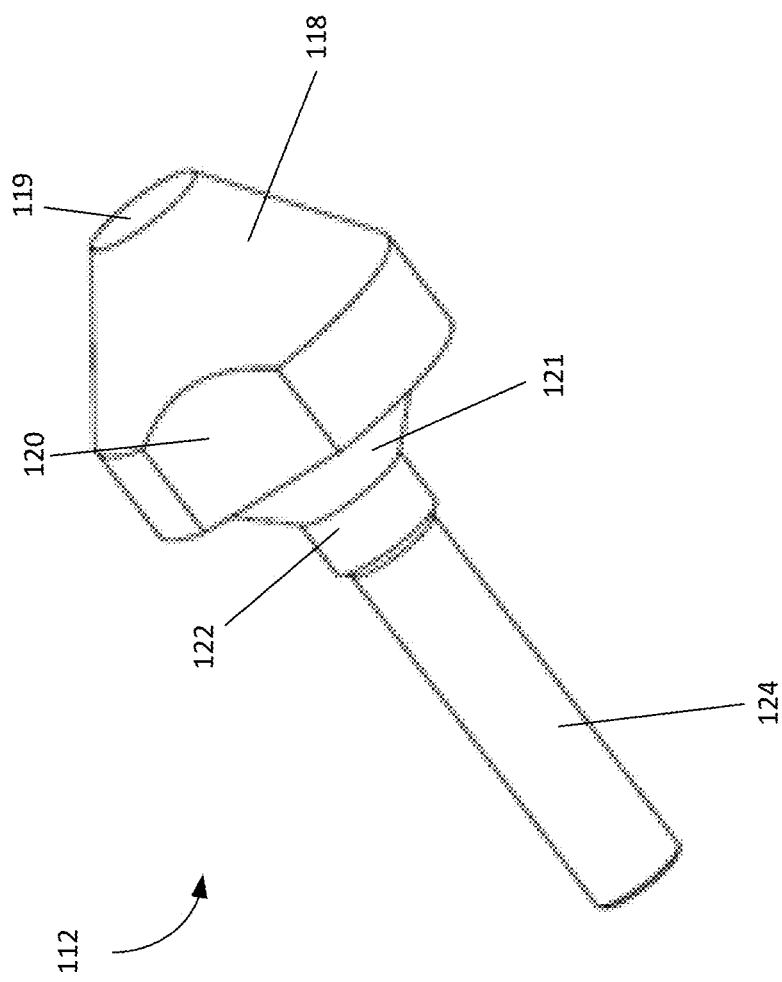

In examples, a pin can have any desired shape and size that allows for the functionality described herein. In examples, a pin 112 can have a shape is generally oblong, spherical, cubic, trapezoidal, cylindrical discoid, conic, rounded, squared, annular, nonsperical, regular, irregular, and any combination thereof. FIG. 3A illustrates some example shapes for a pin 112. In examples, the pin 112 can include an oblong shape as generally illustrated. In examples, a pin 112 can have a cross-sectional diameter, width, or thickness that is uniform across the length of the pin or pint structure 112 as, for example, illustrated by samples 114a, 114b, and 114c. In examples, a pin may include a tapered profile as for example illustrated by samples 115*a*, 115*b*, and 116*c*. In examples, a pin 112 may include one or more portions that have a cross-sectional diameter, width, or thickness that is greater than cross-sectional diameter, width, or thickness of at least one other portion of the pin 112 as for example illustrated by samples 115*a*, 115*b*, and 116*a*-116*f*. In examples, the pin 112 may have a mushroom shape as for example illustrated by samples 116*a*, 116*b*, 116*d*, 116*e*, and 116*f*. In examples, one or more portions of a pin 112 may have a different shape than at least one other portion of the pin as for example illustrated by samples 116*a*-116*f*. In examples, one portion of pin 112 may have a trapezoidal shape and a second portion may have a cylindrical shape as for example illustrated by samples 116*c*, 116*d*, 116*e*, and 116*f*. In examples, one portion of pin 112 may have a spherical or semi-spherical shape and a second portion may have a cylindrical shape as for example illustrated by samples 116*a* and 116*b*. In examples, a pin 112 as illustrated may include trapezoidal shape in place of cylindrical shapes. Any combination of two or more of the above-mentioned shapes can make used in the shape of a pin 112. In examples, a pin 112 may include a conic shape as for example illustrated in FIG. 3B. In examples, as illustrated in FIG. 3B, a pin 112 may include a portion having a cylindrical shape and a portion having a conic shape. In examples, a conic shape can include a double cone shape oriented in opposite direction as illustrated FIG. 3B.

In examples, a pin 112 may include a pin head portion 118. In examples, the pin head portion 118 includes at least a portion of a pin 112 that, upon installation of pin 112 onto a welding jig, it is configured to remain exposed or extends beyond the surface of a device to which the pin 112 is to be connected. In examples, pin head portion 118 can have any shape or size. In examples, pin head portion 118 may have a width or diameter ranging from 10 mm to 40 mm, and a length ranging from 0.05 mm to 10 mm. These dimensions are only examples. In examples, pin head portion 118 can have the same or different shape and/or size as from base or engagement portion 124. In examples, as illustrated in FIG. 3B, pin head portion 118 may include a double cone shape. In examples, pin 112 may include a double cone shape to act as a countersunk like screw or bolt to aid in achieving a fit flush with the surface onto which the pin 112 is to be installed. In examples, pin head portion 118 of a pin 112 may be configured to sit flat on a surface of the welding jig when in contact with the welding jig.

In examples, pin head portion 118 may include a substrate contact surface 119. In examples, pin substrate contact surface 119 includes a surface area of pin 112 that is configured to contact with a substrate or pre-bent substrate when the pin support system 110 is in use. Pin substrate contact surface 119 can have any desired size. In examples, pin substrate contact surface 119 may occupy an area ranging from 15 mm² to 60 mm². This range is only an example.

In examples, the pin substrate contact surface 119 can be flat, uneven, rounded, convex, concave, hollow, corrugated, knurled, or any combination thereof as also illustrated in FIG. 3B. Corrugation and/or knurling of the pin substrate contact surface 119 may be accomplished in the same manner as any other surface as described earlier in the discussion of mount system 100.

In examples, the area of pin substrate contact surface 119 of a pin 112 may be the substrate contact area of pin 112. In examples, the substrate contact area of pin 112 may be adjusted or configured to be different or less than from the area of pin substrate contact surface 119. In examples, the substrate contact area of pin 112 may be a portion or fraction of the area of pin substrate contact surface 119 of a pin 112. In examples, a substrate contact area of pin 112 configured to have a pin head substrate contact surface 119 having a surface contour or profile that is uneven, rounded, convex, concave, hollow, corrugated, knurled or any combination thereof may be less than the area of the surface of the pin head substrate contact surface 119. In examples, where pin head substrate contact surface 119 is a uniform, flat or planar surface, that when in use it is configured to be parallel to the surface of a welding jig facing the substrate or pre-bent substrate, and is configured to contact the substrate or pre-bent substrate when pin support system 110 is in use as mount system 100, the substrate contact area of the one pin 112 will correspond to the surface area of pin head substrate contact surface 119. In examples, where pin head substrate contact surface 119 is uneven, rounded, convex, concave, hollow, corrugated, knurled, or not a uniform, flat or planar surface, and/or is not configured to remain parallel to the surface of a welding jig facing a substrate or pre-bent substrate when in use, the substrate contact area of the one pin 112 will be less than the surface area of pin head substrate contact surface 119. In this latter case, the substrate contact area of pin 112 will be only the portion of the surface area of pin head substrate contact surface 119 that, when in use, is configured to contact the substrate or pre-bent substrate.

In examples, pin head portion 118 may include any lateral profile. In examples, the lateral profile of pin head portion 118 may be tapered, straight, stepped, regular, irregular, rounded, planar or flat, or any combination thereof. In examples, as illustrated in FIG. 3B pin head portion 118 may include one or more flat regions 120. In examples, one or more flat regions 120 may be located over at least a portion of the lateral profile of pin head portion 118. In examples, flat regions 120 may aid in the installation of pin 112.

In examples, pin head portion 118 may be configured to be wider than base portion 124. In examples, pin head portion 118 may include a wider pin head portion 118 may be configured to contact a surface of a welding jig when pin 112 is installed. This may allow for more support and improved resilience of pin 112 when a substrate or pre-bent substrate is pressed down onto pin support system 110.

In examples, as shown in FIG. 3B, pin head portion 118 may include an area 121 that may contact or otherwise interface a surface of the welding jig onto which pin 112 is installed. In examples, pin head portion 118 may include a welding jig interface area 121 at an opposite end from where pin head substrate contact surface 119 is located. The interface between pin head portion 118 and a surface of the welding jig may be affected by the contour of the surface of pin head portion 118 that is configured to face a surface of the welding jig when pin 112 is installed onto the welding jig. In examples, the pin head portion 118 may be configured to have a flat, planar, tapered profile along the surface 121 that is intended to interface with the welding jig. In examples, surface 121 is flat and configured to be horizontal to a surface of a welding jig when pin 112 is installed. In examples, surface 121 may be configured so that pin head portion 118 may sit flat on the jig when pin 112 is installed. In examples, the surface 121 of the pin head portion 118 that is intended to interface with the welding jig may be configured to have an uneven, rounded, irregular shape and/or may be knurled, corrugated, or include ridges, troughs or like characteristics as described with respect to pin substrate contact area 119. In examples, having a smooth or better fitting profile at an area 121 of pin head portion 118 configured to interface with welding jig may provide a flush installation. In examples, having a non-smooth, uneven, corrugated, or knurled profile at an area 121 of pin head portion 118 configured to interface with welding jig may provide an additional barrier to heat transfer from pin 112 to the welding jig, and indirectly from substrate or pre-bent substrate to the welding jig. In examples, the welding jig interface areas 121 of all the pins 112 of a pin support system 110 can define a side of pin support system 110.

Figure 3C:
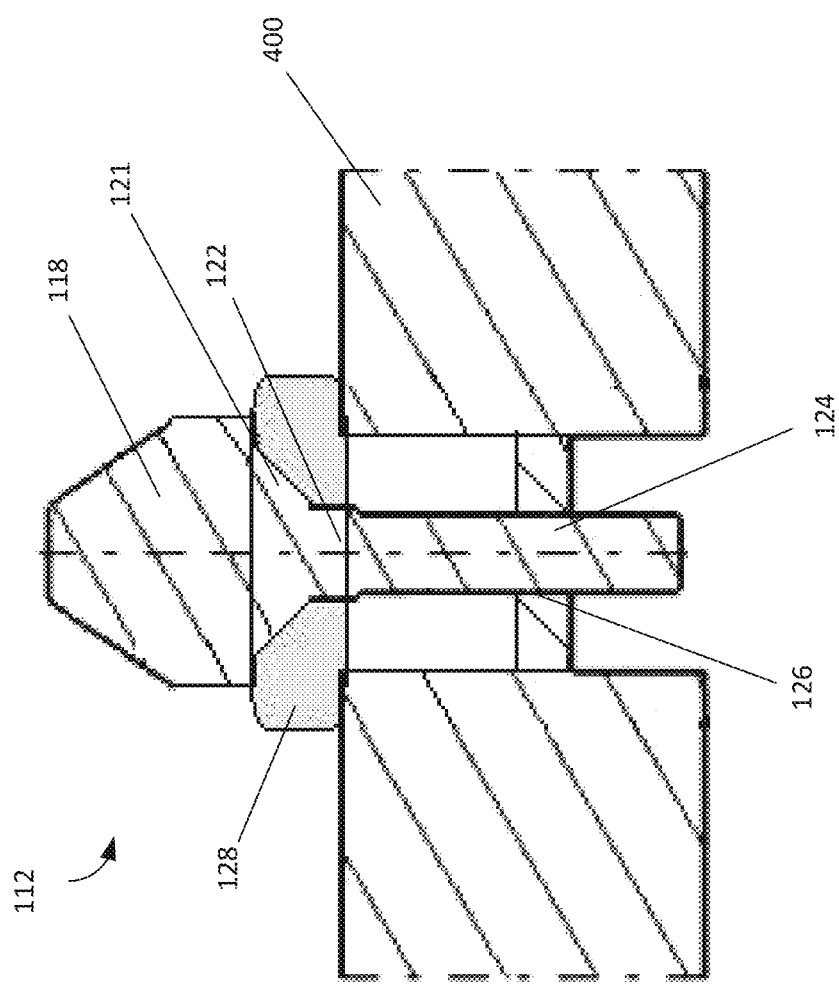

In examples, a pin 112 may include a collar portion 122 located between the pin head portion 118 and the pin base portion 124. In examples, collar portion 122 may be below, proximate to, and/or overlap with welding jig interface area 121. In examples, collar portion 122 may have any desired size and/or profile. In examples, collar portion 122 may have a width or diameter that is different from that of pin base portion 124, pin head portion 118, or both. In examples, collar portion 122 may have a width or diameter ranging from 2 mm to 10 mm, and a length ranging from 5 mm to 10 mm. These size ranges are only an example. In examples, as illustrated in FIG. 3C, collar portion 122 may be configured to accommodate one or more pin spacers 128 to provide support, and/or add thermal insulation between pin head portion 118 and a surface of a welding jig on which pin 112 is installed. In examples, pin spacer 128 may be configured of any size and shape that can fit about collar portion 122. In examples, pin spacer 128 may include a washer, a ring, a plate, or like structure. In examples, pin spacer 128 may include a metal or like material as described for pin or structure 112 or as used for mount system 100. In examples, pin spacer 128 may include a ceramic as described herein. In examples, pin spacer 128 may include metal and ceramic.

In examples, a pin 112 may include a base or engagement portion 124. In examples, base or engagement portion 124 may refer to a portion of a pin 112 that is configured to engage an opening, fitting, bore, or threaded hole of a device to which a pin 112 is to be connected. In examples, base or engagement portion 124 may be configured to have any desired shape and size. In examples, base or engagement portion 124 may have a width or diameter ranging from 2 mm to 10 mm, and a length ranging from 10 mm to 50 mm. These size ranges are only examples. In examples, base or engagement portion 124 of a pin 112 may be configured to engage with a welding jig. In examples, base or engagement portion 124 may be configured to be removably engaged to a structure. In examples, base or engagement portion 124 may be configured to be removably engaged to a welding jig.

Any suitable means can be employed to engage base or engagement portion 124 to the welding jig to allow for installation of a pin 112 onto the welding jig. In examples, base or engagement portion 124 may be configured as a bearing, screw, bolt, or like structure. In examples, the welding jig can provide a suitable opening, fitting, bore, threaded hole or like structure for engaging base or engagement portion 124. In examples, base or engagement portion 124 may be engaged and disengaged from the one or more of a plurality of openings, fittings, bores, threaded holes or like structures provided on a welding jig. In examples, base or engagement portion 124 may be configured to permanently engage a fitting, bore, or threaded hole or like structure provided on a welding jig.

An example of an installed pin 112 onto a welding jig 400 is illustrated in FIG. 3C. As shown, the welding jig 400 may include a bore 126 configured to receive base or engagement portion 124. As also shown, once pin 112 is installed, pin head portion 118 may remain exposed and extending from a surface of welding jig 400.

In examples, base or engagement portion 124 may be engaged directly to a welding jig, to any structure affixed to a surface of a welding jig, or any combination thereof. This allows for flexibility to install one or more pins 112 over any contour. Engagement of a pin 112 onto a structure provided over the surface of a welding jig can be performed in a manner as described with respect to the welding jig. In examples, the added structure may include one or more openings, fittings, bores, or threaded holes or fittings on one or more surfaces thereof. In examples, the bores of fittings may be configured similarly to the bore or threaded hole structure 126 of welding jig 400.

In examples, pin 112 may be configured to allow for an adjustment of the distance between a surface of the welding jig and a portion of the pin head substrate contact surface 119 configured to make physical contact with a substrate or pre-bent substrate when in use. For purposes of this description, the perpendicular, linear distance between the surface of the welding jig facing a substrate or pre-bent substrate, when in use, and the portion of a pin substrate contact surface 119 configured to make physical contact with a substrate or pre-bent substrate when in use will be referred to as the "pin support height" ($h_{pin\ support}$) as illustrated in FIG. 3D.

In examples, pin 112 may be configured to allow adjustment of the pin support height independent of the degree of engagement by base or engagement portion 124. In examples, a pin 112 may be configured to have an extendible and retractable portion. The adjustable portion may be the base or engagement portion 124, the pin head portion 118, or both. In examples, one portion of pin 112 may be configured to slide in and out of another portion of pin 112. In examples, a portion of pin 112 may include a threaded bearing that can extend and retract pin 112 by rotating a first end of the threaded bearing relative to a second end of the threaded bearing. In examples, the base or engagement portion 124 of a pin 112 may be configured to engage a fitting at varying depths. In examples, base or engagement portion 124 of a pin 112 may be configured to include an extended threading configured to secure pin to a threaded fitting of a welding jig at varying depths. In examples, as illustrated in FIG. 3D, as base or engagement portion 124 of pin or structure 112 is rotated in a clockwise direction, it may travel through the treaded fitting in a first longitudinal direction and bring the pin head portion 118 closer to the surface of the welding jig. Conversely, in examples, as base or engagement portion 124 of pin or structure 112 is rotated in a counter-clock direction, it may travel through the treaded fitting in a second longitudinal direction, opposite the first longitudinal direction, and push the pin head portion 118 farther away from the surface of the welding jig. In examples, by translating the pin head portion 118 toward and away from the surface of the welding jig, the pin support height may be adjusted. In examples, one or more spacers 128 may be employed in adjusting a pin support height. In examples, one or more spacers 128 may be introduced between pin head portion 118 and a surface of a welding jig facing the pin head portion 118 as previously described. In examples, one or more spacers 128 may be a washer or like structure configured to fit around collar 122 of a pin 112. In examples, placement of one or more spacers 128 between pin head portion 118 and a surface of a welding jig, as for example shown in FIG. 3C, may cause the pin head portion 118 to be positioned further away from the surface of the welding jig and thus may increase a pin support height. In examples, removal of one or more spacers 128 from a space between pin head portion 118 and a surface of a welding jig may cause pin head portions 118 to be positioned closer to a welding jig surface and thus may decrease a pin support height. In examples, different numbers of spacers 128 may be used for different pins 112 to thus achieve varying pin support heights across an array of pins 112. In examples, spacers 128 may provide additional stability and/or support to pin head portion 118 by filling a space between a pin welding jig interface area 121 and the surface of a welding jig. In examples, spacers 128 may also assist in implementing a uniform pin support height and/or pin support height adjustment. In examples, any combination of the above discussed pin support height adjustment methods may be used.

Figure 3D:
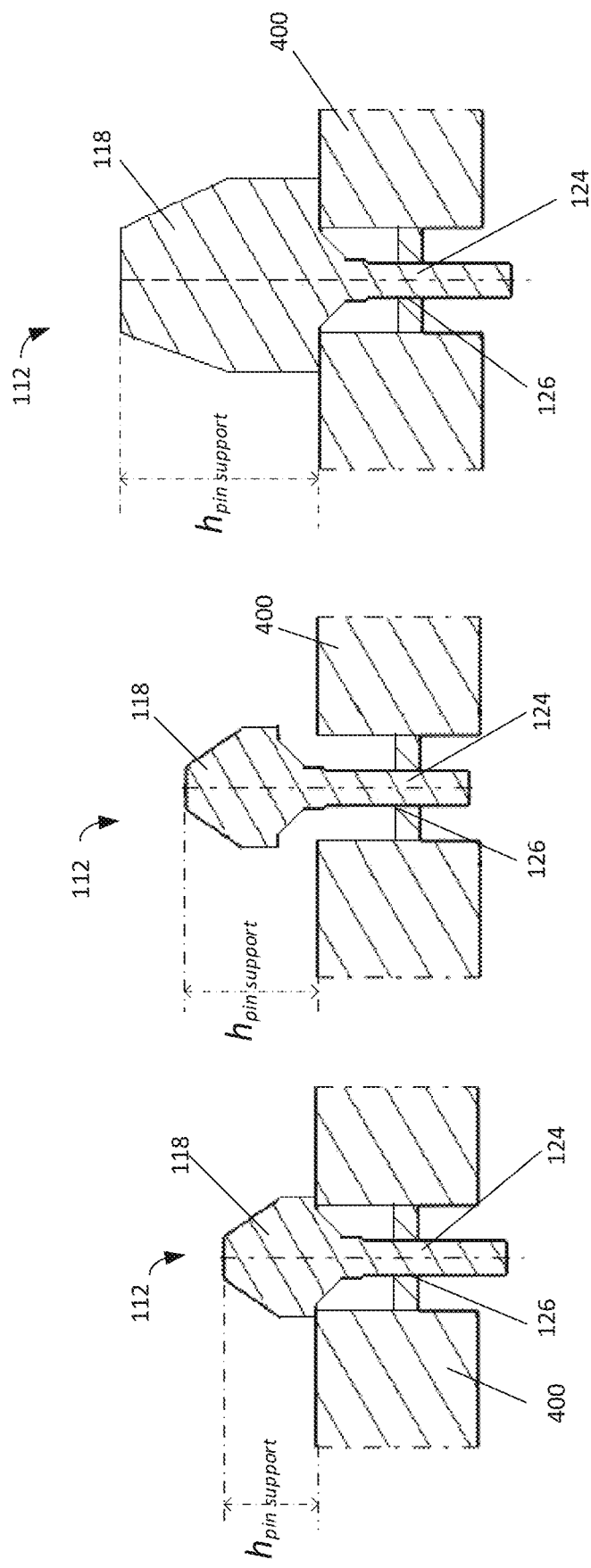

In examples, as illustrated in FIG. 3D, a pin support height of a pin 112 may depend on the size of the pin 112 or of any portion of pin 112. In examples, as illustrated in FIG. 3D, different pins 112 employed in a pin support system 110 may have different sizes and thus different pin support heights.

In examples, a mount system 100 may be implemented using a pin support system 110 by installing one or more pins 112 on a welding jig 400 and/or one or more structures provide over welding jig 400. In examples, the pin support system 110 may include an array of pins 112. An array may be a two or more pins.

a. Multi-Pin Pin Support System

In examples, pin support system 110 may include an array of two or more pins 112. In examples, the array of two or more pins 112 may arranged on a surface of a structure such as a welding jig as previously described. In examples, pin support system 110 can include any number of pins 112. In examples, the total number of pins 112 in a pin support system may be limited by the size of the pins 112, the size of the substrate or pre-bent substrate the pin support system 110 is configured to contact, or a combination of both. Each of the two or more pins 112 can also have any desired size. In examples, the size of one or more pins 112 may be limited by the number of pins employed, the size of the substrate or pre-bent substrate the pin support system 110 is configured to contact, or a combination of both.

Pin support system 110 may be configured to include a predetermined substrate contact interface. In examples, the size and number of pins 112 may affect the aggregate substrate contact area of pin support system 110, and thus affect the substrate contact interface for pin support system 110 as discussed earlier. For purposes of the substrate contact interface for pin support system 110, the substrate interface area may be understood to be substrate interface area 130 as described. In examples, the pin support system 110 may be configured to have an array of pins 112 arranged and configured to result in a controlled substrate contact interface that falls within the range of 0.1 and 20. In examples, the substrate interface of a pin support system 110 for a given substrate interface area 130 may be defined by the number of pins 112, the size of the substrate contact area of the pins 112, or a combination of both. In examples, a pin support system 110 may provide added flexibility in controlling the substrate contact interface by adding or removing pins 112, and/or by replacing one or more pins 112 with one or more pins 112 having a differently sized substrate contact area.

In examples, pin support system 110 may be configured to include a substrate contact interface that is equal to or greater than 0.1, 0.2, 0.3, 0.4, 0.5, 0.6, 0.7, 0.8, 0.9, or 1, and equal to or less than 1, 2, 3, 4, 5, 6, 7, 8, 9, 10, 11, 12, 13, 14, 15, 16, 17, 18, 19, or 20. In examples, pin support system 110 may be configured to have a substrate contact interface in the range of 0.1 and 15, 0.1 and 10, 0.1 and 5, or 0.1 and 1. In examples, pin support system 110 may be configured to have a substrate contact interface in the range of 0.1 and 15, 0.1 and 10, 0.1 and 5, or 0.1 and 1. In examples, pin support system 110 may be configured to have a substrate contact interface in the range of 0.2 and 20, 0.2 and 15, 0.2 and 10, 0.2 and 5, or 0.2 and 1. In examples, pin support system 110 may be configured to have a substrate contact interface in the range of 0.3 and 20, 0.3 and 15, 0.3 and 10, 0.3 and 5, or 0.3 and 1. In examples, pin support system 110 may be configured to have a substrate contact interface in the range of 0.4 and 20, 0.4 and 15, 0.4 and 10, 0.4 and 5, or 0.4 and 1. In examples, pin support system 110 may be configured to have a substrate contact interface in the range of 0.5 and 20, 0.5 and 15, 0.5 and 10, 0.5 and 5, or 0.5 and 1. In examples, pin support system 110 may be configured to have a substrate contact interface in the range of 0.6 and 20, 0.6 and 15, 0.6 and 10, 0.6 and 5, or 0.6 and 1. In examples, pin support system 110 may be configured to have a substrate contact interface in the range of 0.7 and 20, 0.7 and 15, 0.7 and 10, 0.7 and 5, or 0.7 and 1. In examples, pin support system 110 may be configured to have a substrate contact interface in the range of 0.8 and 20, 0.8 and 15, 0.8 and 10, 0.8 and 5, or 0.8 and 1. In examples, pin support system 110 may be configured to have a substrate contact interface in the range of 0.9 and 20, 0.9 and 15, 0.9 and 10, 0.9 and 5, or 0.9 and 1.

In examples, pin support system 110 can be configured to include a first side 111 and a second side defined by the one or more pins 112. In examples, a first side of pin support system 110 may correspond to the side where the one or more pins 112 interface with the welding jig. In examples, one or more pins 112 may define a curved profile 102 as previously described. In examples, the curved profile 102 may be on a second side 113 of pin support system 110 opposite the first side. In examples, second side 113 is also the side where substrate contact interface 130 of pin support system 110 is provided or defined. In examples, the curved profile 102 may be defined by one or more pins 112 on a side of pin support system 110 that is configured to face a substrate or pre-bent substrate when in use. In examples, where pin support system 110 includes two or more pins 112, the curved profile 102 can be a plane defined by a distal end of the two or more pins 112 as discussed with reference to FIG. 2A where the two or more pins 112 are represented by elements or structures 101. In examples, the distal end of a pin 112 for purposes of defining a curved profile of FIG. 2A may include at least a portion of pin substrate contact surface 119 that is configured to physically contact a substrate or pre-bent substrate when in use. In examples, the area of mount system 100 configured to receive a substrate or pre-bent substrate when mount system 100 is implemented as pin support system 110 can be defined by one or more pins or pins structures 112 arranged to define a peripheral region of a pattern when installed on the welding jig.

In examples, it may be possible to arrange one or more pins 112 in any desirable manner. In examples, the one or more pins 112 may be configured to be arranged to have varying pin support heights. In example, at least one or more pins 112 may be configured to have pin support height that is greater than the pin support height of at least one other pin 112. In examples, the pin support height of one pin 112 may be differentiated by the pin support height of at least one other pin 112 by using pins 112 configured to have adjustable pin support heights as discussed earlier, by using pins 112 having different sizes, or a combination of both.

In examples, two or more pins 112 of a pin support system 110 may be arranged to define a curved profile 102 as previously described. In examples, a pin support system 110 may be configured to include one or more pins 112 having a first pin support height arranged on a welding jig at a first location, and one or more pins 112 having a second pin support height arranged on a welding jig at a second location. In examples, the first pin support height is different from the second pin support height. In examples, the first pin support height is smaller than the second pin support height. In examples, the one or more pins 112 with a smaller pin support height are arranged to surround the one or more pins 112 with the greater pin support height. In examples, pin support system 110 may include one or more pins having a third pin support height. The third pin support height may be different from the first and second pin support heights. In examples, pin support system 110 may include any number of of one or more pins 112 of varying pin support height. In examples, pin support system 110 may include an array of pins 112 arranged in a pattern, wherein one or more pins 112 located at a peripheral region of the pattern have a pin support height that is smaller than the pin support height of one or more pins 112 located at central region of the pattern. In examples, the pin support system 110 may include an array of pins 112 arranged in a pattern such that a pin support height gradually increases from a peripheral region of the pattern to a center region of the pattern. In examples, the gradual increase of a pin support height toward a center region of a pattern of arranged pins 112 can define a curved profile 102 over which a substrate or pre-bent substrate can be clamped.

Figure 3E:
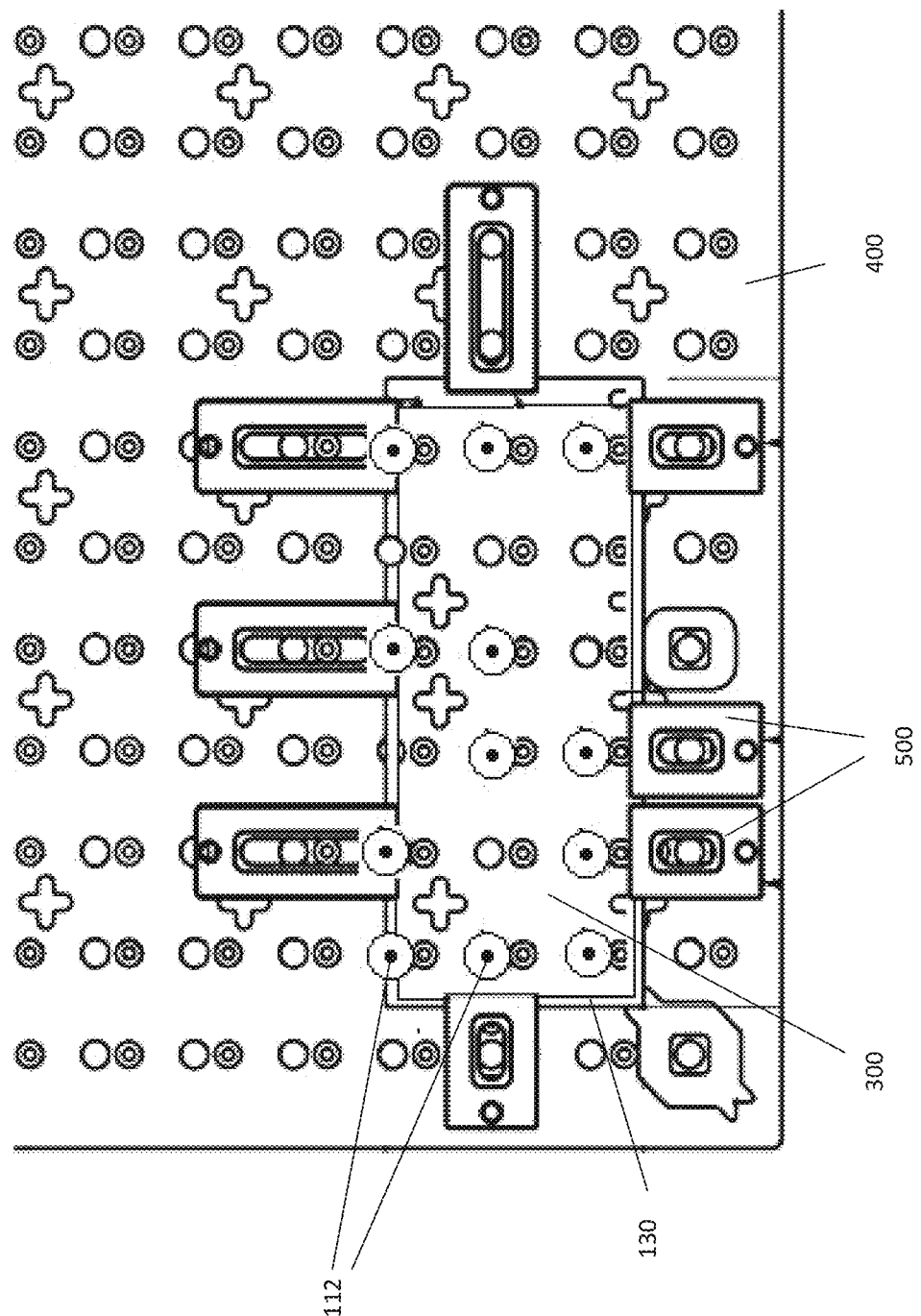
Figure 3F:
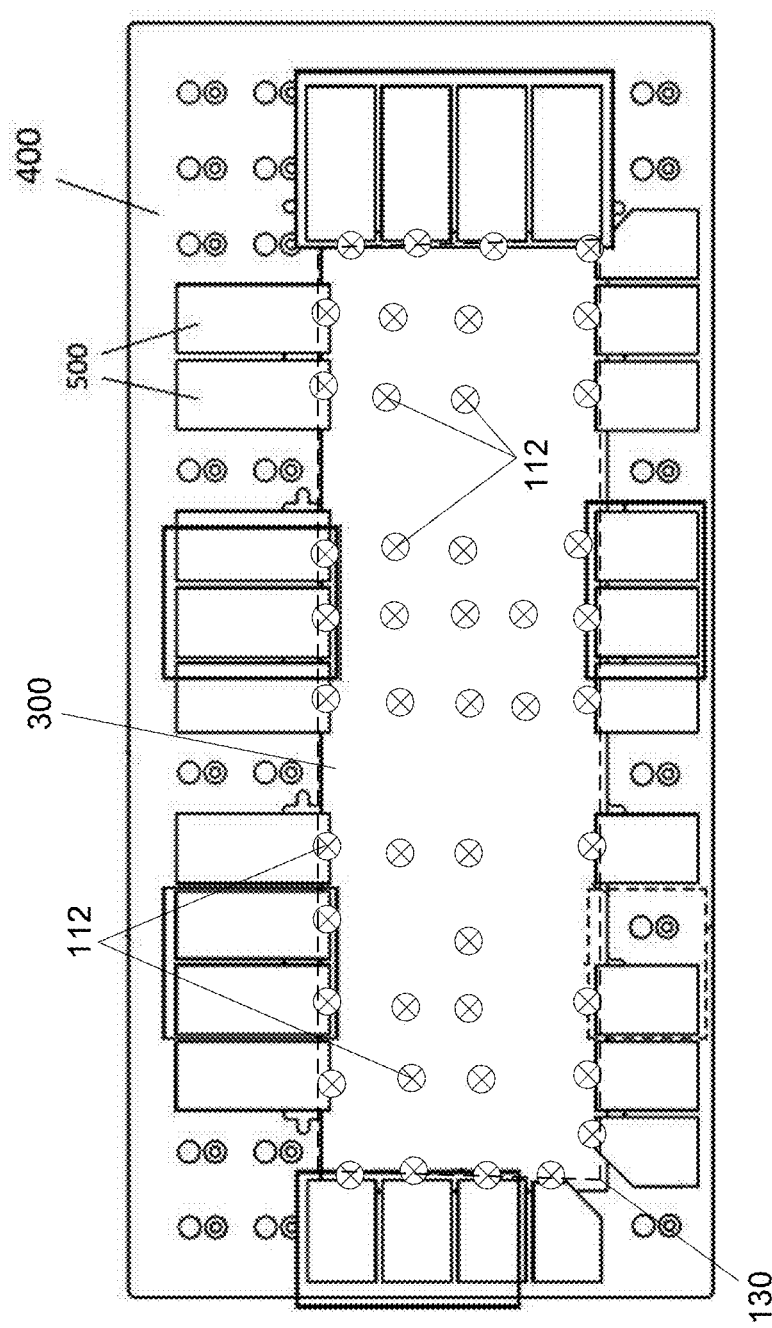

FIGS. 3E-3H, illustrate example implementation of a pin support system 110 as a mount system 100 previously described. FIGS. 3E and 3F, illustrate top down views of examples of a pin support system 110 including an array of pins 112 arranged to define a substrate interface area 130. In examples, the substrate interface area of pin support system 110 is larger than the physical surface area of pin support system 110 configured to face a substrate or pre-bent substrate when pin support system 110 is in use. In examples, the physical surface area of pin support system 110 is limited to the surface of the one or more pins 112 that constitute the pin support system 110, while the substrate interface area 130 should be understood to be the area on one side of support system 110 that is intended to be occupied by a substrate or pre-bent substrate when pin support system 110 is in use. In examples, as illustrated, one or more pins 112 that are part of pin support system 110 may be arranged to delineate a perimeter or the boundaries of the substrate interface area 130 intended for a pin support system 110. In examples, it may be possible to reconfigure the boundaries of substrate interface area 130 of a pin support system 110 by rearranging one or more pins 112. In examples, the one or more pins 112 of pin support system 110 that define the boundaries of substrate interface area 130 may be those one or more pins 112 located at a periphery of the set or cluster of one or more pins 112. In examples, pins 112 at a peripheral region of substrate interface area 130 may be proximate to where clamps 500 are meant to be placed. This may allow for clamping of the substrate or pre-bent substrate when pin system 110 is in use. In examples, pins 112 may also be located at a central region to provide support a center portion of the substrate or pre-bent substrate 300. In examples, the pins 112 located closest to claims 500 may be configured to have or adjusted to have a pin support height that is smaller than a pin support height of the pins 112 located in a center portion of substrate interface area 130. As illustrated in FIGS. 3E and 3F, pins 112 in pin support system 110 may be provided in different numbers, at different arrangements, at different spacing, or any combination thereof to accommodate different sizes of substrates or pre-bent substrates.

In examples, the curved profile achieved by the one or more pins 112 of pin support system 110, can be similar to a curved profile of an integral structure such as a lattice or mold structures discussed below. In examples, measuring from the surface of a welding jig, the one or more pins 112 may be arranged and their pin support height adjusted or selected to define a curved profile 102 having a height measured at or near the center of the curved profile 102 in the range of from about 3 mm to about 60 mm, or from about 12 mm to about 50 mm, or from about 15 mm to about 45 mm. Likewise, the one or more pins 112 of pin support system 110 may be selected and/or adjusted to have a pin support height so that the height of the curved profile measured from the welding jig surface facing the pre-bent substrate when in use, at or near the outer edges of the curved profile 102 to be in the range of from about 0.5 mm to about 55 mm, or from about 3 mm to about 45 mm, or from about 10 mm to about 40 mm. In examples, the thickness profile of the curved profile defined by the one or more pins 112 of pin support system 110 when viewed from the side has the greatest height in the center of the curved profile, of the substrate interface area 130 defined by the one or more pins 112, or both, and the height may gradually be reduced toward the outer edges or periphery of the substrate interface area 130 to from a curved surface. In examples, the differences in height across the cross-section of the pin support system 100 may result in a concave downward curve. In cross-section when viewed from the side, the shape of the curved profile defined by pin support system 110 can resemble an upper half of an ellipse whose semi-minor axis is much smaller than its semi-major axis. The ellipse can have an eccentricity close to, but less than 1 (an eccentricity of 1 would be a flat surface).

Figure 3G:
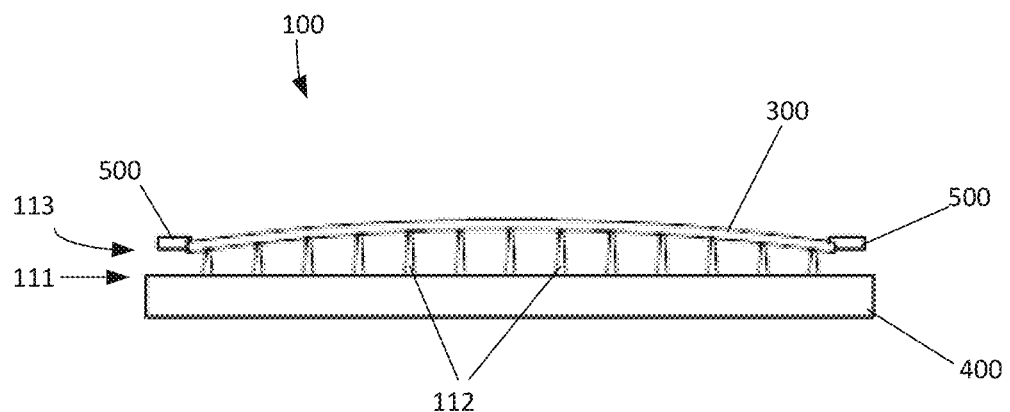
Figure 3H:
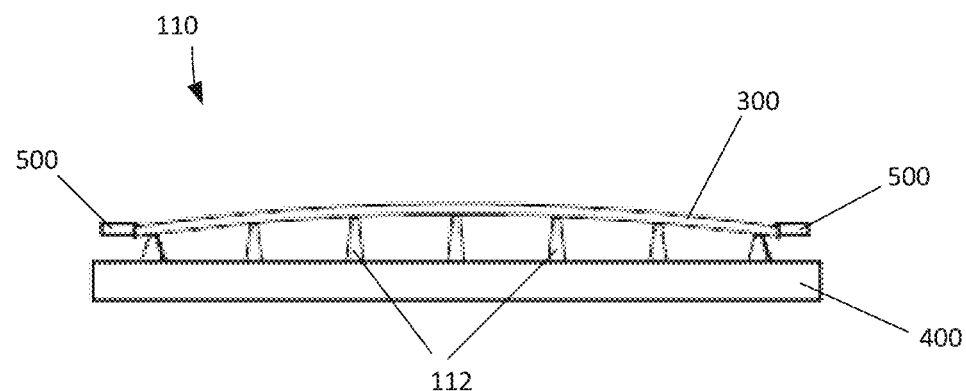
Figure 3I:
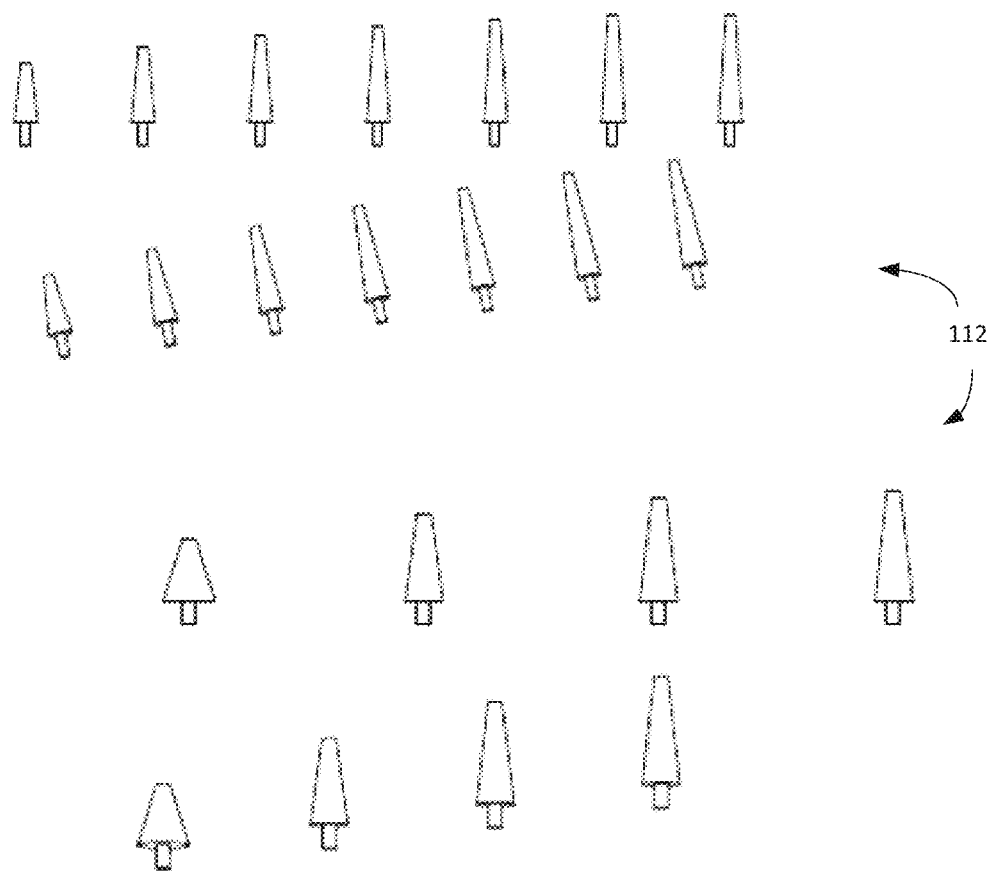

FIGS. 3G and 3H, illustrate a schematic side views of a pin support system 110 including an array of pins 112 while in use, provided on a welding jig 400 with a substrate or pre-bent substrate 300 clamped thereon by clamps 500. As illustrated in FIGS. 3G and 3H, pin support system 110 may be implemented using varying number of pins 112. FIG. 3I illustrates additional examples of pins 112 having different shapes and sizes that may be used in pin support system 110.

Figure 3J:
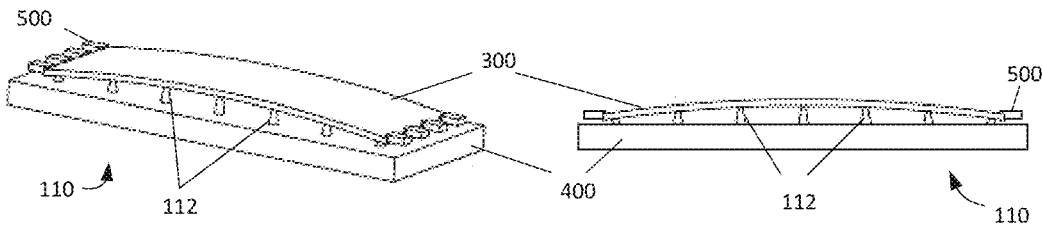
Figure 3K:
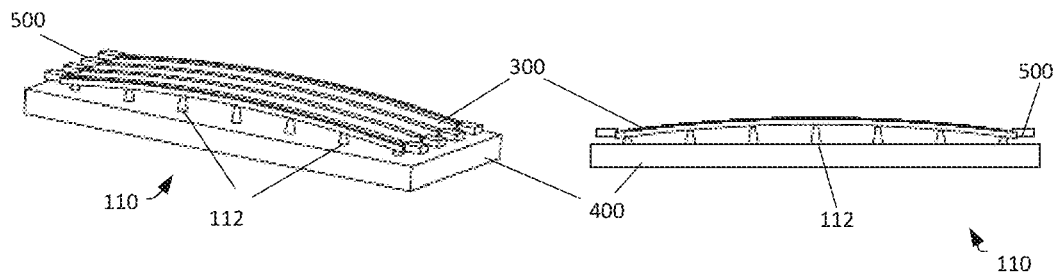
Figure 3L:
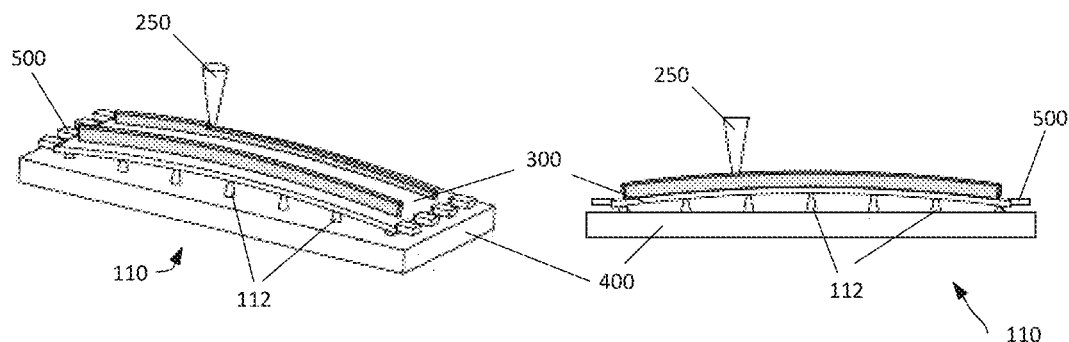
Figure 3M:
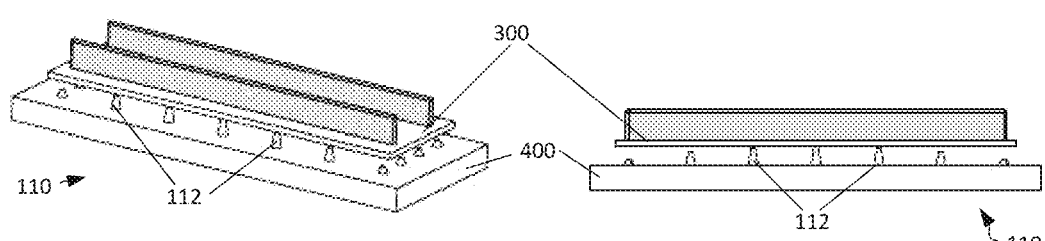

FIGS. 3J-3M, illustrate a schematic cross-section side view of a DED manufacturing process using a pin support system 110, as mount system 100. In examples, clamps 500 may be arranged along the full perimeter of substrate or pre-bent substrate 300. In the figures, claims 500 are only shown at the ends because these are cross-section side view diagrams to illustrate the pin support system 110 that would otherwise be covered by pre-bent substrate 300 and clamps 500. As illustrated, at FIG. 3J, a pre-bent substrate 300 may be clamped, using clamps 500, onto a pin support system 110 including one or more pins 112 arranged on a welding jig 400. As illustrated at FIG. 3J, the array of pins 112 of the pin support system 110 can be configured and arranged to provide a curved profile over which substrate or pre-bent substrate 300 is placed. In examples, one or more claims 500 may exert sufficient pressure onto the substrate or pre-bent substrate to cause it to conform to the curved profile defined by the array of pins 112. The pre-bent substrate 300 may then be heat treated as illustrated at FIG. 3K. In examples, after the heat treatment, the DED manufacturing may proceed as illustrated in FIG. 3L, with depositing one or more layers using a deposition apparatus, for example, a plasma arc torch 250. Upon completion of the deposition process, clamps 500 may be removed as illustrated in FIG. 3M. As illustrated, using the pin support system 110 as mount system 100 in conjunction with the distortion mitigation process as described herein, the resulting workpiece is expected to have an improved profile.

As discussed earlier for mount system 100, in examples, the nominal deflection provided by pin support system 110, $h_{pin\ support}$ (bow) may be the difference between the maximum height at the center of curved profile 102, measured from a surface of the welding jig when pin support system 110 is installed on the welding jig, and the upper surface of an edge or peripheral rim portion 104 of the curved profile 102, as illustrated in FIG. 2A. In FIG. 2A, the difference between the maximum height 198 of the curved profile 102 and an edge or peripheral rim portion 104 is $h_{pin\ support}$. The length ratio Lr and a surface interface area defined 130 by pin support system 110 is the ratio between the new x dimension of the surface area defined by pin support system 110 $L_i$ and the original length $L_0$ of the surface area defined by pin support system 110. The predicted maximum pin support system 110 deflection $h_{Lr}$ is approximately proportional to the product between the nominal deflection $h_{pin\ support}$ and the square of the length ratio Lr of the surface area defined by pin support system 110, which may be calculated according to the formula:

$$L_r = L_i/L_0$$

and thus $$h_{Lr} \approx h_{pin\ support} \times L_r^2.$$

Hence, for example, for a pin support system 110 defining a surface interface area 130 with xy dimensions of 635 mm×190 mm (L×W), the predicted maximum deflection $h_{Lr}$ is about 3.8 mm. A longer defined surface area, such as one with xy dimensions of 1905 mm×635 mm would have a length ratio of three ($L_r$=1905/635=3) and a maximum deflection $h_{Lr}$ of 3.8×3²–34.2 mm. The nominal deflection can be from about 3 mm to about 35 mm. The amount of deflection of the thus can depend on the characteristics of the pin support system 110. The longer the surface interface area 130 defined by pin support system 110 needs to be to accommodate a longer substrate, the higher/larger the deflection will need to be.

b. Single-Pin Pin Support System

In examples mount system 100 may be implement as a single-pin pin support system 110. In examples, a single-pin pin support system may include a single pin 112 as described. In examples, where pin support system 110 is a single-pin pin support system, pin support system 110 may include a first side to interface or face the welding jig as described for pins 112 when installed and a second side having or defining a curved profile 102. In examples, the curved profile 102 can be the profile of a top surface of the single pin 112. In examples, where pin support system 110 is a single pin, the pin may be configured to include a curved, physically modified surface configured to be directed away from the jig when installed on the jig as described with respect to curved clamping mold 170 discussed below. The pin in a single-pin pin support system may include a pin head 118 having center portion that is thicker than at the edges as described, including the dimensions, for clamping mold 170. Also, similar to clamping mold 170, a pin used in single-pin pin support system may include a first side having a peripheral rim. In examples, the peripheral rim may have a flat or planar surface at least on one side. In examples, as discussed for clamping mold 170, in the case of a single-pin pin support system, the pin may include a structure configured to have a surface contact interface that falls within the range of 0.1 to 20 or any subrange thereof as discussed. Also, similar to the description of curved clamping mold 170, a single-pin pin support system 110 can include one or more ceramic coating, and/or bond coating, and exhibit the same or similar nominal deflection as described for curved clamping mold 170.

2. Lattice Support Structure

In examples, mount system 100 may include as a lattice support structure 150. Examples of lattice support structure 150 are illustrated in FIGS. 4A-4D. In examples, a lattice support structure 150 may include framework or structure of one or more metallic elements 151. In examples, lattice support structure 150 may be a frame.

In examples, the metallic elements 151 can be any desired shape and size. In examples, the metallic elements can be oblong, spherical, cubic, trapezoidal, have a regular or irregular shape, and any combination thereof. In examples, the metallic elements 151 of lattice support structure 150 include strips, rods, bars, or like structures. As illustrated in the schematic perspective view provided in FIG. 4A, top-down view in FIG. 4B, and side view in FIG. 4C of a lattice support structure 150, metallic elements 151 may have a uniform shape and size, different shapes and sizes, any combination thereof.

In examples, metallic elements 151 that make up lattice support structure 150 may have any arrangement. As illustrated, metallic elements 151 are perpendicular and parallel to each other. In examples, the metallic elements 151 may be diagonal to each other, or randomly arranged. The metallic elements 151 may be connected to each other by any known fastener such as bolts, screws, brackets, pins, bearings or like structures. In examples, metallic elements 151 may be attached to each other by welding, fusion, or adhesives. In examples, metallic elements 151 may be all part of one integral, contiguous structure. In examples, lattice support structure 150 may include any one or more of the above mentioned arrangements of metallic elements 151, connected to each other in any one or more described manners and/or as part of an contiguous, integral structure.

Lattice support structure 150 may be configured to include a predetermined substrate contact interface. In examples, lattice support structure 150 may be configured to have a substrate contact interface ranging from 0.1 to 20. In examples, lattice support structure 150 may be configured to include a substrate contact interface that is equal to or greater than 0.1, 0.2, 0.3, 0.4, 0.5, 0.6, 0.7, 0.8, 0.9, or 1, and equal to or less than 1, 2, 3, 4, 5, 6, 7, 8, 9, 10, 11, 12, 13, 14, 15, 16, 17, 18, 19, or 20. In examples, lattice support structure 150 may be configured to have a substrate contact interface in the range of 0.1 and 15, 0.1 and 10, 0.1 and 5, or 0.1 and 1. In examples, lattice support structure 150 may be configured to have a substrate contact interface in the range of 0.1 and 15, 0.1 and 10, 0.1 and 5, or 0.1 and 1. In examples, lattice support structure 150 may be configured to have a substrate contact interface in the range of 0.2 and 20, 0.2 and 15, 0.2 and 10, 0.2 and 5, or 0.2 and 1. In examples, lattice support structure 150 may be configured to have a substrate contact interface in the range of 0.3 and 20, 0.3 and 15, 0.3 and 10, 0.3 and 5, or 0.3 and 1. In examples, lattice support structure 150 may be configured to have a substrate contact interface in the range of 0.4 and 20, 0.4 and 15, 0.4 and 10, 0.4 and 5, or 0.4 and 1. In examples, lattice support structure 150 may be configured to have a substrate contact interface in the range of 0.5 and 20, 0.5 and 15, 0.5 and 10, 0.5 and 5, or 0.5 and 1. In examples, lattice support structure 150 may be configured to have a substrate contact interface in the range of 0.6 and 20, 0.6 and 15, 0.6 and 10, 0.6 and 5, or 0.6 and 1. In examples, lattice support structure 150 may be configured to have a substrate contact interface in the range of 0.7 and 20, 0.7 and 15, 0.7 and 10, 0.7 and 5, or 0.7 and 1. In examples, lattice support structure 150 may be configured to have a substrate contact interface in the range of 0.8 and 20, 0.8 and 15, 0.8 and 10, 0.8 and 5, or 0.8 and 1. In examples, lattice support structure 150 may be configured to have a substrate contact interface in the range of 0.9 and 20, 0.9 and 15, 0.9 and 10, 0.9 and 5, or 0.9 and 1.

In examples, lattice support structure 150 may include a peripheral region 154 as illustrated defining a boundary of a substrate interface area 155 (represented in broken line) of lattice support structure 150. In examples, the substrate interface area of lattice support structure 150 may be different from, for example smaller than, the surface area defined by peripheral region 154. As discussed earlier, the substrate interface area should be understood as the area configured to be overlaid by a substrate or pre-bent substrate when lattice support structure 150 is in use.

Figure 4A:
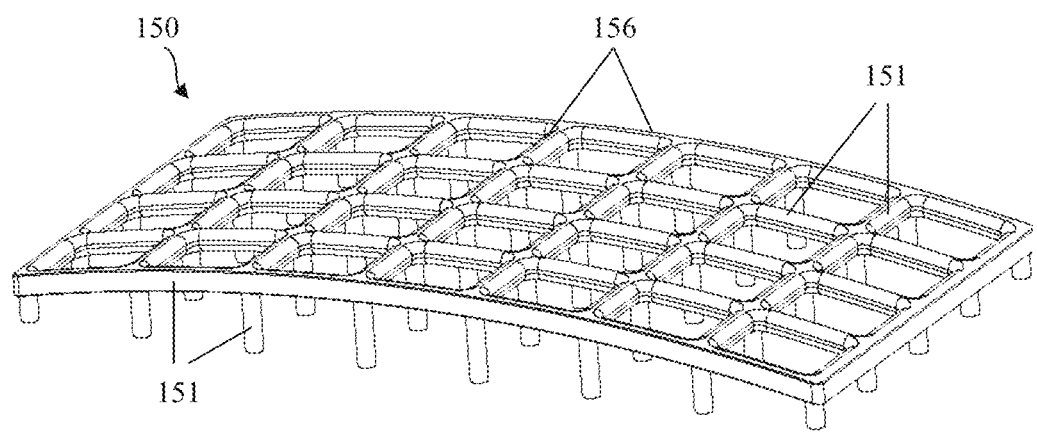
FIGS. 4A-4D illustrate examples of a mount system implemented as examples of lattice support structures as described herein.
Figure 4B:
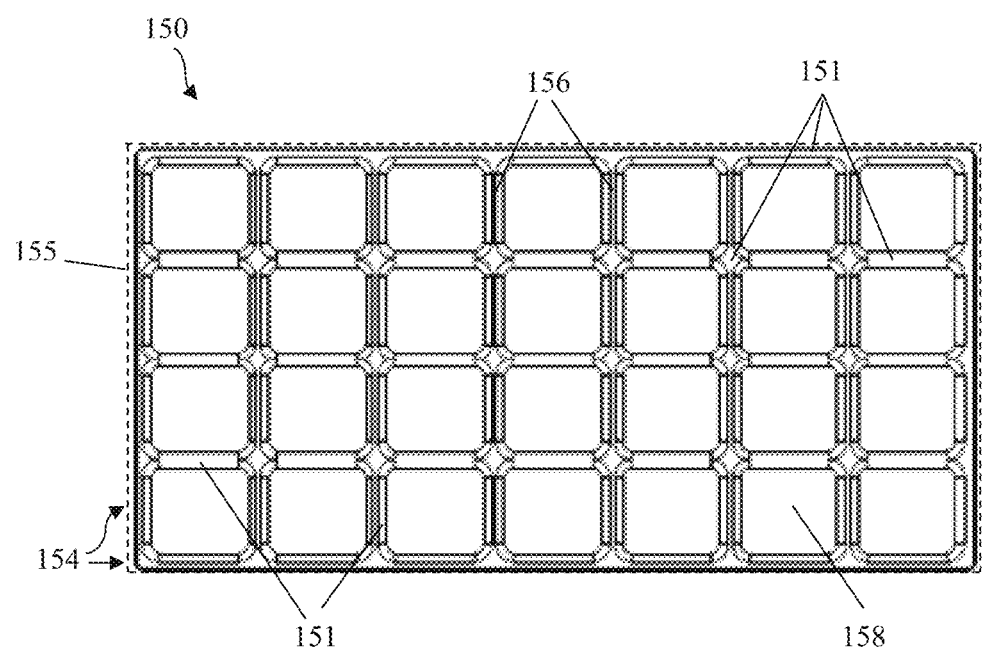

In examples, the substrate contact interface of a lattice support structure 150 for a given substrate interface area may be controlled by the configuration of the metallic elements that define the substrate contact surface of lattice support structure 150. In examples, the lattice support structure 150 may be configured to include an greater or lower number of metallic elements of one or more sizes and at different spaced apart at varying degrees across at the surface configured to interface with a substrate or pre-bent substrate. By controlling the number, size, and spacing of the metallic elements of lattice support structure 150 that are intended to contact the substrate or pre-bent substrate during use, it may be possible to affect the overall substrate contact area of lattice support structure 150. In examples, the substrate contact area of the one or more elements of the lattice support structure 150 may be affected. In examples, the substrate contact surface of the one or more elements 151 of the lattice support structure 150 configured to be uneven, squared, rounded, concave, convex, irregular, planar, non-planar or any combination thereof. For example, as illustrated in FIGS. 4A-4B, metallic elements 151 may have a tapered profile defining an element substrate contact surface 156 that is narrower than the overall width of the element. In examples, a narrower element substrate contact surface 156 may result in a reduced substrate contact area. In examples, the area of the element substrate contact surface 156 may be equal to that element substrate contact area. In examples, the substrate contact area of the element substrate contact surface 156 of one or more elements 151 of the lattice support structure 150 may smaller than the area of the element substrate contact surface 156. In examples, the element substrate contact surface 156 may be knurled, corrugated, or otherwise include ridges and troughs as described herein. In examples, these surface effects may reduce the substrate contact area of a substrate contact surface 156 of an element 151 by preventing a substrate or pre-bent substrate to fully contact the substrate contact surface 156 of an element 151. In examples, the substrate contact surface 156 of the one or more elements of the lattice support structure 150 may include one or more protrusions configured to distance a surface of a clamped substrate or pre-bent substrate from one or more portions of the substrate contact surface 156 of the element 151. Any of these surface effects on the surface contact surface of one or more elements of lattice support structure 150 may be employed to affect the substrate contact area and thus the substrate contact interface of lattice support structure 150.

In examples, lattice support structure 150 may include one or more cavities 158 that may create one or more void areas within the lattice support structure 150. As previously explained, it may be possible to allow gaps or voids to be filled with the atmosphere of the DED chamber, or a noble gas, such as argon, which can act as a thermal insulator. Also, these gaps and voids provide solid/gas/solid interfaces that are considerably less heat conductive. Thus, these interfaces between pre-bent substrate/argon gas/mount system and/or welding jig may effectively work as thermal barriers. Accordingly, in examples, the one or more gaps or voids also can help to minimize the average heat transfer coefficient between the substrate or pre-bent substrate and the welding jig. In examples, this may help maintain more heat in the pre-bent substrate, thereby further reducing uneven temperature distribution and reducing thermal stresses in the pre-bent substrate.

In examples, the lattice support structure 150 may provide the advantage that it includes a design that requires a reduced the amount of material to fabricate. This can be cost effective, while still maintaining the physical stability of an integral, freestanding structure. In addition to cost saving achieved by reducing the amount of the non-magnetic metal needed for fabrication, the lattice configuration of the lattice support structure 150 at the interface with the welding jig may limit the surface contact area between the lattice support structure 150 and the welding jig. In examples, the lattice support structure 150 may be configured to contact welding jig only at one or more elements 151 of the lattice structure that define the interface between lattice support structure 150 and the welding jig. In examples, the contact interface between the lattice support structure 150 the welding jig may be configured as desired in the same manner the substrate contact interface of lattice support structure 150 may be configured as discussed earlier. In examples, the lattice support structure 150 may be configured to include one or more elements 151 configured to engage a surface of a welding jig. For examples, one or more elements 151 may be configured as protrusions, as for example illustrated in FIGS. 4A, 4C and 4D. In examples, protruding elements 151 may be configured to mate with one or more fittings, openings, bores, or like structure provided on a welding jig. In examples, reduced contact interface with the welding jig may reduce conduction heat transfer from the lattice support structure 150 to the jig while maintaining rigidity. This reduction in heat transfer may also contributes to heat retention in the pre-bent substrate, minimizing loss to the welding jig.

Figure 4C:
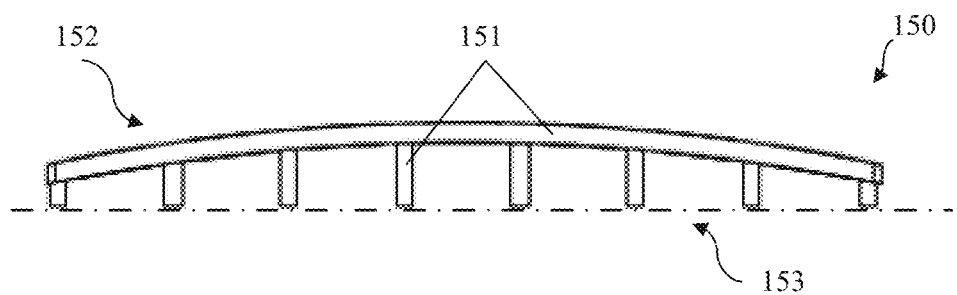
Figure 4D:
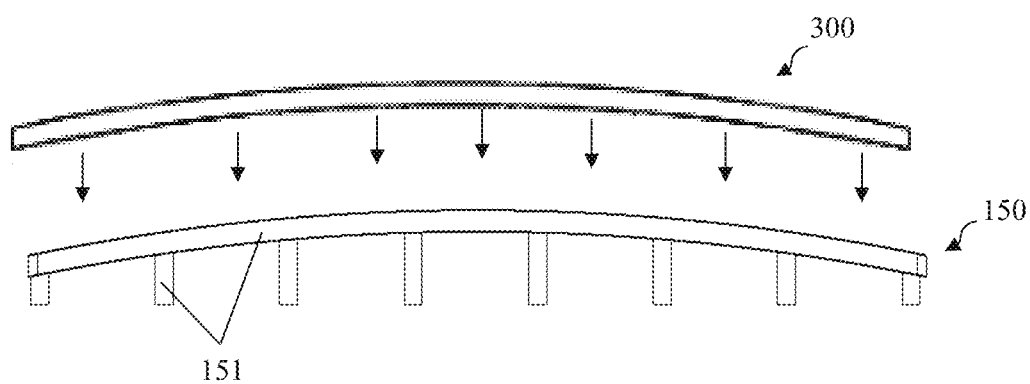

In examples, lattice support structure 150 may define a first, generally planar, even, or flat side 153, as for example, illustrated by the broken line in FIG. 4C, configured to be directed toward the welding jig. In examples, lattice support structure 150 may define a second side having curved profile ("curved side") 152. The curved side 152 of lattice support structure 150 can be directed away from the jig and toward and positioned against the pre-bent substrate. The lattice support structure 150 may also include a peripheral region 154. One or more clamps can be used to secure the pre-bent substrate to the jig. This can result in the substrate or pre-bent substrate being pressed toward the jig, so the forces necessary to secure the substrate or pre-bent substrate to the jig will be between the clamps and the jig, with the lattice support structure 150 as a support between the substrate and the jig. In embodiments, the pre-bent substrate is pressed axially downward.

In examples, the backside (first side) of pre-bent substrate, on which the melting tracks can be present, may be positioned so that it faces the side of the lattice support structure 150 (facing away from the jig (the second side)). In this configuration, the backside of the pre-bent substrate is facing downward toward the curved surface of the lattice support structure 150 and the jig. One or more clamps can secure the pre-bent substrate to the jig, with the lattice support structure 150 between the pre-bent substrate and the jig as previously discussed.

The lattice support structure 150 may be configured to have a greater thickness at a center portion than at the edges, resulting in a curved surface having the greatest height near the center of the curved surface. In embodiments provided herein, the height of the lattice support structure 150 measured at or near the center of the lattice support structure 150 can be in the range of from about 3 mm to about 60 mm, or from about 12 mm to about 50 mm, or from about 15 mm to about 45 mm. The height of the lattice support structure 150 measured at or near the outer edges of the lattice support structure 150 can be in the range of from about 0.5 mm to about 55 mm, or from about 3 mm to about 45 mm, or from about 10 mm to about 40 mm. In examples, the thickness profile of the lattice support structure 150 when viewed from the side has the greatest height in the center of the lattice support structure 150, and the height may gradually be reduced toward the outer edges to from a curved surface. In examples, the differences in height across the cross-section of the lattice support structure 150 may result in a concave downward curve in the top surface of the lattice support structure 150. In cross-section when viewed from the side, the shape of the lattice support structure 150 can resemble an upper half of an ellipse whose semi-minor axis is much smaller than its semi-major axis. The ellipse can have an eccentricity close to, but less than 1 (an eccentricity of 1 would be a flat surface).

The lattice support structure 150 can be constructed from any metal having sufficient strength and temperature resistance for use under typical conditions of DED processing as previously mentioned. In examples, one or more elements of lattice support structure 150 may include a material that is the same or different from the material of at least one other element of the lattice support structure 150.

As discussed earlier, in examples, no ceramic sheet, plate, or pylon and/or ceramic coating is used in the implementation of mount system 100. In examples, the lattice support structure 150 is free of ceramic sheets or pylon, of ceramic coating, or both. In examples, lattice support structure 150 may include a ceramic coating as described. In examples, lattice support structure 150 may be used with a ceramic sheet, plate, or pylon.

In examples, the thickness of the lattice support structure 150 can be designed to mimic or provide the same or similar thermal insulative properties achieved with sheets of ceramic insulation conventionally used in DED processes. For example, one or more sheets or plates of alumina ($Al_2O_3$) insulation are used in conventional DED processes to thermally separate the substrate from the clamping fixture platform, such as the jig. The conventional use of insulation sheets is to reduce the potential risk of thermal damage to the jig, while contributing to a more homogeneous temperature distribution during the DED process. Although the thickness of the sheets or plates can vary, conventionally used sheets can be about 3 mm to 3.5 mm thick. In conventional DED processes, multiple sheets of ceramic insulation sheets can be used. For example, in some conventional processes, about 4 sheets or plates of ceramic insulation are used to provide a layer of about 12 mm of insulation. More or fewer ceramic insulation sheets can be used conventionally. These alumina insulation plates can be cut to size. However, doing so can release particles of alumina that can cause respiratory tract or eye irritation. Alumina insulation sheets also tend to be hygroscopic and initially can release water vapor during the heat temperature of the DED process, which can result in fluctuations in the deposition environment during processing, which is undesirable. The ceramic insulation sheets conventionally used between a substrate and jig also have to be discarded after use due to their brittleness and fragility, thus representing a consumable that adds to the cost of DED manufacturing.

In examples, lattice support structure 150 can be used in combination with conventional ceramic insulation plates. The lattice support structure 150 can replace traditional ceramic insulation plates and provide similar thermal insulation while maintaining the same height so that minimal changes to the setting of the melting tool(s) providing a thermal source or CAD-CAM path planning defining the piece to be made by DED needs to be made. As discussed above, there is no physical limitation to the thickness of the lattice support structure 150, other than machine-dependent operating constraints. For example, the DED systems' height stroke can dictate the thickness of the lattice support structure 150 used. The thickness of the lattice support structure 150 can be selected to maximize heat flow reduction at the lattice support/jig interface while allowing sufficient clearance for manufacture of the workpiece based on the height stroke of the system.

In examples, lattice support structure 150 can include a ceramic coating. For example, a ceramic coating can be applied on the surface of the lattice support structure 150 that faces the DED substrate. As previously discussed, the ceramic coating can be applied directly to the curved surface, or the ceramic coating can be applied to a bond coat that is directly applied to the second curved surface. A ceramic coating can be applied directly to either surface of lattice support structure 150 with or without a bond coat. In examples, the ceramic coating can provide thermal insulation to minimize or prevent thermal contact between the lattice support structure 150 and the substrate or pre-bent substrate.

The process and characteristics of ceramic coatings that may be applied to a mount system 100 were previously described and equally apply to lattice support structure 150. Also, as previously discussed, in examples, mount system 100 may include a bond coat. Likewise, in examples, lattice support structure 150 may include a bond coat as previously described.

In examples, mount system 100 may include a corrugated surface and/or a knurled surface. In a similar manner, in examples, to further minimize or prevent thermal communication between the lattice support structure 150 and the pre-bent substrate, the portion the lattice support structure 150 that define the curved surface of the lattice support structure 150 and come into physical contact with a substrate and/or pre-bent substrate when in use, can be physically modified.

A knurled surface can be cut into the portion of lattice support structure 150 configured to contact a substrate or pre-bent substrate when in use. The knurled surface can be cut prior to application of a ceramic coating layer. A corrugated surface containing a combination of ridges and troughs can be cut prior to application of a ceramic coating layer. A corrugated surface containing a combination of ridges and troughs, where the surface of one or more ridges has a knurled surface, can be cut prior to application of a ceramic coating layer.

In examples, the surface of lattice support structure 150 that is configured to contact a substrate or pre-bent substrate when in use may include knurls. The knurled surface on the surface of lattice support structure 150 can produced as previously described with respect to mount system 100.

In examples, the surface of the lattice support structure 150 configured to contact the substrate or pre-bent substrate when in use can include corrugations or is corrugated. In examples, the corrugated surface may include alternating ridges and grooves. The corrugation can run along the length or width of one or more elements that make up the surface of the lattice of lattice support structure 150 configured to contact the substrate or pre-bent substrate when in use. The ridges can be columns can have the same characteristics and benefits as previously described.

As also previously described for mount system 100, the knurled pattern or corrugation on the surface of the lattice support structure 150 can have a ceramic coating layer on its surface.

As discussed earlier for mount system 100, the nominal lattice deflection $h_{lattice}$ (bow) of the lattice support structure 150 may be the difference between the maximum height at the center of the curved surface of lattice support structure 150 and the upper surface of an edge of the lattice support structure 150. The difference between the maximum height of the curved surface and an edge of the lattice support structure 150 may be $h_{lattice}$. The lattice support structure 150 length ratio $L_r$ may be the ratio between the new x dimension of the lattice support structure 150 $L_i$ and the original lattice support structure 150 length $L_0$. The predicted maximum lattice deflection $h_{Lr}$ is approximately proportional to the product between the nominal lattice deflection $h_{lattice}$ and the square of the lattice support structure 150 length ratio $L_r$ which is calculated according to the formula:

$$L_r = L_i/L_0$$

and thus $$h_{Lr} \approx h_{lattice} \times L_r^2.$$

Hence, for a lattice support structure 150 with xy dimensions of 635 mm×190 mm (L×W), the predicted maximum lattice deflection $h_{Lr}$ is about 3.8 mm. A longer lattice support structure 150, such as a lattice support structure 150 with xy dimensions of 1905 mm×635 mm would have a lattice length ratio of three ($L_r$=1905/635=3) and a maximum lattice deflection $h_{Lr}$ of 3.8×3²=34.2 mm. The nominal lattice deflection can be from about 3 mm to about 35 mm.

The amount of deflection of the lattice support structure 150 thus can depend on the characteristics of the lattice support structure 150. The longer the lattice support structure 150 needs to be to accommodate a longer substrate, the higher/larger the deflection of the lattice support structure 150 will need to be.

As discussed earlier with respect to mount system 100, in examples, lattice support structure 150 provided herein can be free standing. The lattice support structure 150 can be separate and apart from the jig. In exemplary embodiments, the lattice support structure 150 can sit flat on a jig. Exemplary lattice support structure 150 can include a rim having a flat surface or planar surface around the perimeter. The curvature of the surface of the lattice support structure 150 can be empirically determined based on data gathered on initial trials performed using ceramic plates as discussed with respect to the curved clamping mold 170 discussed below. In cross-section when viewed from the side, the profile defined by the lattice support structure can resemble an upper half of an ellipse whose semi-minor axis is much smaller than its semi-major axis. The ellipse can have an eccentricity close to, but less than 1 (an eccentricity of 1 would be a flat surface).

3. Curved Clamping Mold

In examples, the mount system 100 may include a curved clamping mold 170.

In examples, a curved clamping mold 170 may include one or more of the same or similar features as discussed in International Application No. PCT/EP2020/082678, which is incorporated herein by reference in its entirety. Curved clamping mold 170 may be configured to include a predetermined substrate contact interface. In examples, clamping mold 170 may be configured to have a substrate contact interface that falls within the range of 0.1 to 20. In examples, clamping mold 170 may include one or more of the same or similar features as discussed in International Application No. PCT/EP2020/082678, and be configured to have a substrate contact interface that falls within the range of 0.1 to 20.

In examples, curved clamping mold 170 may be configured to include a substrate contact interface that is equal to or greater than 0.1, 0.2, 0.3, 0.4, 0.5, 0.6, 0.7, 0.8, 0.9, or 1, and equal to or less than 1, 2, 3, 4, 5, 6, 7, 8, 9, 10, 11, 12, 13, 14, 15, 16, 17, 18, 19, or 20. In examples, curved clamping mold 170 may be configured to have a substrate contact interface in the range of 0.1 and 15, 0.1 and 10, 0.1 and 5, or 0.1 and 1. In examples, curved clamping mold 170 may be configured to have a substrate contact interface in the range of 0.1 and 15, 0.1 and 10, 0.1 and 5, or 0.1 and 1. In examples, curved clamping mold 170 may be configured to have a substrate contact interface in the range of 0.2 and 20, 0.2 and 15, 0.2 and 10, 0.2 and 5, or 0.2 and 1. In examples, curved clamping mold 170 may be configured to have a substrate contact interface in the range of 0.3 and 20, 0.3 and 15, 0.3 and 10, 0.3 and 5, or 0.3 and 1. In examples, curved clamping mold 170 may be configured to have a substrate contact interface in the range of 0.4 and 20, 0.4 and 15, 0.4 and 10, 0.4 and 5, or 0.4 and 1. In examples, curved clamping mold 170 may be configured to have a substrate contact interface in the range of 0.5 and 20, 0.5 and 15, 0.5 and 10, 0.5 and 5, or 0.5 and 1. In examples, curved clamping mold 170 may be configured to have a substrate contact interface in the range of 0.6 and 20, 0.6 and 15, 0.6 and 10, 0.6 and 5, or 0.6 and 1. In examples, curved clamping mold 170 may be configured to have a substrate contact interface in the range of 0.7 and 20, 0.7 and 15, 0.7 and 10, 0.7 and 5, or 0.7 and 1. In examples, curved clamping mold 170 may be configured to have a substrate contact interface in the range of 0.8 and 20, 0.8 and 15, 0.8 and 10, 0.8 and 5, or 0.8 and 1. In examples, curved clamping mold 170 may be configured to have a substrate contact interface in the range of 0.9 and 20, 0.9 and 15, 0.9 and 10, 0.9 and 5, or 0.9 and 1.

In examples, curved clamping mold 170 may include a top surface 174 as illustrated defining a substrate interface area of curved clamping mold 170. In examples, the substrate interface area of curved clamping mold 170 may be different from, for example smaller than, the surface area of top surface 174. As discussed earlier, the substrate interface area should be understood as the area configured to be overlaid by a substrate or pre-bent substrate when curved clamping mold 170 is in use.

In examples, the substrate contact interface of a curved clamping mold 170 for a given substrate interface area may be adjusted by modifying the curved surface of curved clamping mold 170 that is configured to face the substrate or pre-bent substrate when in use. In examples, as described herein, the curved surface of curved clamping mold 170 may be configured to have a planar profile, an irregular profile, one or more protrusions extending therefrom, and/or include a knurled surface, corrugations, or other ridges and troughs as described herein, and any like structure that may affect size of the substrate contact area of curved clamping mold 170.

In examples, clamping mold 170 may include a first side that includes a peripheral rim. In examples, the peripheral rim may have a flat or planar surface at least on one side. In examples, the peripheral rim may have a flat or planar surface, cavities or depressions that create one or more void areas, and one or more stiffening members. The planar perimeter and the stiffening member(s) share a common plane. In examples, only the peripheral rim and the stiffening member(s) come into contact with the jig or the clamping fixture platform. The curved clamping mold also includes a second side opposite of the first side, the second side having a curved surface, as show in in FIG. 5A-5B.

In use, the first side of the clamping mold can be directed toward the welding jig. The curved side of the clamping mold can be directed away from the jig and toward and positioned against the pre-bent substrate. The planar surface of the peripheral rim and the stiffening member(s) of curved clamping mold can rest flat on the jig surface. One or more clamps can be used to secure the pre-bent substrate to the jig. This can result in the substrate or pre-bent substrate being pressed toward the jig, so the forces necessary to secure the substrate or pre-bent substrate to the jig will be between the clamps and the jig, with the curved clamping mold as a support between the substrate and the jig. In embodiments, the pre-bent substrate is pressed axially downward.

The curved clamping mold may be positioned so that the first surface of the curved clamping mold faces the jig. In examples, a planar surface of the peripheral rim and the stiffening member(s) of the first side of the curved clamping mold can rest flat on the jig surface. The backside (first side) of pre-bent substrate, on which the melting tracks can be present, is positioned so that it faces the side of the curved clamping mold (facing away from the jig (the second side)). In this configuration, the backside of the pre-bent substrate is facing downward toward the curved surface of the curved clamping mold and the jig. One or more clamps can secure the pre-bent substrate to the jig, with the curved clamping mold between the pre-bent substrate and the jig as previously discussed.

In examples, the curved clamping mold may be configured to have a greater thickness at a center portion than at the edges, resulting in a curved surface having the greatest height near the center of the curved surface. In embodiments provided herein, the height of the curved clamping mold measured at or near the center of the curved clamping mold can be in the range of from about 3 mm to about 60 mm, or from about 12 mm to about 50 mm, or from about 15 mm to about 45 mm. The height of the curved clamping mold measured at or near the outer edges of the curved clamping mold can be in the range of from about 0.5 mm to about 55 mm, or from about 3 mm to about 45 mm, or from about 10 mm to about 40 mm. In examples, the thickness profile of the curved clamping mold when viewed from the side has the greatest height in the center of the curved clamping mold, and the height may gradually be reduced toward the outer edges to from a curved surface. In examples, the differences in height across the cross-section of the curved clamping mold may result in a concave downward curve in the top surface of the curved clamping mold. In cross-section when viewed from the side, the shape of the curved clamping device can resemble an upper half of an ellipse whose semi-minor axis is much smaller than its semi-major axis. The ellipse can have an eccentricity close to, but less than 1 (an eccentricity of 1 would be a flat surface).

The curved clamping mold can be constructed from any metal having sufficient strength and temperature resistance for use under typical conditions of DED processing as previously mentioned. In examples, the curved clamping mold can be made of a stiff material that is resistant to twisting and deformation to help maintain its shape. In addition, the curved clamping mold can be made of a material that is resistant to thermal shock, corrosion and is non-magnetic.

As discussed earlier, in examples, no ceramic sheet, plate, or pylon and/or ceramic coating is used in the implementation of mount system 100. In examples, the curved clamping mold 170 is free of ceramic sheets or pylon, of ceramic coating, or both. In examples, the curved clamping mold 170 may include a ceramic coating as described. In examples, a curved clamping mold 170 may be used with a ceramic sheet, plate, or pylon.

In examples, the thickness of the curved clamping mold 170 can be designed to mimic or provide the same or similar thermal insulative properties achieved with sheets of ceramic insulation conventionally used in DED processes. For example, one or more sheets or plates of alumina ($Al_2O_3$) insulation are used in conventional DED processes to thermally separate the substrate from the clamping fixture platform, such as the jig. The conventional use of insulation sheets is to reduce the potential risk of thermal damage to the jig, while contributing to a more homogeneous temperature distribution during the DED process. Although the thickness of the sheets or plates can vary, conventionally used sheets can be about 3 mm to 3.5 mm thick. In conventional DED processes, multiple sheets of ceramic insulation sheets can be used. For example, in some conventional processes, about 4 sheets or plates of ceramic insulation are used to provide a layer of about 12 mm of insulation. More or fewer ceramic insulation sheets can be used conventionally. These alumina insulation plates can be cut to size. However, doing so can release particles of alumina that can cause respiratory tract or eye irritation. Alumina insulation sheets also tend to be hygroscopic and initially can release water vapor during the heat temperature of the DED process, which can result in fluctuations in the deposition environment during processing, which is undesirable. The ceramic insulation sheets conventionally used between a substrate and jig also have to be discarded after use due to their brittleness and fragility, thus representing a consumable that adds to the cost of DED manufacturing.

In examples, curved clamping mold 170 can be used in combination with conventional ceramic insulation plates. The curved clamping mold can replace traditional ceramic insulation plates and provide similar thermal insulation while maintaining the same height so that minimal changes to the setting of the melting tool(s) providing a thermal source or CAD-CAM path planning defining the piece to be made by DED needs to be made. As discussed above, there is no physical limitation to the thickness of the curved clamping mold, other than machine-dependent operating constraints. For example, the DED systems' height stroke can dictate the thickness of the curved clamping mold used. The thickness of the curved clamping mold can be selected to maximize heat flow reduction at the mold/jig interface while allowing sufficient clearance for manufacture of the workpiece based on the height stroke of the system.

Figure 5A:
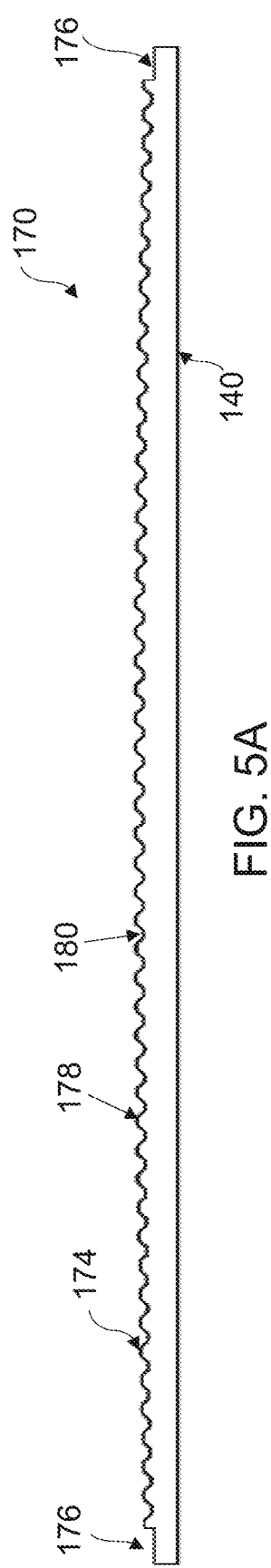
FIG. 5A is a side view of the curved clamping mold showing an embodiment with a knurled curved surface.
Figure 5B:
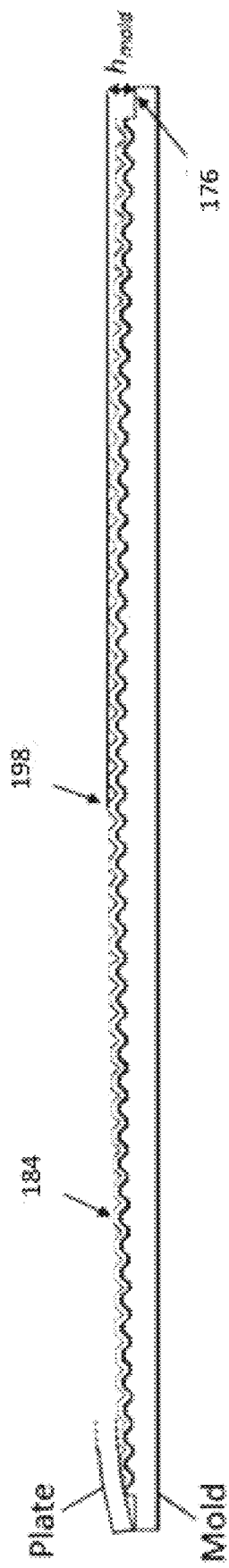
FIG. 5B is a side view of the same curved clamping mold showing a ceramic coating by dashed lines (exaggerated in the figure) on the curved surface that will be in contact with the DED substrate (plate). The figure also shows the nominal mold deflection $h_{mold}$.

In examples, curved clamping mold 170 can include a ceramic coating. For example, a ceramic coating can be applied on the surface of the curved clamping mold that faces the DED substrate (the second curved surface that contains knurls or corrugations), as shown in FIG. 5B. The ceramic coating can be applied directly to the curved surface, or the ceramic coating can be applied to a bond coat that is directly applied to the second curved surface. A ceramic coating can be applied directly to the opposite first flat surface of the mold, or the ceramic coating can be applied to a bond coat that is directly applied to the first flat surface. The ceramic coating can provide thermal insulation to minimize or prevent thermal contact between the curved clamping mold and the pre-bent substrate.

Figure 5C:
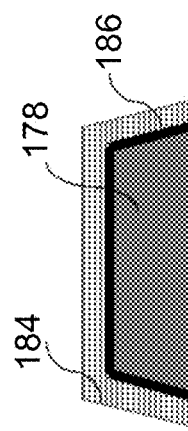
FIG. 5C shows an exemplary cross section shape (zoomed view), that is frustum-type, particularly a truncated pyramid shape.

The process and characteristics of ceramic coatings that may be applied to a mount system 100 were previously described and equally apply to curved clamping mold 170. Also, as previously discussed, in examples, mount system 100 may include a bond coat. Likewise, in examples, curved clamping mold 170 may include a bond coat as previously described. Examples of an applied bond coat is shown schematically in FIG. 5C. The knurl 178 is coated with a bond coat 186 which is subsequently coated with a ceramic coating 184.

In examples, mount system 100 may include a corrugated surface and/or a knurled surface. In a similar manner, in examples, to further minimize or prevent thermal communication between the curved clamping mold 170 and the pre-bent substrate, the curved surface of the curved clamping mold 170 can be physically modified.

A knurled surface can be cut into the curved surface of the curved clamping mold prior to application of the ceramic coating layer. A corrugated surface containing a combination of ridges and troughs can be cut into the curved surface of the curved clamping mold prior to application of the ceramic coating layer. A corrugated surface containing a combination of ridges and troughs, where the surface of one or more ridges has a knurled surface, can be cut into the curved surface of the curved clamping mold prior to application of the ceramic coating layer. Exemplary embodiments are shown in FIGS. 5A, 5B, 5D, and 5E. The embodiment illustrated in FIG. 5A shows a curved clamping mold 100 that contains a top surface 174 that is knurled and contains a combination of knurls 178 at spacing 180, and a bottom surface having a flat or planar rim 182. The curved clamping mold can include an edge 176 on each side, as shown in FIG. 5B. The edge 176 on each side of the mold can help support and/or limit the downward movement of the short edge of the plate (substrate) during clamping.

Figure 5D:
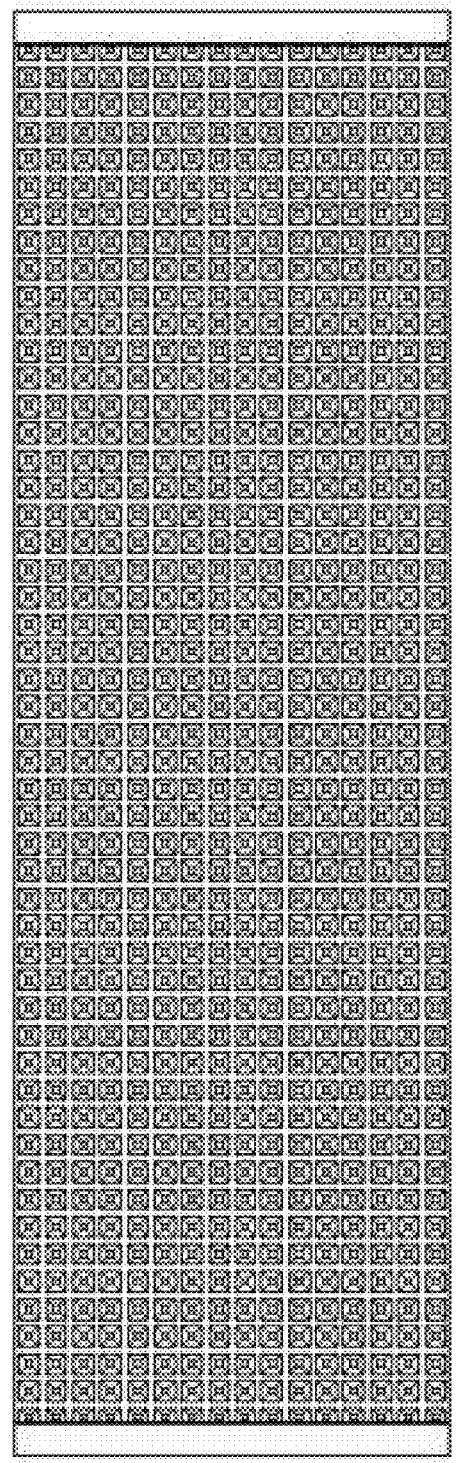
FIG. 5D is a top view of the same curved clamping mold.
Figure 5E:
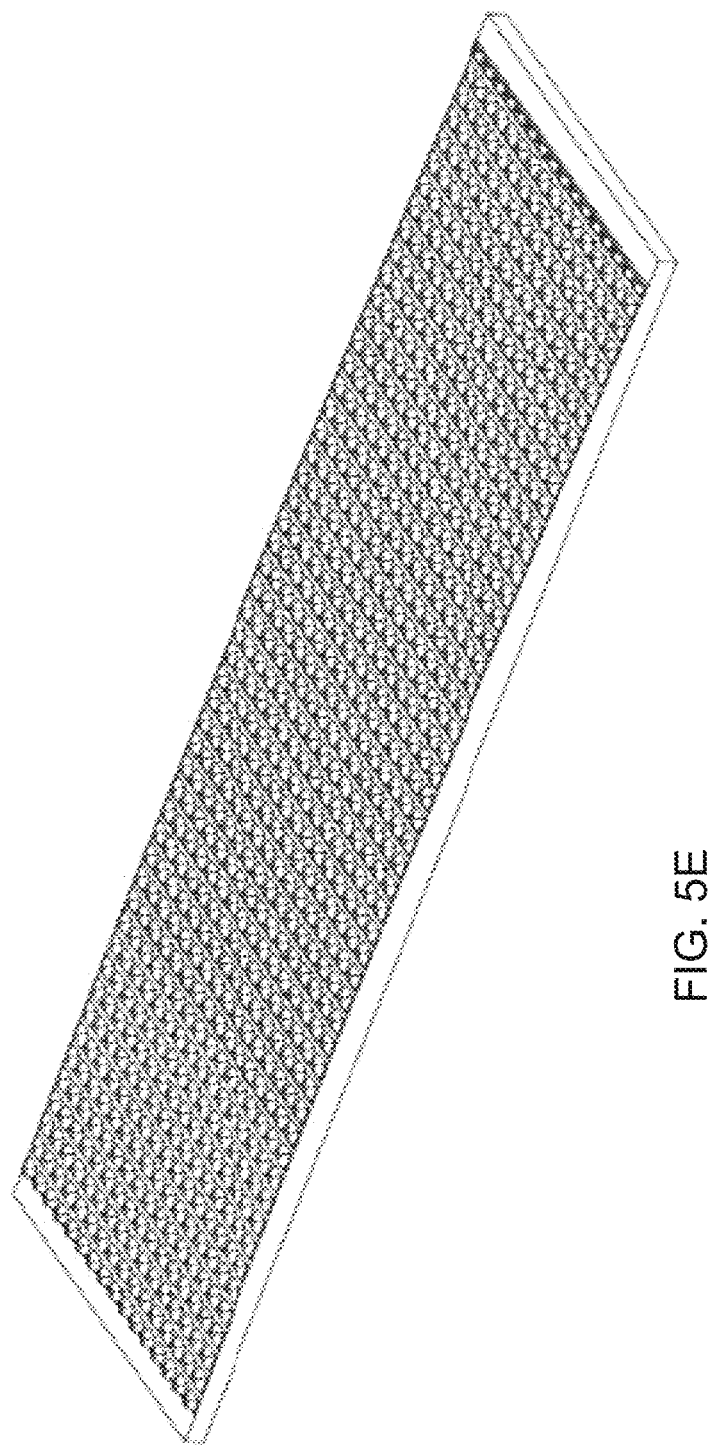
FIG. 5E is an isometric projection view of the same curved clamping mold.

In examples, the curved surface of the curved clamping mold 170 may include knurls as illustrated in FIGS. 5D and 5E. The knurled surface on the curved surface of the curved clamping mold 170 can produce as previously described with respect to mount system 100.

In embodiments provided herein, the curved surface of the curved clamping mold 170 can include corrugations or is corrugated. The curved surface of the mold can be corrugated to include alternating ridges and grooves. The corrugation can run from one long edge to the other long edge of the curved clamping mold 170. The corrugation can run from one short edge to the other short edge of the curved clamping mold. The corrugation results in a plurality of columns that are perpendicular to the arc of curvature of the curved clamping mold. The perimeter edges of the mold at the curved surface can be contoured by a metal material, and not coated with a ceramic coating or bond coat.

The ridges can be columns can have the same characteristics and benefits as previously described. Exemplary ridges implemented on the curved clamping mold 170 are illustrated in FIGS. 5A, 5B, 5C, and 5E.

As also previously described for mount system 100, in examples, a knurled pattern or corrugation on the curved surface of the curved clamping mold 170 can have a ceramic coating layer on its surface. An exemplary embodiment showing a curved clamping mold 170 with a ceramic coating 184 is shown in FIG. 5B.

As previously described for mount system 100, the nominal mold deflection $h_{mold}$ (bow) of the curved clamping mold is the difference between the maximum height at the center of the curved surface of curved clamping mold and the upper surface of an edge of the curved clamping mold, as illustrated in FIG. 5B. In FIG. 5B, the difference between the maximum height 198 of the curved surface and an edge 176 of the curved clamping mold is $h_{mold}$. The mold length ratio $L_r$ is the ratio between the new x dimension of the mold $L_i$ and the original mold length $L_0$. The predicted maximum mold deflection $h_{Lr}$ is approximately proportional to the product between the nominal mold deflection $h_{mold}$ and the square of the mold length ratio $L_r$ which is calculated according to the formula:

$$L_r = L_i/L_0$$

and thus $$h_{Lr} \approx h_{mold} \times L_r^2.$$

Hence, for a curved clamping mold with xy dimensions of 635 mm×190 mm (L×W), the predicted maximum mold deflection $h_{Lr}$ is about 3.8 mm. A longer mold, such as a curved clamping mold with xy dimensions of 1905 mm×635 mm would have a mold length ratio of three ($L_r$=1905/635=3) and a maximum mold deflection $h_{Lr}$ of 3.8×3²≈34.2 mm. The nominal mold deflection can be from about 3 mm to about 35 mm. The amount of deflection of the mold thus can depend on the characteristics of the mold. The longer the curved clamping mold needs to be to accommodate a longer substrate, the higher/larger the deflection of the curved clamping mold will need to be.

Figure 5F:
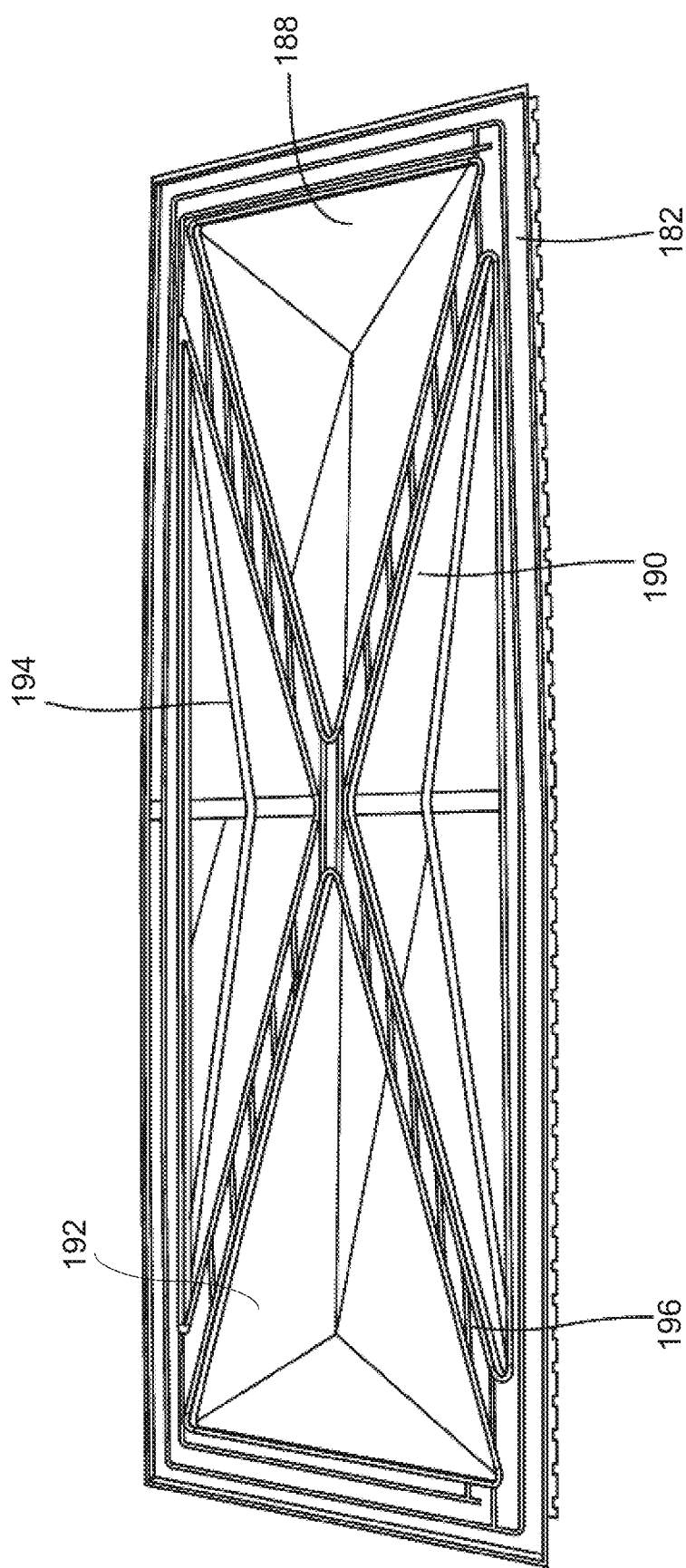
FIG. 5F is a bottom view of the curved clamping mold having four triangular cavities separated by an X-shaped stiffening member and having a peripheral rim, where the peripheral rim and the X-shaped stiffening member share a common plane. Only the peripheral rim and the stiffening member contact the clamping fixture platform, such as a jig or welding table, when the curved clamping member is place on the jig or welding table.

In examples, the curved clamping mold 170 also can be designed so that the underside of the mold includes cavities or depressions, while still retaining mold rigidity and deformation resistance. An exemplary design is shown in FIG. 5F. Segments of the non-magnetic metal on the bottom surface of the curved clamping mold can be machined away to produce two or more cavities or depressions. The cavities or depressions can be separated from each other by an unmilled area of metal that can serve as a stiffening member. An area of unmilled metal also can be present around the perimeter of the bottom surface of the mold to form a rim. This design reduces the amount of material required to fabricate the curved clamping mold 170 while still maintaining the physical stability of the mold. By reducing the need for the full bulk of material to be used to form the mold, the weight of the mold can be reduced while maintaining stiffness of the structure of the mold. As an alternative to milling the metal to achieve the desired cavities and stiffening members, a casting mold can be used to fabricate the curved clamping mold 170 by casting to include these attributes, minimizing the amount of material that would need to be removed to achieve the desired final design. Further, a stiffening member can be added, such as by attaching a separately prepared stiffening member to the bottom surface of the curved clamping mold 170. The stiffening member can be attached via any suitable method. Exemplary methods include welding, screws, bolts, adhesive, or combinations thereof.

The cavities can have any shape. In examples, the cavities can be four triangular cavities, separated by mold material to form an X-shaped stiffening member that separates the cavities from one another. An exemplary embodiment is shown in FIG. 5F. In the configuration shown, the substrate is machined to produce triangular shaped cavities 188, 190, 192 and 194, while leaving material to form an X-shaped stiffening member 196 and a flat perimeter rim 182. The outer surface of the flat perimeter rim 182 and the outer surface of the X-shaped stiffening member 196 are in the same plane, and when secured to the jig can sit flat on the jig surface. The cavities can be four square or rectangular cavities, separated by the mold material to form an H-shaped stiffening member that separates the cavities from one another. The cavities can be any shape selected from the group consisting of a square, rectangle, circle, oval, ellipse, trapezoid, parallelogram, pentagon, hexagon, heptagon, starburst, cross, multi-pointed star, intersecting geometric shapes, polygon, geometric shape, irregular shape, regular shape, symmetric shape, asymmetric shape, and a combination thereof.

In addition to cost saving achieved by reducing the amount of the non-magnetic metal needed for fabrication, the cavity-plus-stiffening member-plus-perimeter-rim design provides several functional advantages. One advantage is that only the unmilled portions of the bottom surface of the mold will come into contact with the high strength steel jig. This reduces conduction heat transfer from the curved clamping mold to the jig while maintaining rigidity of the curved clamping mold. This reduction in heat transfer also contributes to heat retention in the pre-bent substrate, minimizing loss to the jig.

In addition, the cavities in the bottom surface of the curved clamping mold 170 can retain atmosphere or argon gas. Argon can be effectively used as an insulator under a large part of the mold due to the presence of the cavities and the perimeter rim. Argon is a very effective insulator. Any flow of heat from the curved clamping mold 170 to the underlying steel jig only will be at solid/solid contact interface(s) by conduction heat transfer as a result of the thermal gradient. Because the solid/gas/solid interfaces are considerably less thermally conductive, the cavities in the lower surface of the curved clamping mold 170 can effectively act as thermal barriers between the curved clamping mold 170 and the jig (e.g., air or inert gas gaps). Air or inert gas gaps can be utilized at interfaces between the baseplate and the clamping mold 170, and/or between clamping mold 170 and the jig to help reduce heat transfer from the baseplate to the jig. Thus, the curved clamping mold 170 can help to maintain more heat in the pre-bent substrate, thereby further reducing uneven temperature distribution and reducing thermal stresses in the pre-bent substrate.

In examples, the curved clamping mold 170 can exhibit high durability. After repeated use, the curved clamping mold 170 may experience some thermal stress that cumulatively could build up and result in some small degree of bow distortion of the mold (such as a 0.05 mm to about a 0.5 mm lift at edges after repeated use). The degree of bow distortion observed in the curved clamping mold 170 after repeated use is not expected to significantly change the distortion mitigation effects produced on the DED preforms. Different object designs can require the use of curved clamping molds 170 of different sizes in order to accommodate substrates of different sizes. Similar curved clamping molds 170 can be used for the production of objects with similar geometries and/or substrate sizes. For example, objects having similar geometries and/or substrate sizes can be grouped into families and the same curved clamping mold design can be used within the same object family.

As discussed earlier with respect to mount system 100, in examples, curved clamping molds 170 provided herein can be free standing. The curved clamping mold 170 can be separate and apart from the jig. In exemplary embodiments, the curved clamping mold 170 can sit flat on a jig. Exemplary clamping molds 170 can include a rim having a flat surface or planar surface around the perimeter. The curvature of the mold can be empirically determined based on data gathered on initial trials performed using ceramic plates. Ceramic plates were cut into different sizes which were then used to produce different current curvatures and tested for their ability to minimize distortion in preforms prepared on the curved molds. Modelling was used thereafter to confirm that the curvature used experimentally provided the targeted end results, i.e., a close to distortion free preform. In cross-section when viewed from the side, the shape of the curved clamping device can resemble an upper half of an ellipse whose semi-minor axis is much smaller than its semi-major axis. The ellipse can have an eccentricity close to, but less than 1 (an eccentricity of 1 would be a flat surface).

4. Modified Jig Design

In examples, the mount system 100 may be integrated into the welding jig. In examples, any of the above described example structures, pins 112, pin support system 110, lattice support structure 150, and/or curved clamping mold 170 can be made an integral part of welding jig. In examples, the surface of welding jig 400 may be configured to mimic a curved surface or substrate contact area as described for any of the pin support system, pins, lattice support structure, and/or curved clamping mold. By implementing any of these discussed features onto the surface of a welding jig 400, the same or similar benefits may be achieved.

C. METHODS OF DIRECTED ENERGY DEPOSITION

Provided herein are methods of directed energy deposition that mitigate or reduce distortion in objects manufactured using directed energy deposition, especially in titanium and titanium alloy objects. The methods include thermally pre-bending the substrate on which the object is to be manufactured, attaching the pre-bent substrate to the mount system provided herein, pre-heating the substrate prior to DED deposition, and producing the object by deposition of metal layer by layer. The pre-bending of the substrate includes inducing steep through-thickness thermal gradients in the substrate.

Figure 6:
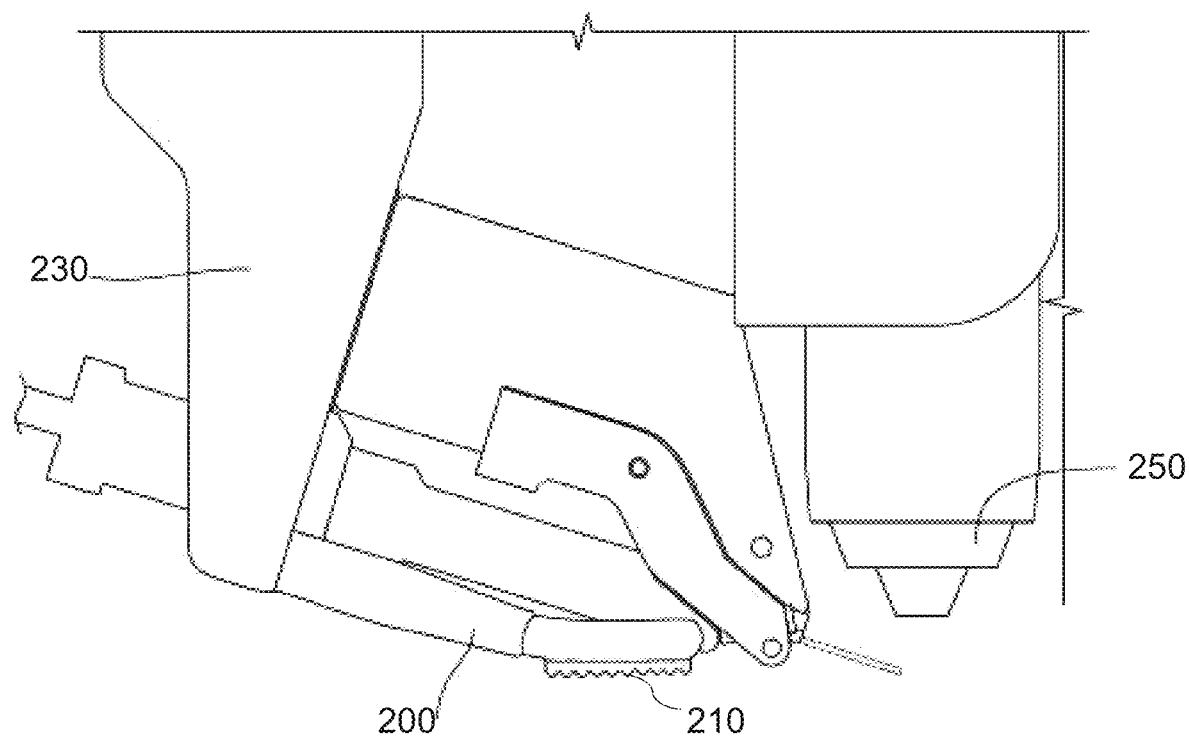
FIG. 6 depicts an exemplary rapid cooling gas jet device.

For the thermally induced pre-bending step, a thermal source can be used to apply thermal energy at a high energy density to a surface of the first side or backside of the substrate. The thermal energy can be applied to defined portions of the backside of the substrate in order to create large thermal gradients in the substrate. The large thermal gradients can introduce a high residual stress field into the substrate. The thermal energy can be applied, followed by a reduction in the temperature of the surface to which thermal energy was applied. In embodiments, a gas jet device can be used to apply a cooling gas. Application of the cooling gas can increase the cooling rate and thereby further increase the stress imparted to the substrate. For example, the thermal source can comprise an electric arc of a plasma torch, such as a PTA torch, and the gas jet device can be attached to a support relative to the plasma torch, as shown in FIG. 6. In FIG. 6, the gas jet device 200 is attached to a support 230, and nozzles 210 of the gas jet device 200 can apply a cooling gas to an area heated by the PTA torch 250.

In contrast, in the pre-heating step, thermal energy is applied to the surface of the substrate uniformly in order to minimize temperature gradients along the x, y and z directions. Thermal energy is applied as uniformly as possible to the frontside of the substrate as the heating device allows. Any heating device(s) or method(s) that provide(s) uniform heating can be used for pre-heating. For example, direct heating using a heater positioned to apply heat across the surface of the substrate can be used. The heating device can be or include an infrared heater, an inductive heater, a resistive heater, or combinations thereof. Exemplary heaters include a conductor-in-conduit heat source, a heater strip, a resistive heating strip, an infrared heater, a Positive Thermal Coefficient ceramic heater, a thick film ceramic heater, a resistance wire or a resistance ribbon heating device, an infrared heater, and an induction heater. Pre-heating also can be achieved using one or more melting tools to apply thermal energy to the surface of the substrate. The melting tools can be used alone or in conjunction with an infrared heater, an inductive heater, a resistive heater, or combinations thereof. The melting tool (s) can include as a thermal source an electric arc plasma, a laser beam or an electron beam, and a plurality of melting tools containing the same or different thermal sources can be used. The heating area can be maximized by using lower energy densities, and applying more thermal energy over a larger area. A plurality of heating sources can be used in tandem, in serial or in parallel, to generate multiple "lines" of thermal energy applied to the frontside surface of the substrate to more uniformly heat the substrate. This can result in a raising the temperature of the substrate more uniformly using low energy density heating, producing few or minimal thermal gradients particularly in the through-thickness direction. Application of thermal energy using one or more melting tools during the pre-heating dry runs (heat application without adding molten metal) can result in the effective removal of any residual contaminants off the surface of the substrate, such as any contaminants left by any ultrasonic/manual wipe cleaning procedures. Preheating is performed until a target temperature of the substrate is reached.

In some applications, the target temperature to be achieved by the preheating process is the DED process temperature, such as the DED deposition temperature, or about ±25° C. of the DED process temperature. In some applications, the target temperature is within ±25° C. of the plastic deformation temperature of the substrate. In some applications, preheating is performed until the substrate has temperature of about 400-900° C. In some applications, preheating is performed until the substrate has temperature of about 500-850° C. Other authors have report that warm forming can be also performed between 200-300° C. in order to reduce the flow stress and to help minimizing titanium spring back too. In some applications, preheating is performed until the substrate has temperature of about 595-815° C.

The mount system 100 can act as a support for the pre-bent substrate as the pre-bent substrate is clamped to the jig. Among other advantages, the mount system 100 provides more consistent and reproducible end residual stress distribution and helps to minimize distortion of the workpiece during and after fabrication.

DED can be performed after the substrate has been pre-heated (and remains heated) in order to mitigate thermal gradient generation during the DED process, particularly in the through-thickness (z-direction). While introduction of no stress in the fabricated object would be optimal, DED processes are effectively welding processes and typically will lead to an inevitable build-up of welding-induced residual stresses and deformation during fabrication. Reducing these residual stresses and deformations results in objects that exhibit improved dimensional accuracy and superior mechanical properties. Steps of the method are described in further detail below.

1. Pre-Bend the Substrate

In the methods provided herein, the substrate can be pre-bent prior to deposition. Pre-bending of the substrate can be a separate step of the DED process. In methods provided herein, thermal energy can be applied to a first side of a substrate to plastically deform the substrate and thus to permanently and uniformly pre-bend the substrate. In embodiments, one or more than one autogenous melting tracks or weld lines can be formed as the thermal energy is applied across a surface of the first side of the substrate. This is significantly different from using clamps to physically constrain and mechanically pre-bend the substrate by mechanical stress. Although mechanical pre-bending can be used to bend the substrate, mechanical stress typically does not involve local melting of planned segments of the substrate surface and is not sufficient to introduce the desired uniform plastic deformation into the substrate. Mechanical forces introduce different stress redistribution patterns than are introduced by applying localized heating after the substrate is released from the clamps. For example, when a substrate pre-bended under mechanical forces is released, the substrate springs back to a much higher condition than achieved by thermal pre-bending.

In embodiments, the substrate can have a first side and an opposite second side. The first side can be the side that during DED manufacturing faces toward the jig, and the second side can be the side onto which the workpiece is formed by DED. For the pre-bending, the substrate can be clamped onto a jig with the first side facing up and the back side facing down toward the jig.

Pre-bending of the substrate can be performed while the substrate is in a flat condition. Pre-bending of the substrate can be performed while the substrate is connected firmly to the jig using a plurality of clamps. Pre-bending of the substrate can be performed while the substrate is thermally isolated from the jig. The substrate can be thermally isolated from the jig by including one or more sheets of alumina insulation having the same dimensions as the substrate. In embodiments, four sheets of alumina insulation can be used. Other materials that can provide thermal isolation of the substrate from the jig can be used. A device with similar thermophysical properties as the mount system 100, such as a corrugated surface with a series of ridges and troughs, pin support system, lattice system, mold, with or without a ceramic coating for providing thermal insulation, but defining a flat profile instead of a curved profile, can be used. The use of such a device could eliminate the need to use, alumina insulation sheets or other sheets of insulating material.

The substrate can be clamped to the jig using clamps around the entire periphery of the substrate, along all four edges of the substrate. In some applications, the substrate can be attached to the jig using clamps along only two opposite longest edges of the substrate. This configuration allows the thermal source, such as an electric arc plasma, laser, electron beam device, or any combination thereof, to go to the very edge of the substrate in the length direction. The clamping arrangement can allow energy to be delivered from edge to edge and can produce a stress field all the way to the edge of the substrate, which can help balancing out subsequent residual stresses introduced during DED manufacturing in this particular area.

It has been found that application of intense thermal energy all the way to the edge or to within about 5 mm of the edge can minimize or prevent the substrate from twisting. As the distance from the edge to where the end of application of intense thermal energy increases, twisting increases as well. Thermal stresses produced when the DED thermal source is applied up to 10 mm from the edge are significantly different from those achieved when the thermal source is applied up the edge, or when the thermal source is applied only up to 20 mm away from the edge. The thickness of the substrate has been found to make little difference when considering a distance away from the edge that can be tolerated without stress formation becoming a concern. Thicker substrates may require higher arc energies (or heat inputs) to be delivered during pre-bending, so that wider and deeper fusion profiles can be achieved. This can be achieved by reducing traverse speed, or increasing thermal energy application, or a combination of both, for example. In examples, taller DED preform builds also may distort less in comparison with shorter builds, meaning that the radius of curvature of the curved profile could be increased for shorter builds.

The clamps can be used to attach the substrate to a jig, and a constant clamping force can be applied to all clamps. This can be achieved by torque-controlled tightening of the bolts connecting the clamps to the jig. A force of from 10 newton meter (N·m) to 20 N·m, such as 15 N·m can be used to tighten the bolts connecting the clamps to the jig during the pre-bending stage. Higher torques can be used for thicker substrates.

The DED thermal source generates thermal energy to sufficiently melt planned segments of the substrate's surface in a pre-determined order or position or both to form autogenous melt lines on the substrate surface. A gas jet device can be used to direct cooling gas toward the melting tracks to rapidly cool the melting tracks. The heating or heating/cooling thermal cycling can induce controlled formation and development of residual stress in the substrate. As a result, uniform thermally induced pre-bending of the substrate can be achieved or controlled to pre-determined levels as required.

Figure 7A:
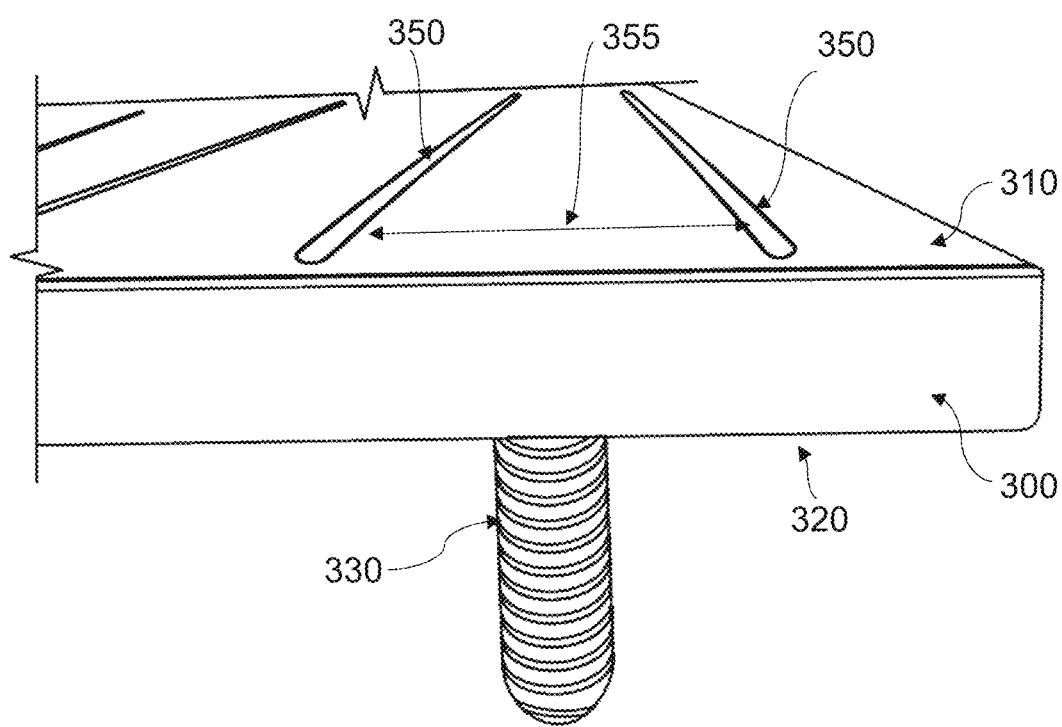
FIG. 7A illustrates melting tracks produced on a first side or backside of a substrate to pre-bend the substrate, and a DED backwall of a workpiece formed on the second side or frontside of the substrate.

The DED thermal source can be configured to provide enough thermal energy to induce melting tracks onto the DED substrate at relatively fast speeds. When used, the gas jet device can deliver high volumes of cooling gas, such as 100 L/min to 200 L/min, to impose a sharp heating/cooling cycle onto the substrate surface. For example, using a plasma transferred arc system, and a substrate thickness of 9.5 mm-10 mm, a current of 190 Amps, a voltage of 25.5V and a traverse speed of 10 mm/s can be used to produce melting tracks that are approximately 3 mm wide and up to 1 mm deep. This can correspond to an arc energy delivery of about 485 J/mm. The energy and traverse speeds can be adjusted for thicker substrates. An exemplary embodiment is shown in FIG. 7A. In the embodiment shown, a substrate 300 having a first side 310 is shown having melting tracks 350 and 360 on the first side 310 having a space 355 between the melting tracks 350 and 355, and a DED backwall of the preform 330 on the second side 320 of the substrate 300.

The high temperatures applied quickly in addition to the cooling gas from the gas jet device promoting fast cooling rates can result in the formation of very steep thermal gradients around the melting tracks and towards the substrate (along the x, y and z-direction). A highly stressed state close to the material yield strength of the material of the substrate can be achieved.

Any gas jet device that can be configured to deliver a cooling gas to the melted surface of the substrate to rapidly cool the melted surface can be used. For Ti or Ti alloy material, an inert gas can be used as the cooling gas. The inert gas can be argon, helium, krypton, xenon or a combination thereof. The gas jet device can include a pipe, tube or other conduit or combinations thereof that can carry a cooling gas from a gas supply to an application area. The gas jet device can include a first end attached to a gas supply, and a second end that is positionable to direct the cooling gas exiting the second end to a desired location on the substrate so that the cooling gas impinges on the substrate surface, particularly in the area of the molten metal of the melting tracks. Multiple gas jet devices can be utilized to enhance or accelerate the cooling of the melting track. The second end of the gas jet device can include one or more than one nozzle that is adjustably positionable so that it can direct the cooling gas to a target location. The effect of the cooling gas impingement on the surface of the substrate can be greatest in the vicinity in which the cooling gas directly impinges, but the surrounding areas of the substrate also can be advantageously affected to reduce the temperature in the vicinity of the cooling gas. A pulsed gas flow can be used to provide the cooling gas. A fully turbulent gas flow can be used to increase cooling efficiency. Cooling gas jet devices are known in the art (e.g., see U.S. Pat. No. 4,090,697 (Perrine, 1978); U.S. Pat. No. 6,390,115 (Rohwer et al., 2002); and U.S. Pat. No. 7,381,364, Yamashita, 2008). An exemplary gas jet device is described in U.S. patent application Ser. No. 16/019,460, filed Jun. 26, 2018.

The pipe, tube or conduit of the gas jet device can be of any material having a channel extending therethrough compatible with the conditions expected to be present during DED deposition. The gas supply can be any source of a cooling gas, such as a compressor or a container of high-pressure gas that is in fluid communication with the gas jet device. Methods for delivering a pressurized gas to a gas conduit are known in the art.

The cooling gas can be supplied to provide a target flow rate of gas to impinge on the substrate surface. The flow rate of the gas can be greater than 50 L/minute, or greater than 100 L/minute, or greater than 150 L/minute, or greater than 200 L/minute. The flow rate of the gas can be from 50 L/minute to 500 L/minute. The flow rate of the gas can be from 50 L/minute to 250 L/minute. The flow rate of the gas can be from 50 L/minute to 100 L/minute. The flow rate can be selected to fast cooling and thus formation of high thermal and stress gradient conditions in the substrate.

The cooling gas can comprise an inert gas, such as argon, helium, neon, xenon, krypton and combinations thereof. The cooling gas can be applied in a constant stream, or can be applied intermittently, or can be applied in a pulsed flow. The temperature of the cooling gas applied can be any temperature. The cooling gas temperature can be the ambient temperature of the additive manufacturing process. The cooling gas temperature can be applied at a gas temperature of about 100° C. or less. The cooling gas temperature can be about room temperature or less, such as about 25° C. or less. The cooling gas temperature can be in the range of from about −10° C. to about 80° C.

For a preform or workpiece to be formed on the second surface of the substrate, the number of DED walls that have centerlines that are parallel to the short edge of the substrate, and the number of DED walls that have centerlines that are parallel to the long edge of the substrate, can be determined. If the majority of DED walls of a preform or workpiece have centerlines that are parallel to the short edge of the substrate, then melting tracks can be produced parallel to the short edge of the substrate. In general, substrates with large length-to-width aspect ratios would require melting tracks to be produced along its longest axis i.e. the axis where the largest effects of distortion will be expected. If the majority of DED walls of a preform or workpiece have centerlines that are parallel to the long edge of the substrate, then melting tracks can be preferentially produced parallel to the long edge of the substrate to counteract the largest effects of distortion along the longest axis of the substrate.

Thermally induced pre-bending on the first side or backside of the substrate can be applied so that the resulting melting tracks, and the typical distribution of longitudinal and transverse residual stress caused by welding, are positioned from about 10 mm to about 20 mm away from the centerlines of the majority of the DED walls of the preform or workpiece that will be deposited on the second or frontside of the substrate. The pre-bending forming technique applied on the first side of the substrate can be performed so that the resulting melting tracks are positioned from about 10 mm, or 11 mm, or 12 mm, or 13 mm, or 14 mm, or 15 mm, or 16 mm, or 17 mm, or 18 mm, or 19 mm, or 20 away from the centerlines of the DED walls of the workpiece that will be deposited parallel to a long edge of the substrate on the second or frontside of the substrate. The melting tracks can be positioned so that they can be present under the least area of the DED walls of the workpiece. An exemplary embodiment is shown in FIG. 7A.

Preemptive knowledge about the shape of the DED workpiece to be deposited on the second side of the substrate can be used to determine the pre-bending heating procedure applied to the first side of the substrate. The heating procedure can be designed to result in the least number of melting tracks under areas where the DED workpiece is to be constructed. The final aggregated residual stress distribution, resulting from the combination of both DED and the melting tracks, has lower tensile peak at the centerline of the DED, and lower balancing compressive stresses away from the centerline of the DED, when compared to the original residual stress profile of the DED without pre-bending melting tracks (i.e. high tensile peak at the DED centerline and balancing compressive stresses further away).

Figure 7B:
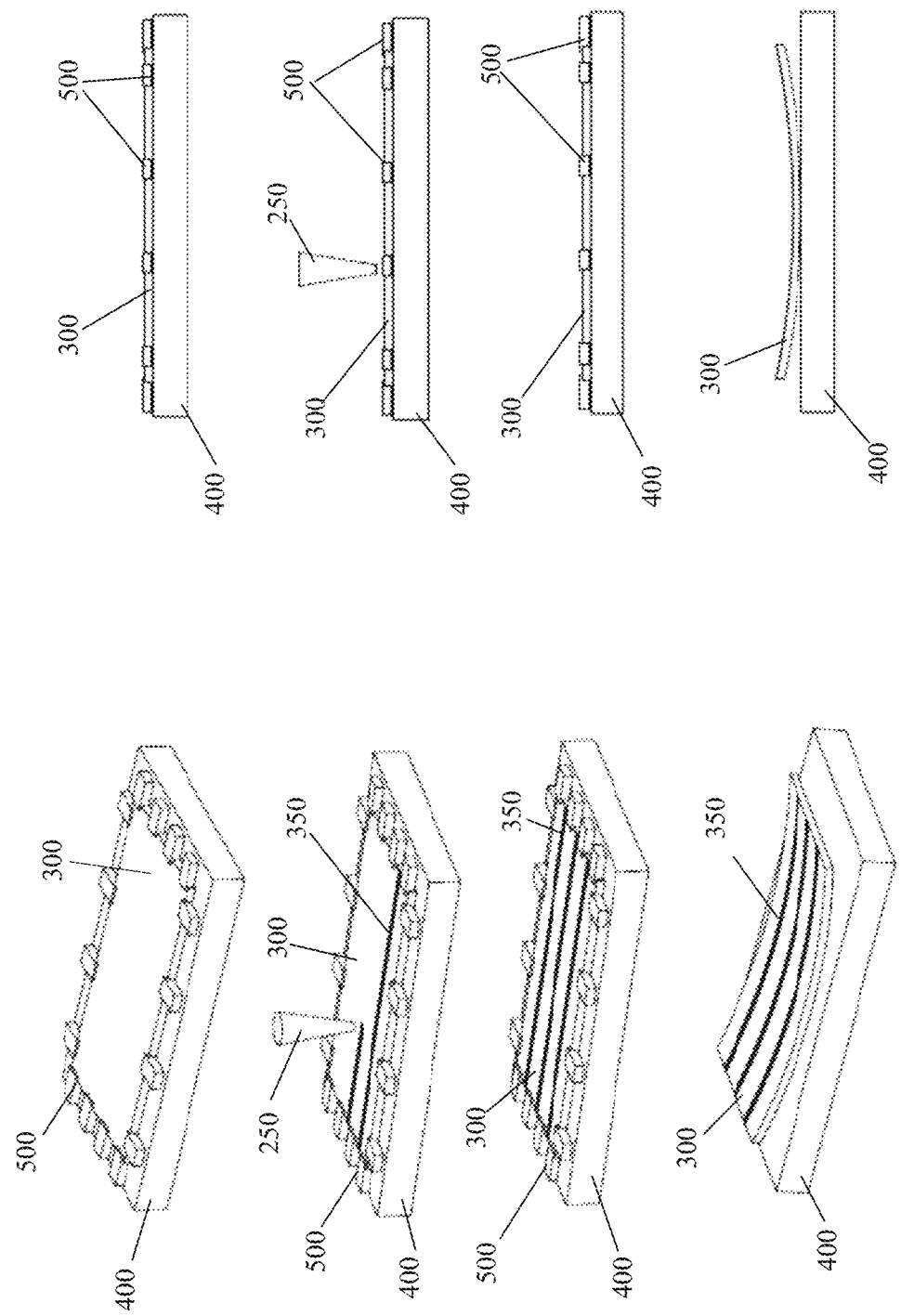
FIG. 7B is a diagram that illustrates an example process for pre-bending a substrate by producing melting tracks on a first side or backside of a substrate.
Figure 7D:
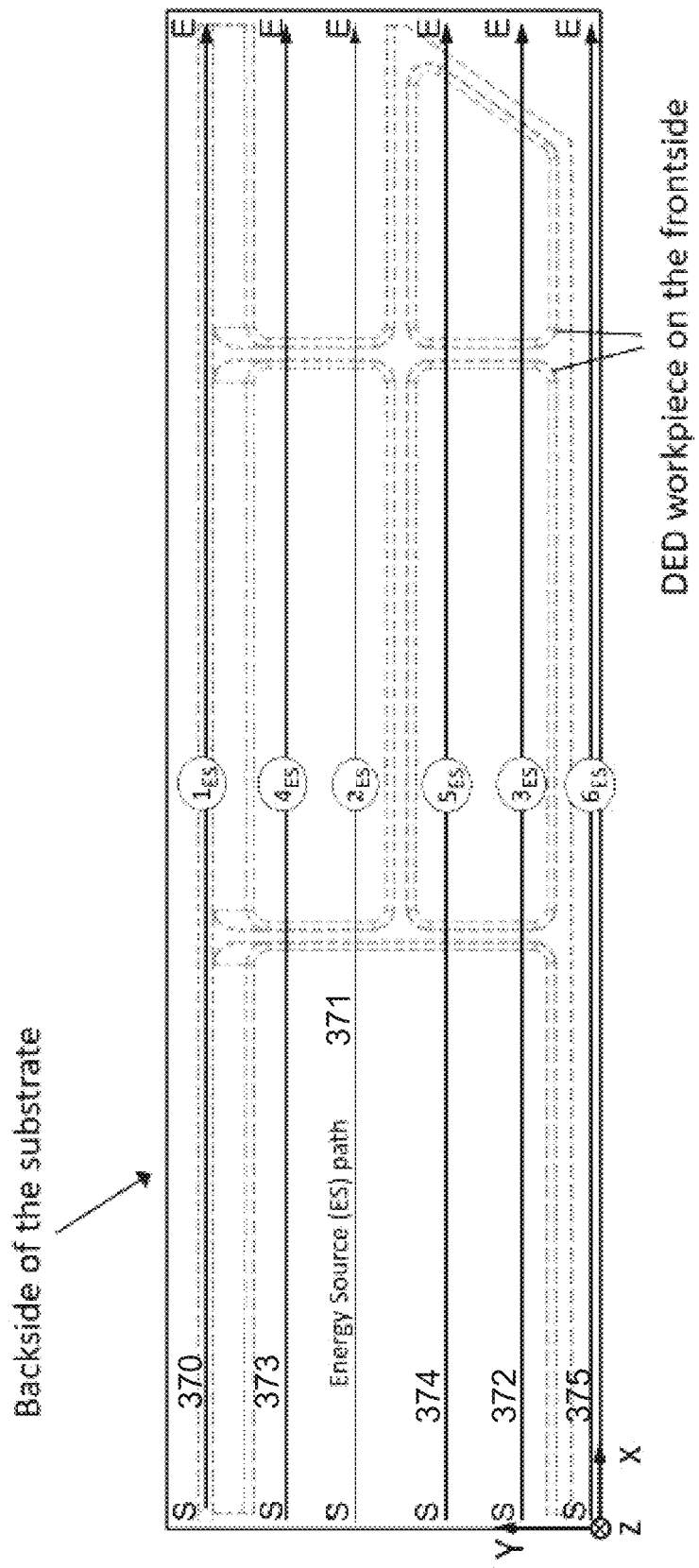
FIG. 7D illustrates schematically the relative positions of the thermally induced pre-bending melting tracks produced by heating paths on the backside or first side of the substrate, relative to the overlaid (grey dashed line) DED workpiece to be manufactured on the reverse frontside or second side of the substrate.

An exemplary embodiment showing the application of thermal energy to produce melting tracks on a substrate is illustrated in FIGS. 7A-7D. The illustration in FIG. 7B illustrates a diagram of the process to produce the melting tracks 350. As shown, a substrate 300 may be placed on a welding jig 400 and clamped by one or more clamps 500. At this step, a mount system 100 is not used and the substrate 300 may rest flat against the welding jig 400. A DED too, such as a plasma torch 250 may then be used to produce the melting tracks on a surface of the clamped substrate 300. In examples, the melting tracks extend from a first end of substrate 300 to a second, opposite end of substrate 300. FIG. 7D shows schematically an exemplary heating path that can be used to move a DED energy source to create melting tracks on the top surface of a backside or first side of a substrate in order to pre-bend the substrate towards the thermal source. The black arrows indicate the direction/path of the DED energy source, the circles containing $X_{ES}$ indicates the sequence X where X is 1 to 6 across the surface of the first side 310 of the substrate 300, with S indicating the start of the path and E indicating the end of the path of energy application, resulting in a heating path. In the illustrated pattern, heating can begin at a top edge across the x direction ($1_{ES}$), then the heat source can be moved in the y direction to a point less than halfway across the substrate and heat can be applied in the y direction from short edge to short edge ($2_{ES}$). This procedure can be repeated for $3_{ES}$, $4_{ES}$, $5_{ES}$, and $6_{ES}$. The first heating path 370 corresponds to $1_{ES}$. The second heating path 371 corresponds to $2_{ES}$. The third heating path 372 corresponds to $3_{ES}$. The fourth heating path 373 corresponds to $4_{ES}$. The fifth heating path 374 corresponds to $5_{ES}$. The sixth heating path 375 corresponds to $6_{ES}$.

The pre-determined DED heating/cooling thermal cycling can induce controlled formation and development of residual stress in the substrate. Application of a cooling gas using a gas jet device (not shown) can be used to accelerate cooling. As a result, uniform thermally induced pre-bending of the substrate can be achieved/controlled to pre-determined levels.

FIG. 7D illustrates schematically the relative positions of the thermally induced pre-bending melting tracks produced by heating paths 370 to 375 (indicated as $1_{ES}$ through $6_{ES}$) on the backside or first side of the substrate, relative to the overlaid (grey dashed line) DED workpiece preform 600 to be manufactured on the reverse frontside or second side of the substrate. The melting tracks can result from application of thermal energy in the heating paths.

Figure 8A:
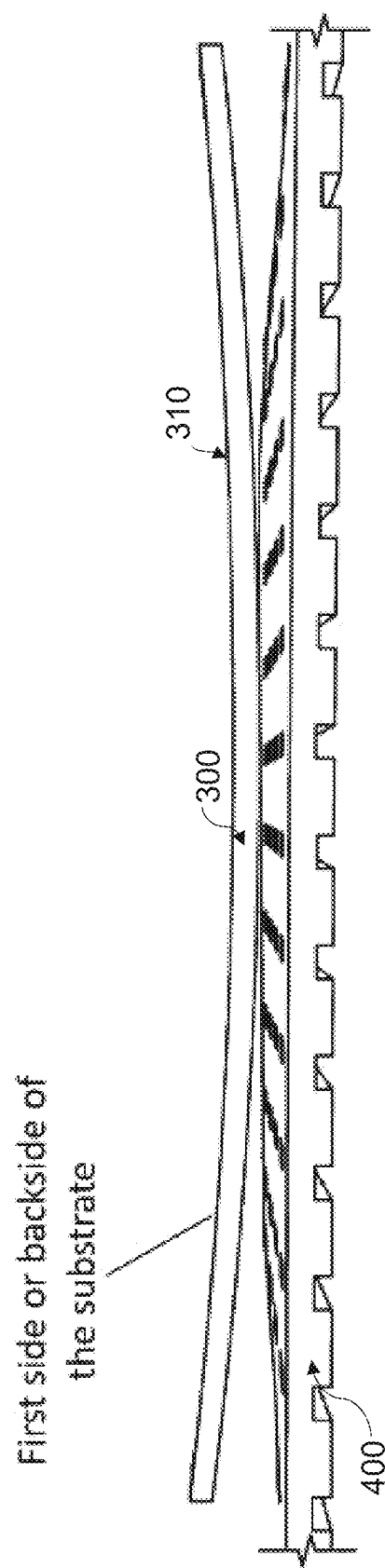
FIG. 8A illustrates the uniform longitudinal bowing resulting in a substrate when heated to induce melting tracks and pre-bend the substrate.
Figure 8B:
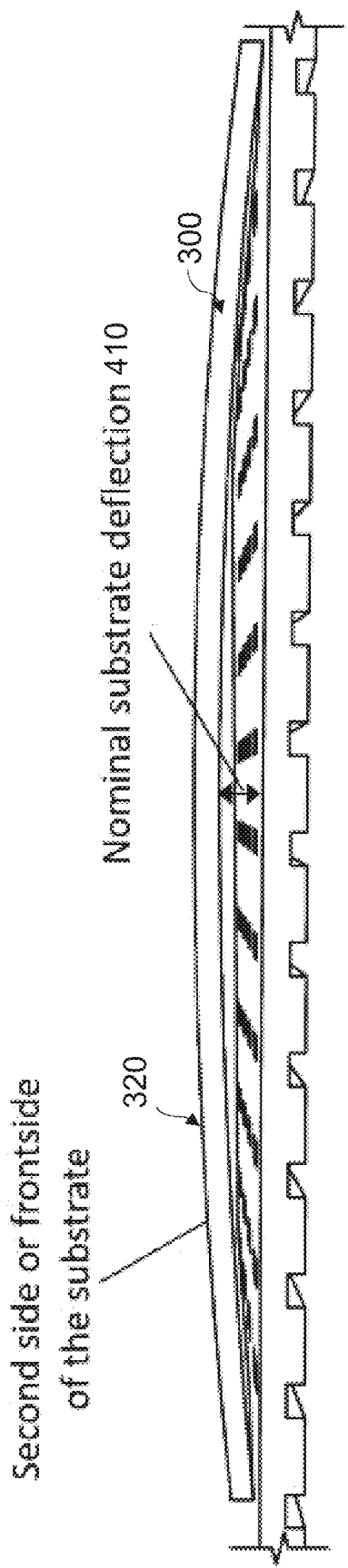
In FIG. 8B the substrate is flipped upside-down. In the substrate depicted, the maximum nominal substrate deflection 410 normal to the plane of the plate was about 15 mm. In both figures the pre-bend substrate is resting on the jig 400.

The thermal source of the melting tool can heat the backside of the substrate to form melting tracks in pre-defined locations onto the substrate to impart thermal stress into the substrate. The thermal stress can cause the substrate to bend. Because the substrate can be securely clamped to the jig, the bend of the substrate is not apparent while the substrate is attached to the jig. Once the clamps are removed, the substrate can bow upwards away from the jig i.e. in the direction of the thermal source. A uniformly deformed pre-bent substrate can be defined by a well-defined radius of the bow. The resulting uniform elasto-plastic pre-bending effect onto the substrate caused by the thermal energy application, after clamps to the jig have been removed is illustrated in FIGS. 7B and 8A. The resulting substrate 300 is curved upward away from the jig 400 and exhibits a nominal substrate deflection. In FIG. 8B the substrate is flipped upside-down. As seen in FIG. 8B, the pre-bent substrate has a uniform elasto-plastic bend (bow) caused by the application of the intense thermal energy and cooling gas to induce large temperature and stress gradients on the backside of the substrate. In FIG. 8B the nominal substrate deflection 410 is shown.

The thermally induced substrate pre-bending procedure can result in longitudinal residual stress distribution. A comparison of the residual stress map of several pre-bent substrates thermally pre-bent as described herein demonstrated the characteristic distribution of residual stresses, where large tensile stresses develop at the weld centerline ($+\sigma_L$ up to 600 Mpa) and are balanced by compressive stresses further away ($-\sigma_L$ up to $-300$ MPa).

The nominal substrate deflection $h_{sub}$ (bow) of the substrate along the z-direction ($h_{sub}=z_{max}-z_{min}$) for a substrate having dimensions 635 mm×190 mm×9.5 mm (L×W×T), can be 15 mm after thermally induced substrate pre-bending is applied. This is a measured value that was also validated by modelling. The substrate length ratio $L_r$ is the ratio between the new x dimension of the substrate $L_i$ and the substrate length $L_0$ of 635 mm. The predicted maximum substrate deflection $h_{Lr}$ is approximately proportional to the product between the nominal substrate deflection $h_{sub}$ and the square of the substrate length ratio $L_r$, which is calculated according to the formula:

$$L_r = L_i/L_0$$

and thus $$h_{Lr} \approx h_{sub} \times L_r^2.$$

As an example, a longer substrate size with a substrate length ratio of three (i.e. $L_r$=1905/635=3) is expected to bow 15×3²=135 mm after thermally induced substrate pre-bending is applied. Thus, the amount of deflection of the substrate can depend on the characteristics of the substrate. The longer the substrate, the higher/larger the deflection will need to be.

The thermal source for providing thermal energy to produce melting tracks on the backside of the substrate can be any energy source capable of delivering sufficient thermal energy to melt the substrate at the heat application area to form melting tracks. Exemplary thermal sources that can be used include an electric arc plasma, a laser beam, an electron beam, and any combination thereof. In some configurations, two or more melting tools providing separate thermal sources can be used. For example, one melting tool providing a thermal source can be used to pre-heat the substrate and a second melting tool providing a thermal source can be used to melt the pre-heated substrate to form the melting tracks. When multiple melting tools providing separate thermal sources are used, they can be the same or they can be different from each other. Example combinations of multiple melting tool providing DED thermal sources include two PTA torches producing electric arc plasmas, two laser devices producing laser beams, two electron beam devices producing electron beams, a PTA torch producing an electric arc plasma and a laser heat source producing a laser beam, a PTA torch producing an electric arc plasma and an electron beam heat source producing an electron beam, and a laser device producing an electron beam and an electron beam device producing an electron beam.

Sufficient heat can be applied to the substrate surface in order to heat the substrate to melt at least a portion of the substrate at the heat application area in order to form melting tracks. The targeted temperature to be delivered by the thermal source can be the melting temperature of the substrate material, or a temperature from 5° C.-50° C. greater than the melting temperature of the substrate, or a temperature from 10° C.-20° C. greater than the melting temperature of the substrate. The localized heating of the substrate can help to induce stress into the substrate to produce a highly stressed substrate in an elasto-plastic state, and when the substrate is unclamped from the jig, the substrate bows to form a pre-bent substrate to stabilize or balance the residual stresses imparted by the pre-bending steps. The highest stress typically can be induced at the melting track, with a tensile stress peak at the centerline of the melting track. The tensile residual stress peak can be close to the yield strength of the material. As the distance away from center line increases, residual stress becomes compressive. One can observe if enough stress has been induced by observing the amount of upwards displacement (i.e. bow). The higher the displacement the higher the residual stress introduced during pre-bending. For most substrates, the maximum tensile residual stress is close to the yield strength of the base material. The order and positions of these melting tracks relative to the DED can be varied to achieve a target residual stress redistribution.

The amount of heating and the number of melting tracks produced on the backside of the substrate necessary to induce the targeted stress can be determined experimentally. For example, the object can be produced on a first substrate using DED without pre-bending the first substrate, and the resulting distortion in the substrate can be measured. A second substrate having similar characteristics to the first substrate then can be pre-bent by forming melting tracks on the backside of the second substrate in an amount necessary to fully or partially compensate for the amount of distortion measured in the first substrate. The amount of heating and the number of melting tracks produced on the backside of the substrate necessary to induce the targeted stress also can be determined based on modeling predictions, modeling, calculations or combinations thereof. Modeling can be used, e.g., to predict distortion and residual stress development in the substrate, and experiments can be used to confirm the modeling predictions. Simulations also have been found to be in very good agreement with experimental data. In some embodiments, in addition to the pre-determined placement of the melting tracks from about 10 mm to about 20 mm from centerlines of the preform, the melting tracks also can be produced along the longest substrate length on parts with high aspect ratio. Assuming a squared and relatively symmetric preform shape is to be produced onto a squared substrate, a cross pre-bending thermal energy application pattern onto the underside of the substrate can be used to induce bending on both longitudinal and transverse directions. As a result, the mount system could assume a dome shape.

After formation, the pre-bent substrates can be handled in a consistent manner as would be done with a conventional substrate. For sake of consistency, the pre-bent substrate temperature can be selected, and the same temperature can be used for forming similar preforms. The temperature of the pre-bent substrate can be room temperature when used and fixed to the jig. The temperature of the pre-bent substrate can be 50° C. or higher when used and fixed to the jig. In typical additive manufacturing processes, the number of substrates required to manufacture a targeted number of preforms can be determined, and a sufficient number of pre-bent substrates can be produced one by one, and then each individually can be fixed to the jig at a target temperature, such as room temperature.

2. Securing Pre-Bent Substrate to the Jig

After the pre-bending of the substrate is completed, the pre-bent substrate can be attached to the jig or welding table. The pre-bent substrate can be attached to the jig, e.g., using clamps that are attached to the jig. The mount system 100 can be used as an underlying support between the pre-bent substrate and the jig. The pre-bent substrate can have the same curvature as the mount system 100. The pre-bent substrate can have a curvature that is different from the curvature of the mount system 100. The pre-bent substrate can be positioned so that the backside with the melting tracks can be in contact with the curved surface of the mount system 100. The clamps, which are attached to the jig, can exert a force on the pre-bent substrate to elastically deform the pre-bent substrate. The clamps can force the pre-bent substrate to conform to the curvature of the mount system 100. The clamps can be made of a high-strength steel, ultra high-strength steel, or a high-strength low-alloy steel.

As clamping progresses to secure the pre-bent substrate to the jig, the curvature of the pre-bent substrate can become gradually similar to that of the curved profile defined by mount system 100, and the clamping can result in the curvature of the pre-bent substrate to be the same as the maximum deflection of the curve profile defined by mount system 100. Sufficient force can be exerted by the clamps so that a surface of the pre-bent substrate is brought to conform to the curve profile defined by mount system 100. A thicker substrate can offer more resistance and thus can require the clamps to apply a higher force to overcome the elastic reaction of the pre-bending. The amount of force necessary for the clamps to attach the pre-bent substrate to the jig and bring the pre-bent substrate to confirm with the curved profile defined by mount system 100 can be from about 10 Nm to about 120 Nm. For example, for a Ti-6Al-4V substrate having a thickness of about 9.5 mm-10 mm, a torque of only 40 Nm can be exerted by the clamps to attach the pre-bent substrate to the jig and to conform the pre-bent substrate to the curved profile defined by mount system 100.

The clamps can be torqued to apply an initial tightening force to the substrate, followed by application of additional torque to apply a final torque to the substrate. The initial tightening can be achieved by sequential tightening of the clamps, or by tightening of clamps positioned opposite of each other. The curvature of the pre-bent substrate can become gradually similar to that of the curved profile defined by mount system 100.

Figure 14A:
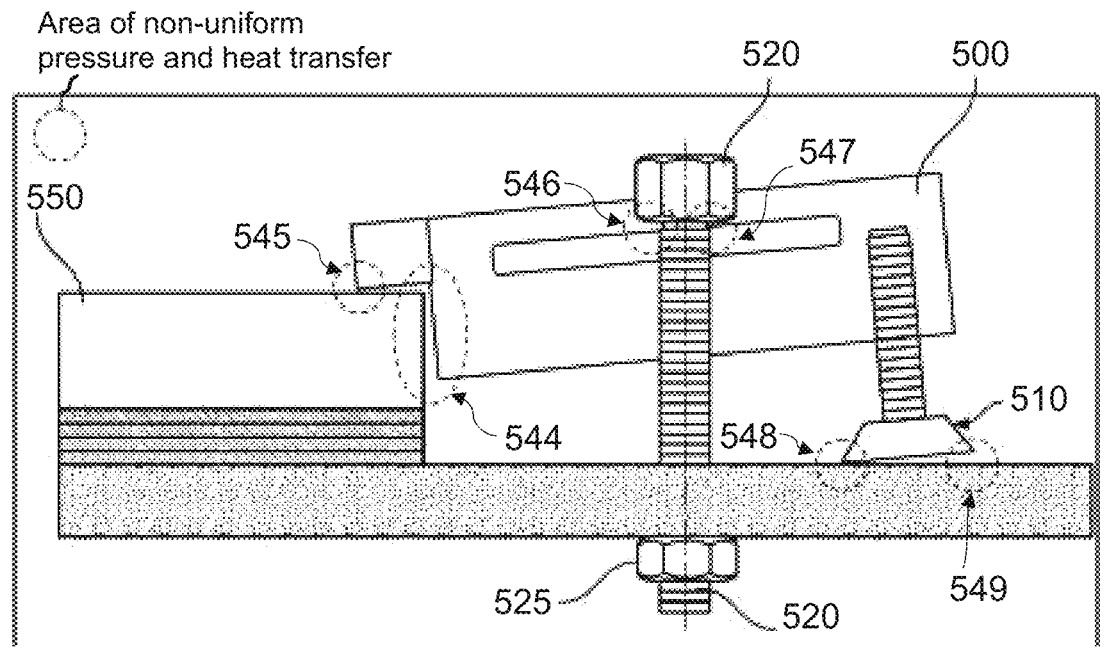
FIG. 14A is an illustration showing non-optimal setup of an individual clamp. The dashed circles indicate areas of non-uniform pressure and heat transfer distribution.

Due to the curvature of the curved profile defined by mount system 100, in examples, significantly less torque may be required to be applied to the substrate via the clamps than would be required to attach the pre-bent substrate flat to the jig without the mount system 100. The curvature of the curved profile defined by a mount system 100 can be mimicked by the plate-boundary conditions. To achieve satisfactory clamping, (a) consistent clamping force can be used by applying torque-controlled tightening of the bolt attaching the clamps; (b) consistent dimensions can be selected from the clamps; (c) clamping can be applied symmetrically; (d) an evenly distributed pressure and heat transfer distribution can be ensured by proper attachment of the clamps to avoid gaps and uneven pressure application; or (e) any combination of (a) through (d). For example, the clamp can be attached to the baseplate via a countersunk screw that is flush with the top surface of the clamp to ensure an evenly distributed between the clamp and the baseplate. The bottom and side contact facets of the clamps can be configured and placed so that they are flush and in contact with the baseplate to ensure even pressure and even heat transfer distribution. For example, see FIGS. 14A and 14B. The dashed circles 544, 545, 546, 547, 548, and 549 in FIG. 14A show areas of non-uniform pressure and heat transfer distribution because of the way the countersunk screw 510 and bolt 520 adjusted via nut 525 adjusts clamp 500 to attach the baseplate 550 to the jig's surface 530. In the illustration shown, the baseplate 550 is insulated from the jig's surface 530 by layers of alumna insulation plates 540 to 543.

Figure 14B:
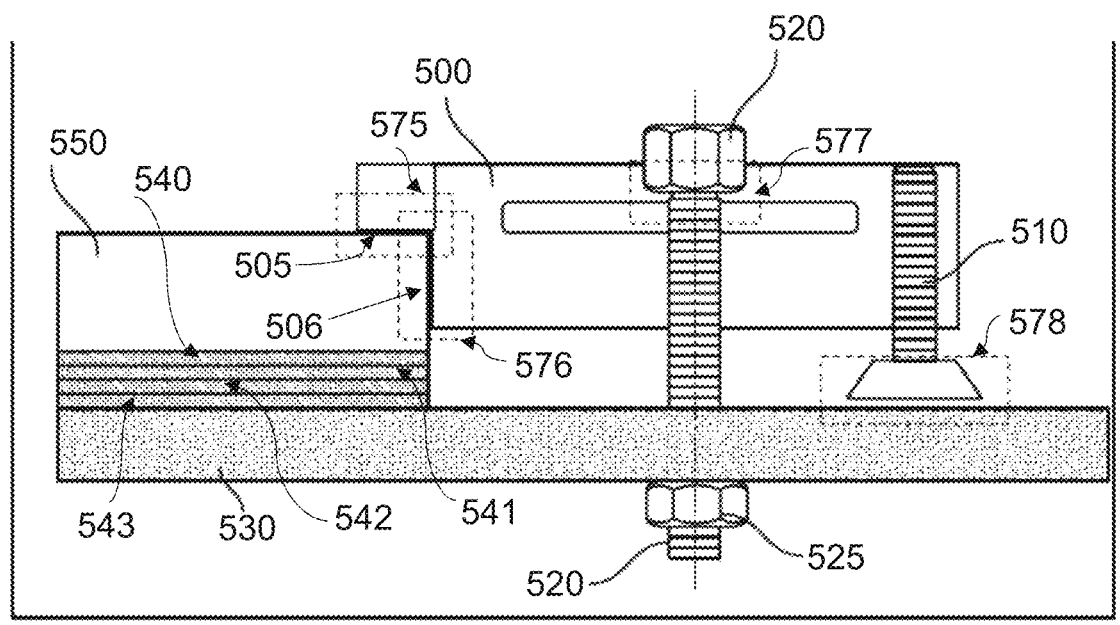
FIG. 14B is an illustration showing a setup of an individual clamp illustrating evenly distributed load onto the contact area of the clamp/baseplate ensuring even pressure and heat transfer distribution.

To avoid non-uniform pressure and heat transfer distribution, the countersunk screw 510 can be adjusted so that the tip 515 of the countersunk screw 510 is flush with the top surface 507 of the clamp 500, as illustrated in FIG. 14B. Doing so can result in uniform pressure and heat transfer distribution. The boxes 575, 576, 577 and 578 in FIG. 14A show areas of uniform pressure and heat transfer distribution achieved because of the way the countersunk screw 510 and bolt 520 adjusted via nut 525 adjusts clamp 500 to attach the baseplate 550 to the jig's surface 530. The illustrated embodiments show bottom contact facet 505 and side contact facet 507 of clamp 500 to be flush with the top and side surfaces, respectively, of the baseplate to ensure even pressure and heat transfer distribution.

When the pre-bent substrate is attached to the jig using the mount system 100 as an underlying support, there can be a slight redistribution of longitudinal residual stress. For example, the $+\sigma_L$ tensile stress peak at the weld centerline can increase from about 600 Mpa up to about 700 Mpa, while the $-\sigma_L$ compressive stress away from the centerline can decrease from about −300 Mpa to about −200 MPa.

The clamping of the pre-bent substrate to the mount system can occur in the elastic mode. The curvature imposed by the clamping of the substrate to the mount system can be completely reversible if the substrate were to be unclamped from the mount system 100 at this point. This is particularly true for substrates made of a metal having high spring-back at room temperature. The elastic deformation imposed by the force of the clamps can be distinguishable from the plastic deformation introduced into the substrate with the pre-bending steps.

The clamps used to fix the substrate to the jig or welding table typically can be made from a material that exhibits high strength and low deformability. Steel can be used as the material for the clamps because of its high strength, thermal stability and resistance to deformation. Steel typically can have a thermal conductivity higher than the substrate. For many substrates, the thermal transfer of the steel in the clamps can be orders of magnitude higher than the substrate. This difference in thermal conductivity between the clamps and the substrate can result in the clamps acting as heat sinks. As heat sinks, during the DED process, the clamps in direct contact with the substrate can result in the rapid flow of thermal energy from areas of the substrate adjacent or in the vicinity of point of attachment of the clamps to the clamps, and then from the clamps to the jig or welding table. This can result in the creation of high thermal gradients in the pre-bent substrate during the DED process. The high thermal gradients can impose stress and distortion on the substrate during the deposition process.

To mitigate or prevent formation of the thermal gradients due to the clamps acting as heat sinks, the clamps can be thermally insulated. The thermal insulation can mitigate or prevent transfer of heat from the substrate to the jig via the clamps. An insulative coating can be applied to all surfaces of the clamps. An insulative coating can be applied to all surfaces of the clamp that can come into contact with the substrate. The insulative coating can be any coating that does not effectively transfer thermal energy. The insulative coating can be made of a ceramic material, a silicon carbide, a silicon nitride, a boron carbide or any combination thereof. The ceramic material can be or comprise an alumina, a zirconia, titanium oxide, an alkaline earth metal silicate, an aluminium titanate, a zirconium dioxide, a zirconium dioxide stabilized by addition of yttrium oxide, a yttrium aluminium oxide, $ZrV_2O_7$, $Mg_3(VO_4)_2$ or a combination thereof. Any high temperature ceramic coating known in the art can be used (e.g., see U.S. Pat. No. 4,321,310 (Ulion et al., 1982), U.S. Pat. No. 5,789,330 (Kondo et al., 1998), U.S. Pat. No. 5,304,519 (Jackson et al., 1994); U.S. Pat. No. 6,387,539 (Subramanian, 2002); and U.S. Pat. No. 6,998,064 (Gadow et al., 2006). The clamps can be coated with zirconium dioxide stabilized by addition of yttrium oxide, such as a plasma sprayed $ZrO_2 \cdot 8Y_2O_3$. The insulative coating can include multiple layers of different types of ceramics, carbides or nitrides or combinations thereof, or multiple layers of one type of ceramic, carbide, nitride or combination thereof.

Many of these materials are commercially available and can be applied using various techniques known in the art. For example, the insulative coating can be applied using any process, including atmospheric plasma spray, magnetron sputtering, chemical or electrochemical deposition, such as electrophoretic deposition, or physical vapor deposition, such as electron beam physical vapor deposition, or any combination thereof.

The thickness of the insulative coating applied to the clamp can vary depending on the type of insulative material used, and its ability to support a load without being damaged by application of a compressive force. In some configurations, the thickness of the insulative coating can be from 0.1 mm to 5 mm, or from 0.25 to 4 mm, or 0.3 to 3 mm, 0.4 mm to 2 mm, or 0.5 mm to 1.5 mm. The insulative coating can be at least 0.1 mm, or at least 0.25 mm, or at least 0.5 mm, or at least 0.75 mm, or at least 1 mm, or at least 1.25 mm, or at least 1.5 mm, or at least 2.0 mm, or at least 2.5 mm, or at least 3.0 mm, or at least 3.5 mm, or at least 4.0 mm, or at least 4.5 mm. The insulative coating can have a thickness of 0.1 mm, or 0.25 mm, or 0.5 mm, or 0.75 mm, or 1 mm, or 1.25 mm, or 1.5 mm, or 2.0 mm, or 2.5 mm, or 3.0 mm, or 3.5 mm, or 4.0 mm, or 4.5 mm or 5 mm. The insulative coating layer can reduce heat transfer from the DED substrate to the jig, thereby reducing heat loss from the DED substrate. An example of an insulative coating is 0.5 mm to 1.5 mm $ZrO_2 \cdot 8Y_2O_3$ plasma sprayed onto the contact surfaces of the clamps to aid in the reduction of conduction heat transfer from the DED substrate to the clamps. This can provide increased thermal insulation and lower thermal conductivity.

To further reduce thermal transfer from the substrate to the jig via the clamp, the surfaces of the clamp in thermal communication with the substrate can be modified to have a knurled pattern. The knurling of the surface can mitigate the amount of the surface of the clamp in contact with the substrate. The knurling can reduce the chance of thermal conductivity between the clamp and the substrate. Any knurling pattern known in the art can be used on a surface of the clamp that can come into contact with the substrate. Exemplary knurling patterns include angled patterns such as diagonal patterns, straight line patterns, diamond patterns, or any combination thereof. The knurled pattern also can have an insulative coating layer on its surface.

To reduce thermal transfer from the substrate to the jig via the clamp, the surfaces of the clamp in thermal communication with the substrate can be modified to have a corrugated surface that includes a series of ridges and troughs. The corrugated surface can mitigate the amount of the clamp in contact with the substrate. The corrugated surface can reduce the chance of thermal conductivity between the clamp and the substrate. Any corrugated pattern known in the art can be used. The corrugations can be in any direction on a surface of the clamp. Exemplary configurations include angled patterns such as diagonal corrugations, straight line corrugations parallel to the long edge, straight line corrugations parallel to the short edge, or any combination thereof. The corrugated surface also can have an insulative coating layer on its surface.

Due to limitations in the coating technology, thicker layers of insulative coating can be more difficult to achieve that can withstand compressive forces necessary to secure the pre-bent substrate to the jig. The specific compressive strength of the insulative coating can be determined by the composition of the insulative coating. For example, a 0.5 to 2.0 mm coating of a ceramic based on zirconium dioxide stabilized by addition of yttrium oxide has been found to provide good thermal isolation as well as good compressive resistance without damage to the insulative coating when the clamp is used to connect the substrate to the jig.

An exemplary configuration of clamp is shown in FIGS. 9A, 9B and 9C. FIG. 9A shows a bottom view of clamp 500 having a threaded hole 501 for accepting a countersunk screw and a hole 502 that accommodates a bolt. The top surface 507 can include a ceramic-coated surface 509 at the edge that will be in contact with the baseplate. The top surface 507 can be corrugated. FIG. 9B shows a side view of clamp 500 showing the ceramic-coated surfaces 509 of the bottom contact facet 505 and side contact facet 506 that comes into contact with the baseplate. FIG. 9C shows a skewed overhead view showing a three-dimensional view of clamp 500, showing the threaded hole 501 and the ceramic-coated bottom contact facet 505 and side contact facet 506 of clamp 500. Clamps having the same design can be used (e.g., all having the same length, or same width, or same length and width). Clamps having differing lengths and/or widths also can be used.

In examples, thermally insulated clamps can be placed around the entire perimeter of the pre-bent substrate. An exception to using only insulated clamps may be when a PTA torch is used as a DED melt tool to provide an electric arc plasma as a thermal source. In such configurations, one or more non-insulated clamps can be used to provide a path for current. For example, in an exemplary configuration, two or three uninsulated clamps can be used to ensure a stable electrical current path from the power supplies. In such a configuration, one or two uninsulated clamps can be positioned on the short edges of the baseplate, and one uninsulated clamp can be positioned at the middle section of the longest baseplate dimension. Other configurations can be used.

Figure 10:
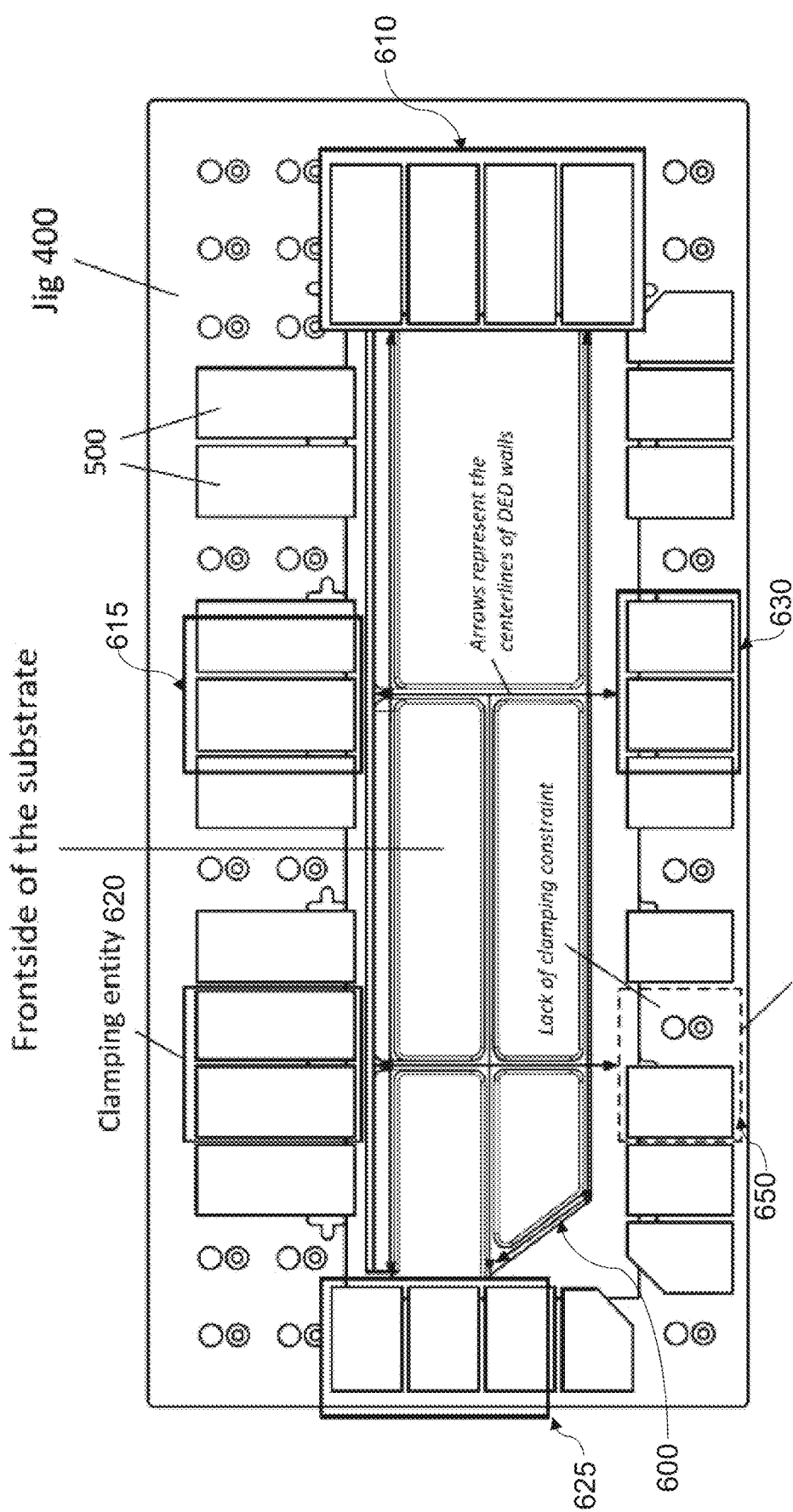
FIG. 10 illustrates an exemplary clamping arrangement to use insulated or corrugated clamps to attach the pre-bent substrate to the jig. The illustration shows that the clamps can be positioned such that the centerlines of the clamp (or clamping entity when several clamps are used in combination, such as showed in the solid boxed outlines around several of the clamps) meet the centerlines of start/end positions of the DED walls wherever possible. These substrate clamping constraints can substantially reduce the deformation effects arising primarily from longitudinal residual stresses. Non-optimal clamping can result in local deformation or buckling caused by the lack of clamping constraint. For illustration, a non-optimal clamping arrangement 650 is illustrated in the dashed box of the drawing. Only one clamp is used off-center to axially constrain the movement of the baseplate upwards. This is a non-optimal clamping arrangement because the centerline of the clamp/ entity does not meet the centerlines of start/end positions of the DED wall.

To mitigate stress and distortion in the substrate during metal deposition and object fabrication, clamps can be positioned onto the substrate in a way that the centerlines of the clamps meet at the start/end positions of DED strings/walls wherever possible. An exemplary configuration is shown in FIG. 10. In the configuration illustrated, clamps 500 are positioned around preform 600 so that almost all of the periphery of the substrate 300 is clamped to the jig 400, positioned so that the centerlines of the clamps 500 meet the centerlines of start/end positions of DED strings/walls of preform 600 wherever possible (illustrated as clamping entities 610, 615, 620, 625, and 630). These substrate clamping constraints can substantially reduce the deformation effects arising primarily from longitudinal residual stresses during deposition. Non-optimal clamping can result in local deformation or buckling caused by the lack of clamping constraint, as shown in the dashed box outline 650.

Different clamping arrangements can be using during pre-bending and attaching the pre-bent substrate to the jig for DED processing. The differences in the clamping arrangements can be selected because, during pre-bending, thermal energy application to the backside of the substrate using a melting tool providing the DED thermal source can require increased access by the thermal source to the full-length or nearly full-length of the substrate in order to produce a uniform deflection along the longest substrate length. Insulated clamps may not be used at the edges in order to enable the melting tool providing the DED thermal source to apply thermal energy to the full-length of the substrate. During build of the object by metal deposition on the frontside of the substrate, insulated clamps can be placed around the perimeter of the substrate, particularly at start/end positions of DED walls to help reduce local deformations arising from residual stress development. The clamping configuration can (1) promote symmetry across the plate, (2) make use of clamps with identical geometry when possible, (3) allow desired access to substrate by the melting tool providing the DED thermal source, and (4) fulfill the torque requirements necessary to attach the pre-bent substrate to the jig.

The use of the mount system 100 can significantly improve the manufacturing process, but it is possible to perform the DED process on the frontside of the pre-bent substrate by using sheets of insulative material, such as the conventional sheets or plates of alumina ($Al_2O_3$) insulation cut to form a curvature roughly matching the bow of the pre-bent substrate. This is significantly more work intensive than the use of the mount system 100 provided herein. In addition, due to variation in thickness of alumina insulation sheets, and the formation of the layers of the pre-cut sheets to match the curvature of the pre-bent substrates, variations between workpieces can occur. The various mount systems 100 provided herein can mitigate or prevent such part-to-part variation by providing a structure with consistent physical and mechanical characteristics that can be used multiple times. In addition, in examples, the mount system 100 may exclude any ceramic sheet, plate, or pylon and thus provide the added benefit of less moisture in the DED atmosphere.

3. Pre-Heat the Substrate

Once the pre-bent substrate has been secured to the jig using the mount system 100 and insulated clamps, the pre-bent substrate can be pre-heated prior to beginning the DED process. The pre-heating step is intended to treat most of the surface of the frontside of the substrate with a heat source to uniformly heat the substrate as a whole to a target temperature, followed by building of the workpiece using the DED process while the pre-bent substrate is still hot.

Contrary to the way energy is applied to the backside of the substrate in the pre-bending step where steep thermal gradients and high cooling rates are selected in order to create higher internal tensile and compressive stresses, during the pre-heating step, energy is delivered towards the frontside of the substrate in a more gentle and consistent fashion. During the pre-heating step, energy can be directed to the frontside of the substrate using the thermal source under conditions that do not melt locally the substrate surface. During the pre-heating step, energy can be directed to the frontside of the substrate using the thermal source under conditions that do not form continuous melting tracks. Because close-to-uniform heating is desired, energy from the thermal source can be applied at relatively low speeds of the melting tool providing the thermal source, and with the melting tool providing the thermal source positioned at a higher standoff distance (further away from the substrate) in order to apply the thermal energy at a lower energy density. In addition, because the pre-heating step is intended to heat the substrate prior to workpiece build using the DED process, no cooling gas is applied using a gas jet device. Hence, the cooling rate is significantly lower than the cooling rate that can occur in the pre-bending step.

This slower heating/cooling cycle during pre-heating can promote slow cooling rates and low thermal gradient formation in the substrate along the x, y and z-direction. Application of energy during pre-heating can be done in a way that allows slow residual heat build-up, because the heat can dissipate throughout the pre-bent substrate volume by conduction. For example, lower thermal gradients can be delivered to the substrate at lower energy density. These conditions can generate a "close to" uniform temperature distribution across the baseplate to allow the slow build-up of residual heat as heat dissipates throughout the baseplate volume by conduction. Because the pre-bent substrate is thermally isolated from the mount system 100, and insulated clamps are used to secure the pre-bent substrate to the jig, residual heat can be more easily retained in the substrate.

Low energy density can be delivered to the substrate in a sequential fashion in order to generate a close-to-uniform temperature distribution across both the surface of the substrate and through the thickness of the substrate. In order to avoid exposure of one area to accumulated thermal energy, the application of energy can begin at a first edge of the substrate and can continue across the surface of the substrate along the x direction until the opposite second edge of the substrate is reached. The melting tool providing the thermal source then can be moved back to the first edge and repositioned in the y direction some distance from the first pass of energy application and energy is applied along the x direction. This process is repeated until the temperature of the pre-bent substrate has reached a targeted temperature. The more uniform the temperature distribution is in the substrate, the better for mitigating stress and distortion effects from occurring in the substrate.

Figure 11:
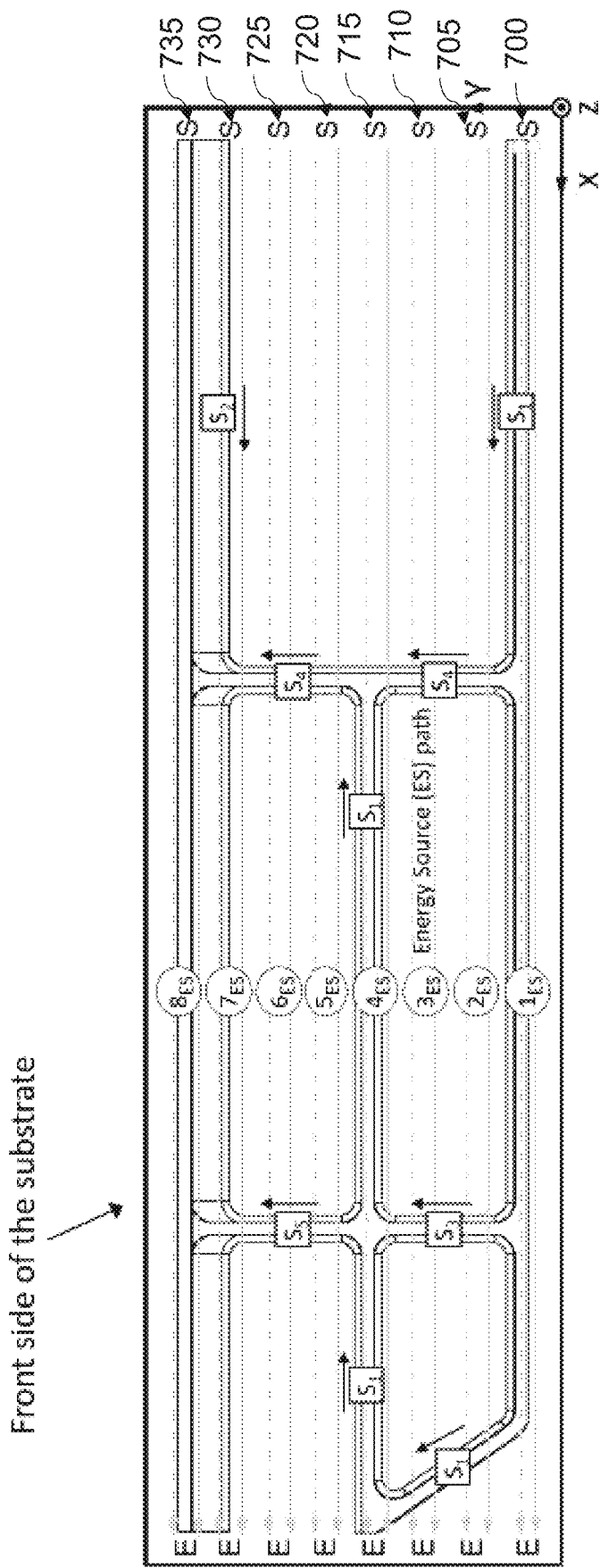
FIG. 11 shows schematically the relative positions of the black faded pre-heating paths on the frontside of the substrate prior to DED deposition, with an overlay of the shape of the workpiece to be formed. The exemplary embodiment shows application of low energy density applied by the thermal source in the x direction from short edge to short edge across the face of the pre-bent substrate in the y direction. The figure shows solid and dashed black faded lines which represent for example the toolpaths and pre-heating sequences of two melting tools running in parallel.

An exemplary pattern for energy application during pre-heating is shown in FIG. 11. The black faded arrows indicate the direction/path of the DED energy source, the circles containing $X_{ES}$ indicates the sequence X where X is 1 to 8 across the surface of the second side 320 of the substrate 300, with S indicating the start of the path and E indicating the end of the path of energy application, resulting in a heating path. In the illustrated pattern, heating begins at a bottom edge across the x direction ($1_{ES}$), then the heat source is moved in the y direction to a point about one-ninth of the way up from the initial heating path and heat is applied in the y direction from short edge to short edge ($2_{ES}$). This procedure is repeated for $3_{ES}$, $4_{ES}$, $5_{ES}$, $6_{ES}$, $7_{ES}$, and $8_{ES}$ until heat has been applied across the surface of the substrate 300. The first heating path 700 corresponds to $1_{ES}$. The second heating path 705 corresponds to $2_{ES}$. The third heating path 710 corresponds to $3_{ES}$. The fourth heating path 715 corresponds to $4_{ES}$. The fifth heating path 720 corresponds to $5_{ES}$. The sixth heating path 725 corresponds to $6_{ES}$. The seventh heating path 730 corresponds to $7_{ES}$. The eighth heating path 735 corresponds to $\delta_{ES}$. A single energy source or a plurality of energy sources can be used in the pre-heating paths. The figure shows solid and dashed black faded lines which represent the toolpaths and pre-heating sequences of two melting tools running in parallel. While the illustrated embodiment describes heating using a DED energy source, other energy sources can be used. Exemplary alternate energy sources include, e.g., one or more lasers, one or more induction heaters, or a combination of any of a laser, a DED energy source and an induction heater. In addition, other methods and devices that can enable the baseplate to be uniformly heated, such as induction heating, resistive heating, or others, also can be used.

The direction of pre-heating can be the same as the actual DED process forming the preform so that the temperature and residence time in areas under DED deposition areas can be similar. For example, as illustrated in FIG. 11, the start (S) and end (E) positions of pre-heating thermal energy applications (shown as black faded arrows and each labelled with a circle) are in the same direction of the metal deposition during the DED process.

Thermal energy application can be applied using any source that generates thermal energy. For example, electric arc-based, laser beam and electron beam thermal sources can be used, alone or in combination, to achieve pre-heating effects. For example, one or more thermal arc welding sources, such as a preheating PTA torch and a melting PTA torch, can traverse the substrate sideways to heat the substrate. The PTA torches can be positioned to mitigate temperature gradient formation and reduce the total pre-heating time. Other thermal sources based on laser energy or electron beam energy can be also used for the same purpose but using a suitable set of parameters to achieve similar heating of the substrate. The spacing between pre-heating thermal energy application areas can depend on the amount of heat delivered by the thermal sources. The spacing between pre-heating thermal energy application areas can depend on the heat distribution delivered by the thermal sources.

For example, two PTA thermal electric arc plasma welding torches can be used simultaneously traversing sideways to heat the substrate. The two torches can have a relative (fixed) distance from each other, such as about 20 mm to 40 mm. The configuration can apply the thermal energy along the x direction and across the y direction in a way that heat is delivered and spread out as uniformly possible without superimposing heat source centerlines. On the other hand, and for a fixed substrate width, the amount of pre-heating can differ if more concentrated thermal sources are to be used for this purpose, such as laser energy or electron beam energy. The laser or electron beam spots can be designed to be larger in order to affect wider heating areas onto the substrate. Other methods and devices can enable the substrate to be uniformly heated, including induction heaters and resistive heaters.

The melting tool providing the DED thermal source(s) can be used to perform uniform pre-heating. The positioning, sequence and parameters used to perform the pre-heating using the melting tool providing the DED thermal source(s) can be controlled so that application of energy to the substrate can result in a lower thermal gradient generation than was imposed on the substrate during the pre-bending step. The pre-heating can be performed to uniformly raise the temperature of the substrate. In exemplary embodiments, pre-heating can be performed to uniformly raise the temperature of the substrate to a temperature in the range of from about 350° C. to about 650° C., depending on the material of the substrate. For example, substrates containing Ti can be preheated to a temperature in the range of about than 400° C. to about 550° C. For some Ti alloys, the substrate can be pre-heated to a temperature in the range of about 450° C. to about 500° C. to mitigate thermal gradient formation when DED is performed. The pre-heating can mitigate internal stress buildup during DED processing by reducing any localized stress due to heating when molten metal is deposited to build the workpiece. By pre-heating the substrate to elevated temperatures, such as a warm forming temperature or a hot forming temperature, preparation of the weld bead on the substrate during DED workpiece formation can result in a distortion close to zero because the resulting thermal gradient can be significantly smaller than the thermal gradient produced through the thickness when the weld is deposited onto a substrate at room temperature. The pre-heating is not meant to markedly modify or fuse the substrate surface, but can result in the formation of weld lines without any metal being added.

Indirect heating, such as heating a pre-bent substrate clamped to a jig in an oven to uniformly raise temperature of substrate, can be used for pre-heating. In some applications, this is not feasible or practical. The time required to move the substrate/jig combination from an oven into a chamber in which the DED process can be done can result in significant loss of residual heat from the substrate, defeating the purpose of the pre-heating step. The system can be modified to include an oven that can be accessed via the deposition chamber to allow use of an oven to pre-heat the substrate.

Direct heating using a heating device positioned to apply heat across the surface of the substrate when it is attached to the jig can be used. Any method(s) and heating device(s) that enable the substrate to be uniformly heated prior to deposition can be used. The heating devices can be or include inductive heaters, resistive heaters, or combinations thereof. Exemplary heaters include a conductor-in-conduit heat source, a heater strip, a resistive heating strip, an infrared heater, a Positive Thermal Coefficient ceramic heater, a thick film ceramic heater, a resistance wire or a resistance ribbon heating device, and an induction heater and heaters that can include any combination thereof.

4. DED Process to Build the Workpiece

Immediately after the substrate is pre-heated to the target temperature, the DED process can be performed to form the workpiece on the substrate. During build of the object by metal deposition on the frontside of the substrate, clamps can be normally positioned at start/end positions of DED walls to help reduce local deformations arising from residual stress development.

The pre-bent substrate can be brought into contact with the mount system 100 via the insulated/non-insulated clamps attached to the jig prior to pre-heating. In examples, the substrate can be thermally separated from jig. In examples, the mount system 100 may be ceramic free, or include an insulating ceramic coating on a surface that can come into contact with the pre-bent substrate. The pre-bent substrate does not bond to the mount system. Further, as can be seen from this arrangement, the workpiece can be built on the surface of the pre-bent substrate while the pre-bent substrate is secured to the jig. While the pre-bent substrate can become part of the workpiece, no part of the mount system 100 becomes part of the workpiece.

While the pre-bent substrate does have a bow, and is coupled to the mount system that also has a bow, the slope of the curve of the pre-bent substrate secured to jig with the mount system as a support between the pre-bent substrate and the jig does not affect the overall deposition conditions.

The radius of curvature of the curved profile defined by the mount system may be large enough that the effect of gravity does not adversely affect the weld pool dynamics, so that deposition onto the pre-bent substrate that is in contact with the mount system can be similar to that achieved if depositing on the substrate in a flat position. The radius of curvature of the curved profile defined by the mount system can be selected so that the effect of gravity caused by the slope does not affect the behaviour of the liquid melt pool being deposited or formed on the surface of the pre-bent substrate. In addition, the controller used in DED processing to build the workpiece can adapt the z-coordinates to the curvature of the curved profile defined by the mount system to ensure that consistent energy/processing conditions can be delivered by the DED process during manufacturing of the workpiece. The CAD-CAM program instructions can be executed to result in the melting tool providing the DED thermal source following the exact shape of the curved profile defined by the mount system to ensure that overall processing conditions, particularly standoff distance, are not affected.

The design for the workpiece to be built by the DED process can be positioned on the frontside of the substrate so that the majority of the walls of the workpiece formed by deposition of molten metal are between, and preferably equally distant from, adjacent melting tracks on the backside of the substrate. With this positioning, non-uniform plastic deformation and high tensile stresses that can occur in the melted region during DED manufacture of the workpiece can occur in an area of high compressive forces imposed by the pre-bending treatment, and compressive forces that can form as the weld of the workpiece cools can occur in the areas of high tensile stresses imposed by the pre-bending treatment. Accordingly, because of the positioning of the walls of the workpiece on the frontside of the substrate relative to the melting tracks on the backside of the substrate, the residual stress fields can be balanced, mitigating the total distortion in the as-deposited preform.

An exemplary deposition pattern for formation of a preform is illustrated in FIG. 11. As illustrated, the preform 600 positioned on the frontside or second side 320 of the substrate 300 so that the majority of the walls, such as 380, 382, and 384, of the workpiece preform 600 formed by deposition of molten metal are between, and preferably equally distant from, adjacent pre heating paths 700, 705, 710, 715, 720, 725, 730, and 735 on the backside or first side 310 of the substrate 300. An exemplary DED sequence pathway per layer is indicated sequentially by the boxes $S_1$ through $S_5$, with the arrows indicating DED direction per layer.

In the methods for producing a metal workpiece using DED processes provided herein, a three-dimensional object of a metallic material can be made by fusing together successive deposits of the metallic material onto a substrate. Any DED process can be used to build the workpiece. The DED process can use one or more melting tools providing an energy source, alone or in combination. Exemplary melting tools that can be used include a PTA torch providing an electric arc plasma as a thermal source, a laser device providing a laser beam as a thermal source, an electron beam device providing an electron beam as a thermal source, and any combination thereof. In some configurations, two or more melting tools providing thermal sources can be used. For example, one melting tool providing a DED thermal source can be used to pre-heat the substrate and a second melting tool providing a DED thermal source can be used to melt a metallic material to form molten metal that can be deposited on the pre-heated area. When multiple melting tools providing DED thermal sources are used, they can be the same or they can be different from each other. Exemplary combinations of multiple melting tools include two PTA torches, two laser beam devices, two electron beam devices, a PTA torch and a laser beam device, a PTA torch and an electron beam device, and a laser beam device and an electron beam device.

In some methods, a first melting tool can be used to deliver energy to at least a portion of the surface of the base material, e.g., at the position at which the metallic material is to be deposited, for surface heating of the substrate. This is different from the pre-heating step that is used to raise the temperature of the whole substrate up to a target temperature in order to minimize thermal gradients during the DED process. In contrast, for surface heating of the base material, whether it is the substrate or a layer of previously deposited metal, the first melting tool delivers high intensity energy to a limited area of the base material, raising the temperature of the base material at the area of energy application to a temperature slightly below, such as 0.1% to 10% below melting temperature, or to melting temperature. The surface heating of the base material can improve weld bead wetting and spreading characteristics. The surface heating of the base material can improve weld bead contact angles. The surface heating of the base material can make the surface more receptive to the molten metal that is to be deposited on the heated surface.

A second melting tool can be used to heat and melt a metallic material such that molten metallic material is deposited onto the surface heated area of the base material heated by the first melting tool. A gas jet device can be used to direct a cooling gas across the surface of a liquid molten pool, or to impinge on the surface of the liquid molten pool, or to impinge upon a surface of a solidified material adjacent to a liquid-solid boundary of the liquid molten pool, or any combination thereof. The base material can be moved relative to the position of the first and second melting tools and the gas jet device in a predetermined pattern such that the successive deposits of molten metallic material solidify and form the three-dimensional workpiece. Alternatively, the first and second melting tools and the gas jet device can be moved relative to the position of the base material in a predetermined pattern such that the successive deposits of molten metallic material solidify and form the three-dimensional workpiece.

In the methods provided herein, the cooling gas can be or include an inert gas, such as argon, helium, neon, xenon, krypton and combinations thereof. The cooling gas can have a flow rate measured at the inlet from about 1 L/min to about 300 L/min. The cooling gas can be applied in a constant stream, or can be applied intermittently, or can be applied in a pulsed flow. The flow of the cooling gas can be adjusted to produce a turbulent flow of the cooling gas in the vicinity of the molten pool. For example, the velocity of the cooling gas flowing through gas jet device can be increased so that the cooling gas exiting the gas jet device exhibits turbulent flow instead of laminar flow. The cooling gas can be delivered using a plurality of nozzles on a single gas jet device or using a plurality of gas jet devices so that a combination of laminar flow and turbulent flow of the cooling gas can be directed in the vicinity of the molten pool.

The temperature of the cooling gas applied can be any temperature. The cooling gas temperature can be the ambient temperature of the chamber in which the additive formation process is performed. The cooling gas temperature can be about room temperature or less, such as about 25° C.

or less. The cooling gas can be at a refrigerated temperature, such as from −150° C. to about 4° C., or from about −10° C. to about 10° C.

The number and configuration of nozzles of a gas jet device, and/or the number of gas jet devices, and their configuration and placement, can be selected to deliver cooling gas that covers a length of the workpiece, such as a distance at or surrounding the thermal energy impingement area, from about 5 mm to about 50 mm, or from about 10 mm to about 40 mm, or from about 15 to about 30 mm, along the direction of travel.

In the methods provided herein, a melting tool providing a DED thermal source can be used in combination with the gas jet device to control melt pool conditions, with the gas jet device producing a cooling gas resulting in a temperature reduction from about 1200° C. to about 600° C., or from about 1000° C. to about 800° C. In some methods where the workpiece is formed of a Ti alloy, a temperature reduction from 1000° C. to 800° C. can be used.

The methods provided herein can be performed in any additive manufacturing system. The methods can be performed in a system in which an inert gas encompasses just a thermal source, such as an electric arc plasma, or encompasses a melting tool containing a thermal source, or encompasses the melting tool and the workpiece. The methods can be performed in a system that includes a closed chamber filled with an inert gas to provide an inert atmosphere where the whole process is performed in an inert atmosphere. The inert atmosphere can be or contain argon, xenon, neon, krypton, helium or combinations thereof, allowing inert atmosphere deposition.

Figure 12A:
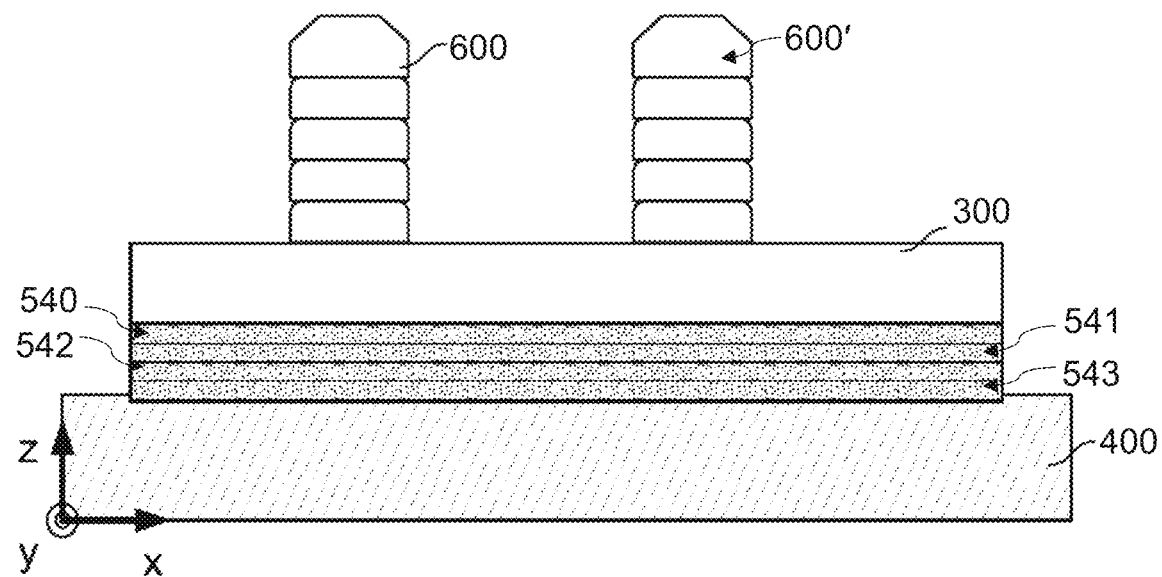
FIG. 12A depicts schematically an example of a conventional directed energy deposition configuration where a substrate is separated from a jig using for example sheets of alumina insulation or other substrate supporting mechanisms, and a workpiece is manufactured in a layer upon layer fashion. This configuration will minimize the heat flow from the DED substrate to the jig, while preventing the withdrawal of heat generated by the DED process.
Figure 12B:
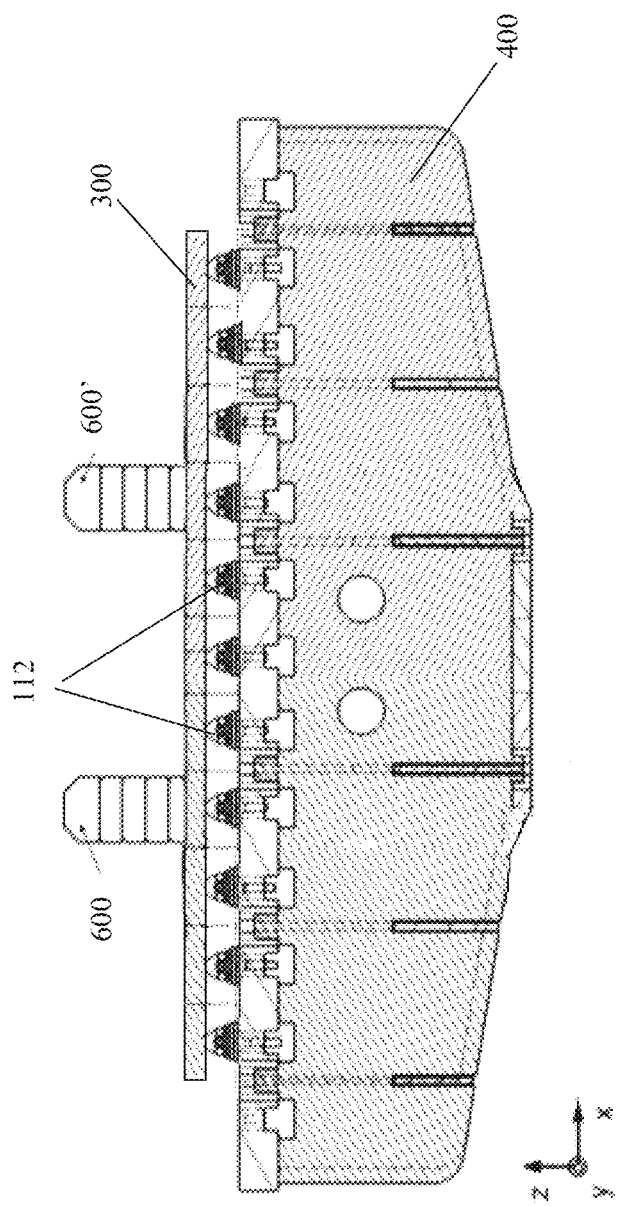
FIG. 12B illustrates an exemplary configuration for directed energy deposition using the mount system 100 including a pin support system 110 as provided herein viewed in the y-direction. The mount system serves as an underlying support structure for a pre-bent substrate when the pre-bent substrate is attached to a jig. The workpiece is manufactured in a layer upon layer fashion.

Exemplary differences between conventional substrate configurations for DED processes and the processes provided herein using the mount system 100 implemented as pin support system 110 are illustrated in FIGS. 12A and 12B. FIG. 12A illustrates a conventional configuration viewed in the y-direction, where a substrate 300 is secured to a jig 400 (via clamps that are not shown) but is thermally isolated from the jig 400 by alumina insulation plates 540, 541, 542 and 543 positioned between the substrate 300 and the jig 400. Substrate 300, which has not been subjected to any stress mitigation treatment, is flat, and metal material is deposited during the DED process on the upper surface of substrate 300 to produce preforms 600 and 600'.

Figure 12C:
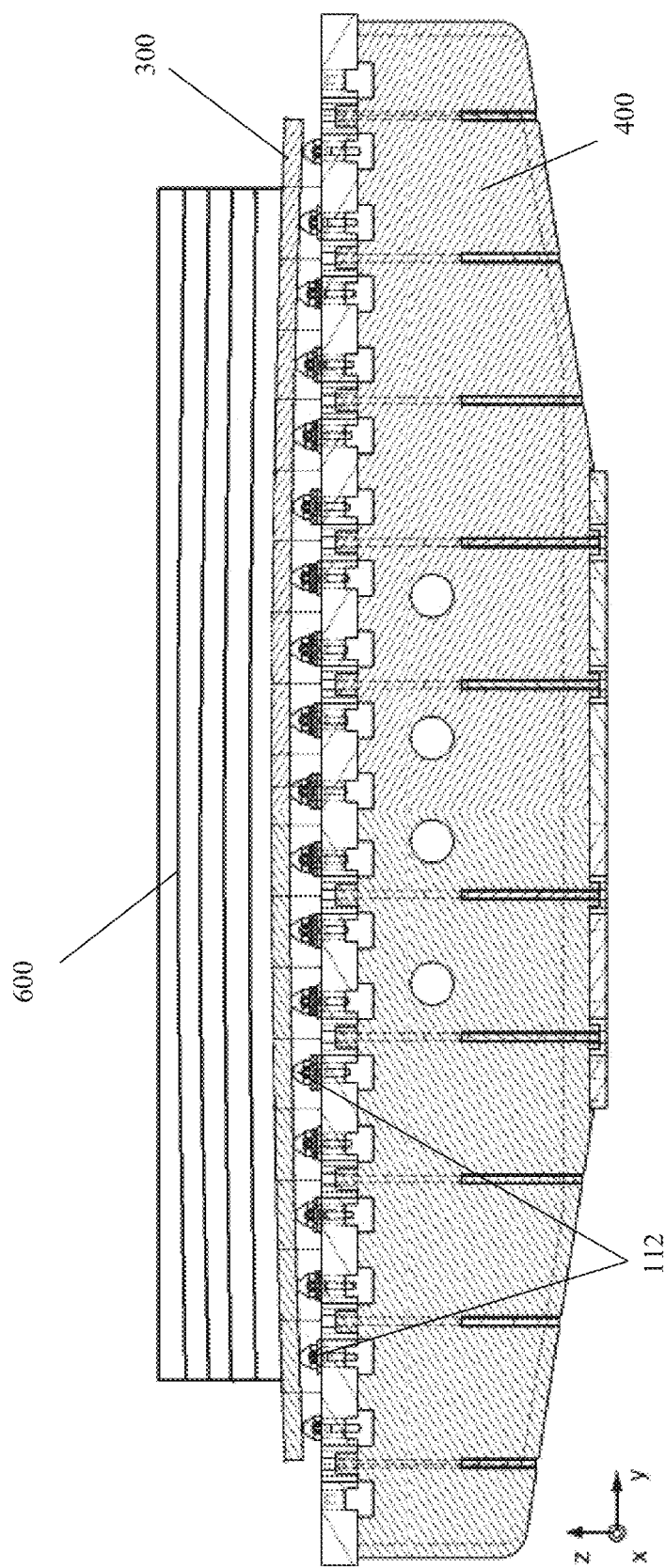
FIG. 12C illustrates an exemplary configuration for directed energy deposition using the mount system 100 including a pin support system 110 as provided herein as shown in FIG. 12B but viewed in the x-direction. The mount system serves as an underlying support structure for a pre-bent substrate when the pre-bent substrate is attached to a jig. The workpiece is manufactured in a layer upon layer fashion.

In contrast, FIG. 12B illustrates an exemplary embodiment of a substrate configuration using the mount system 100 implemented as a pin support system 110 viewed in the y-direction for comparison with the illustration of FIG. 12A. FIG. 12C illustrates an exemplary embodiment of a substrate configuration using the mount system 100 implemented as a pin support system 110 of FIG. 12B but viewed in the x-direction to illustrate the preform 600 may be deposited along the length of substrate 300. In the illustrated configuration, the pin support system 110 can serve as an underlying support for substrate 300 when the substrate 300 is secured to the jig 400 (via clamps that are not shown). The pin support system 110 can obviate the need for use of any alumina insulation plates, or other substrate supporting apparatus, conventionally used to thermally separate the substrate from the jig, because the mount system 100 may be configured to thermally isolate the substrate 300 from the jig 400. The substrate 300 can be subjected to the stress mitigation processes disclosed herein, resulting in pre-bending of the substrate 300. The pre-bent substrate 300 can be clamped to the pin support system 110 using insulated clamps (not shown). In examples, the radius of curvature of the curved defined by pin support system 110 may be large enough that the effect of gravity does not adversely affect the weld pool dynamics, so that deposition is similar to that achieved as if depositing in a flat position. Metal material is deposited during the DED process on the upper surface of substrate 300 to produce preforms 600 and 600'.

D. SYSTEMS

Also provided are systems for building metallic workpieces by DED processes. The systems can include a jig to which a pre-bent substrate is secured; a mount system 100 that can act as an underlying support of the pre-bent substrate when the pre-bent substrate is secured to the jig; insulated clamps for securing the pre-bent substrate to the jig; one or more melting tools comprising a DED energy source to melt a source of metal into metallic molten material that can be deposited on a surface of a base material (for the first layer, the base material will be a surface of the substrate; for subsequent layers, the base material will be the surface of the previously deposited metal layer); a gas jet device that can direct a cooling gas across the liquid molten pool, or to impinge on the liquid molten pool, or to impinge upon a solidified material adjacent to a liquid-solid boundary of the liquid molten pool, or any combination thereof; a supply of the cooling gas; a system for positioning and moving the base material relative to the melting tool and the gas jet device; and a controller able to read a design model, such as a computer assisted design (CAD) model, of the metallic workpiece to be formed, and employing the design model to regulate the position and movement of the system for positioning and moving the base material and to operate the melting tool and gas jet device such that the workpiece is built by fusing the metallic material onto the base material to form successive deposits of the metallic material to form the workpiece.

A single melting tool can be used, or two melting tools can be used. For example, a first pre-heating torch producing a single pre-heating electric arc plasma and a second torch producing a double electric arc plasma. The two torches can be used simultaneously in a tandem configuration. The pre-heating arc can deliver thermal energy to a portion of the surface of the base material, e.g., at the position at which the metallic DED material is to be deposited, for surface heating of the substrate, or preconditioning. In addition, the double electric arc plasma can be powered by separate power supplies. The double electric arc plasma can be used to resistive heat and melt a metal onto the surface heated area of the base material. The double electric plasma arcs can ensure adequate fusion between the base material of workpiece and the molten metal produced by the action of the electric arc plasma arc on a metal, such as a metal wire feedstock. For example, the second melting tool can be a torch producing a double electric arc plasma whereby one of the arcs burns between the tungsten electrode of the torch and the workpiece (PTA), and the other arc burns between the tungsten electrode of the torch and the wire feedstock (main arc), both using straight polarity. The PTA electric arc plasma can deepen the fusion characteristics of the molten metal into the preheated surface of the base material, which can be controlled independently from the main electric arc plasma. The main electric arc plasma can be established between the torch and a current-carrying wire feedstock. The wire feedstock can be melted by the heat generated by the column of the PTA electric arc plasma which is transferred to the workpiece, and the heat generated by the main electric arc plasma circuit. The wire feedstock can produce molten metal that can be deposited on the workpiece. The superheat from the droplets of molten metal can maintain a melt pool in the vicinity of the surface heated area of the base material. The surface heating of the base material can lead to enhanced fusion, improved wetting and spreading characteristics of the liquid pool, and thus yield better overall DED characteristics. Regarding the deposition profile, by surface heating the substrate, it can be possible to obtain a shallower and wider deposition profile. The improved weld bead characteristics can result in a profile with a beneficial weld bead contact angle towards the base material, which can promote adequate fusion to the base material and adjacent weld beads. Improved weld bead and fusion characteristics can yield a manufactured product with improved mechanical integrity.

Each melting tool can be separately controlled, and thus be modulated individually to produce separate fields of temperature and pressure. An advantage of this arrangement can be that the amount of thermal energy applied to the metallic feedstock to be melted onto the surface heated area of the base material can be greater than that applied to the surface of the base material, avoiding over-heating of the base material.

The DED manufacturing system provided herein can include a PTA torch, a laser device, an electron beam device, or any combination thereof as a melting tool. In some configurations, a first PTA torch electrically connected to the base material surface heats a target deposition area on the base material to form a surface heated area, and a second PTA torch electrically connected to the consumable electrode can heat and melt a consumable electrode, which can result in drops of molten metal that can fall onto the surface heated area of the target deposition area. In some configurations, a PTA torch can surface heat a target deposition area on the base material to form a surface heated area, and a laser device can heat and melt a metal wire or metal powder, which can result in formation of molten metal that can be deposited onto the surface heated area of the target deposition area. In some configurations, a PTA torch can heat a target deposition area on the base material to form a surface heated area, and an electron beam device can heat and melt a metal wire, which can result in drops of molten metal that can fall onto the surface heated area of the target deposition area.

In some configurations, a laser device can spot heat a target deposition area on the base material to form a spot heated area, and a PTA torch electrically connected to the consumable electrode can heat and melt the consumable electrode, which can result in drops of molten metal that can fall into the spot heated area of the target deposition area. In some configurations, a first laser device can spot heat a target deposition area on the base material to form a spot heated area, and a second laser device can heat and melt a metal wire or metal powder, which can result in formation of molten metal that can be deposited onto the spot heated area of the target deposition area. In some configurations, a laser device can spot heat a target deposition area on the base material to form a spot heated area, and an electron beam device can heat and melt a metal wire, which can result in drops of molten metal that can fall onto the spot heated area of the target deposition area.

In some configurations, an electron beam device can spot heat a target deposition area on the base material to form a spot heated area, and a PTA torch electrically connected to a consumable electrode can heat and melt the consumable electrode, which can result in drops of molten metal that can fall onto the spot heated area of the target deposition area. In some configurations, an electron beam device can spot heat a target deposition area on the base material to form a preheated area, and a laser device can heat and melt a metal wire or metal powder, which can result in drops of molten metal that can fall onto the spot heated area of the target deposition area. In some configurations, a first electron beam device can spot heat a target deposition area on the base material to form a spot heated area, and a second electron beam device can heat and melt a metal wire or powder, which can result in drops of molten metal that can fall onto the spot heated area of the target deposition area.

In some configurations, the DED manufacturing system can include a laser device or a PTA torch that can be arranged to direct energy (e.g., laser energy or a plasma transferred arc, respectively) to a target area of the base material to form a surface heated area, and a PTA torch or a laser device can be arranged to direct energy onto an end of a consumable electrode or metal wire positioned above the surface heated area of the base material. The energy can melt the end of the consumable electrode or metal wire, forming droplets of molten metal that can drop onto the surface heated area of the base material beneath the end of the consumable electrode or metal wire. The melting tool that directs energy to a target deposition area can promote fusion between the base material and the molten metal material being deposited thereon by deepening the melt-in of the droplets of molten metal into the base material. The melting tool used to melt the consumable electrode or metal wire also can contribute thermal energy in the vicinity of the spot heated area of the target deposition area, contributing to the thermal energy provided by the melting tool directed to the base material. The superheat from the droplets of molten metal can help maintain a melt pool in the vicinity of the spot heated area of the base material.

The consumable electrode or metal wire can be or contain Al, Cr, Cu, Fe, Hf, Sn, Mn, Mo, Ni, Nb, Si, Ta, Ti, V, W, or Zr, or composites or alloys thereof. In some embodiments, the consumable electrode can be a wire that contains Ti or a Ti alloy. The consumable electrode or metal wire can be or contain a titanium alloy containing Ti in combination with one or a combination of Al, V, Sn, Zr, Mo, Nb, Cr, W, Si, and Mn. For example, exemplary titanium alloys include Ti-6Al-4V, Ti-6Al-6V-2Sn, Ti-6Al-2Sn-4Zr-6Mo, Ti-45Al-2Nb-2Cr, Ti-47Al-2Nb-2Cr, Ti-47Al-2W-0.5Si, Ti-47Al-2Nb-1Mn-0.5W-0.5Mo-0.2Si, and Ti-48Al-2Nb-0.7Cr-0.3Si. The consumable electrode or metal wire can contain aluminium, iron, cobalt, copper, nickel, carbon, titanium, tantalum, tungsten, niobium, gold, silver, palladium, platinum, zirconium, alloys thereof, and combinations thereof. The consumable electrode can include a solid wire electrode, a cored wire electrode or a strip electrode.

A typical cross section of the consumable electrode or metal wire is a circular cross section. The diameter of the consumable electrode or metal wire can be up to about 10 mm, and can be in the range of from about 0.8 mm to about 5 mm. The consumable electrode or metal wire can have any practically implementable cross-sectional dimension, e.g., 1.0 mm, 1.6 mm, and 2.4 mm, or from about 0.5 to about 3 mm. The feed rate and positioning of the consumable electrode or metal wire can be controlled and regulated in accord with the effect of the power supply to the PTA torch, laser device, electron beam device, or any combination thereof, in order to ensure that the consumable electrode or metal wire is being continuously heated and is melted when it reaches the intended position above the preheated area of the base material.

The laser device can generate a laser beam of sufficient energy to transfer thermal energy to the base material to pre-heat a surface area of the base material, or to melt a metal wire. The preheating of the base material via energy from the laser beam can promote fusion between the base material and the melted metallic material by deepening the melting characteristics in the base material. In some embodiments, at least a portion of the base material can be melted by the energy from the laser beam of the laser device. In some embodiments, sufficient heat can be applied by the laser beam of the laser device to form a molten pool in the base material at the position at which the metallic material produced by the PTA torch, or another laser device, or an electron beam device, is to be deposited.

Examples of suitable laser devices include a ytterbium (Yb) laser, a Yb fiber laser, a Yb fiber coupled diode laser, a Yb:glass laser, a diode-pumped Yb:YAG laser, a neodymium-doped yttrium aluminium garnet (Nd:YAG) laser, a $CO_2$ laser, a CO laser, a Nd:glass laser, a neodymium-doped yttrium orthovanadate (Nd:YVO) laser, a Cr:ruby laser, a diode laser, a diode pumped laser, an excimer laser, a gas laser, a semiconductor laser, a solid-state laser, a dye laser, an X-ray laser, a free-electron laser, an ion laser, a gas mixture laser, a chemical laser, and combinations thereof. Preferred lasers include Yb lasers, particularly Yb fiber lasers. In many applications, the wavelength used in a Yb fiber laser can be less reflective compared to other laser wavelengths.

The PTA torch can be of any configuration capable of creating an electric arc plasma to resistively heat and melt the consumable electrode, or to heat a target area on the surface of the base material, such as gas metal arc welding (GMAW), particularly using non-reactive gases to establish the arc (metal inert gas welding or MIG-welding). The consumable electrode can be made to melt in the plasma produced by the PTA torch using an electric arc, and the melting consumable electrode can be deposited into the molten pool on the work piece to add to and to form the near net shape metal bodies. The preheating of the base material via energy from the PTA torch can promote fusion between the base material and the melted metallic material by deepening the melting characteristics in the base material. In some embodiments, at least a portion of the base material can be melted by the energy from the plasma of the PTA torch. In some embodiments, sufficient heat can be applied by the plasma of the PTA torch to form a molten pool in the base material at the position at which the metallic material melted by a different PTA torch or laser device is to be deposited.

The combination of the thermal pre-bending of the substrate by inducing melting tracks, use of the mount system 100, and pre-heating of the substrate prior to formation of the workpiece using a DED process allows the formation of a near-net-shape metal workpiece that significantly alleviates the problems related to internal residual stresses and deformations evident in many traditional additive manufactured products. This can result in improved manufacturing repeatability, increased dimensional accuracy, and a manufactured workpiece that demonstrates increased strength, fatigue resistance, and durability.

E. EXAMPLES

The following examples are included for illustrative purposes only and are not intended to limit the scope of the embodiments provided herein.

Example 1

A first base plate substrate having dimensions (L×W×T) of 635 mm×190 mm×9.5 mm and made of Ti-6Al-4V was used as a first test substrate to determine deflection without residual stress mitigation. The substrate was clamped to a jig or welding table and a workpiece was produced on the workpiece using a first PTA torch to pre-heat the base material, and a second PTA torch to melt a Ti-6Al-4V wire to form molten metal that was deposited onto the pre-heated base material. The speed of deposition was between 7.5 and 10 mm/s and inert gas was used to direct a cooling gas at high flow rate to impinge upon the as-solidified material adjacent to a liquid-solid boundary of the liquid molten pool. After the deposition was complete, the component was cooled and removed from the jig, and the substrate was examined for deformations.

Figure 13A:
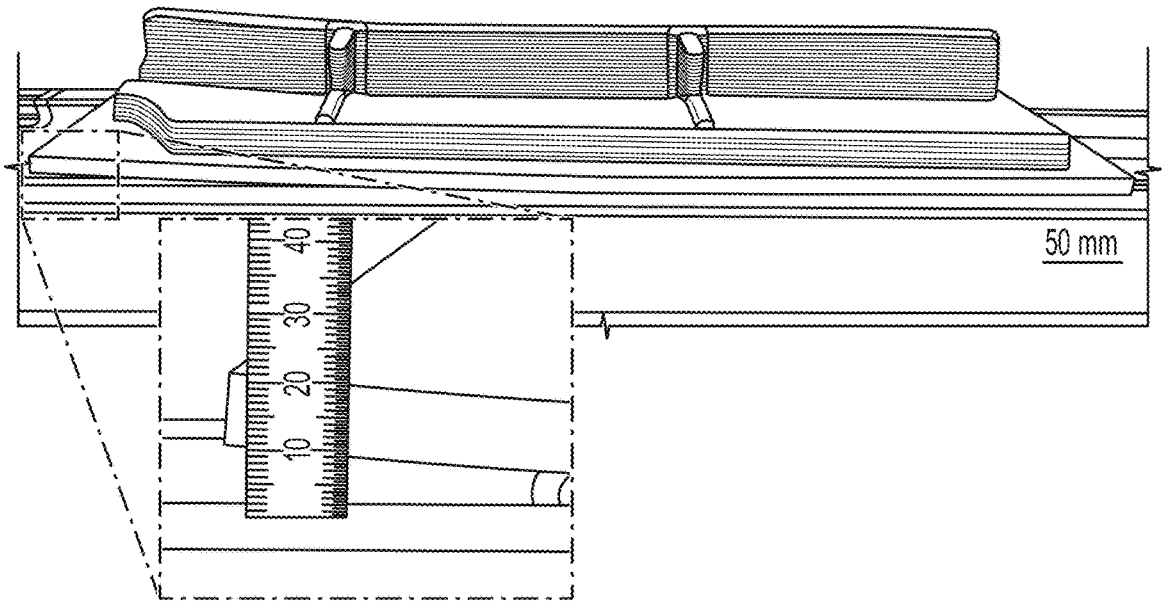
FIG. 13A shows the deformation caused by DED deposition forming a workpiece on a first substrate having a thickness of 9.5 mm not subjected to any type of stress mitigation. Distortion was apparent at the short edges of the substrate, which bowed upward compared to the flatness profile of the substrate prior to deposition.

Distortion was apparent at the short edges of the substrate, which bowed upward compared to the flatness profile of the substrate prior to deposition. The deformations observed are shown in FIG. 13A.

Figure 13B:
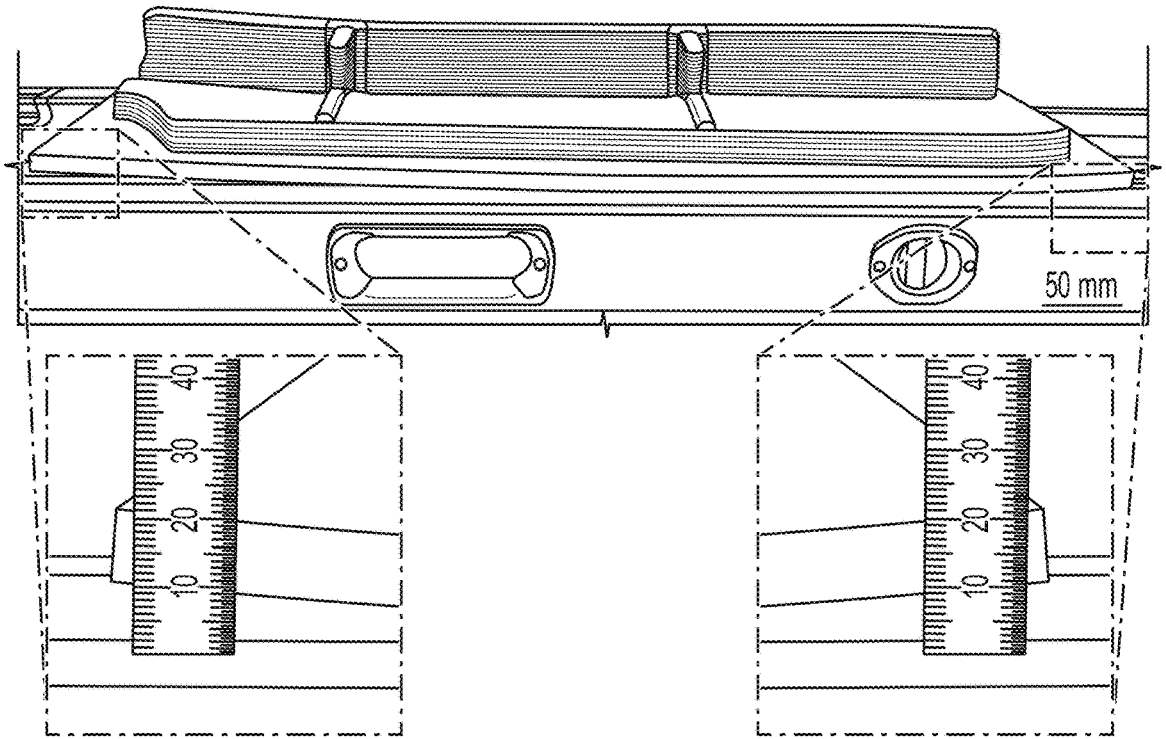
FIG. 13B shows the deformation caused by DED deposition on a second substrate with a thickness of 12.7 mm not subjected to any type of stress mitigation.

A second base plate substrate having dimensions (L×W×T) of 635 mm×190 mm×12.7 mm and made of Ti-6Al-4V was used as a second test substrate. The same workpiece was fabricated using the same conditions as described above. FIG. 13B shows the deformation caused by DED deposition on a substrate having a thickness of 12.7 mm not subjected to any type of residual stress mitigation, exhibiting upward bowing at the short edges of the substrate, the left edge bowing upward by about 7 mm and the right edge bowing upward by about 6.0 mm compared to the flatness profile of the substrate prior to deposition.

Figure 13C:
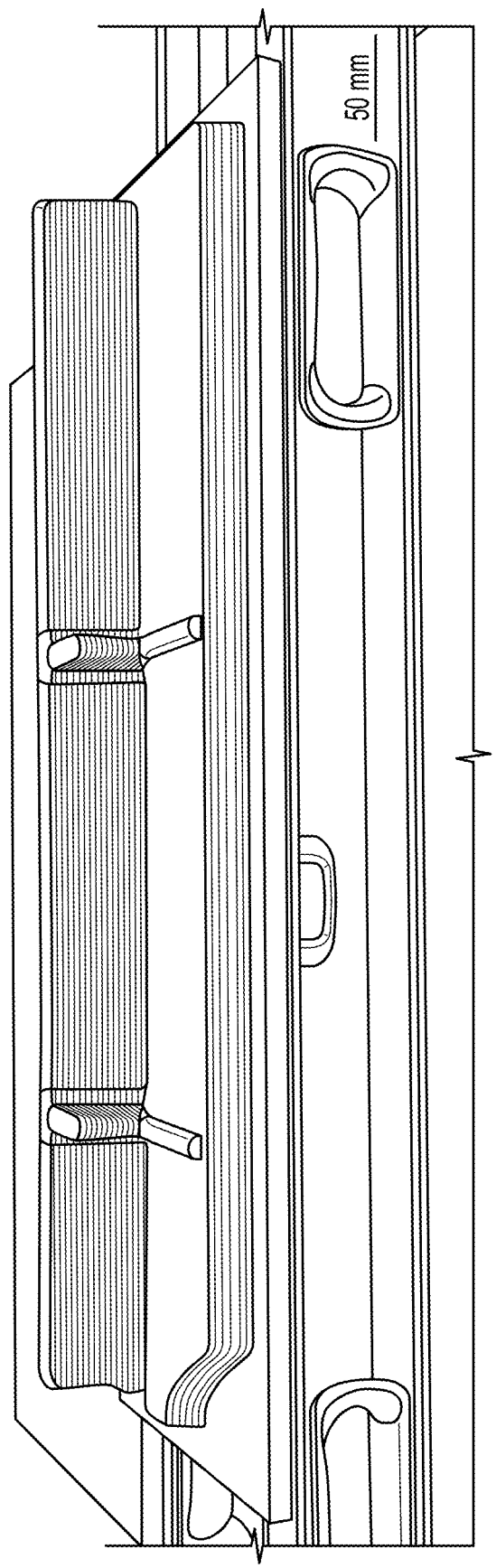
FIG. 13C shows a third substrate with a thickness of 9.5 mm that was used for formation of an object by being subjected to thermal pre-bending, pre-heating and DED processing.

FIG. 13C shows a third base plate substrate having dimensions (L×W×T) of 635 mm×190 mm×9.5 mm and made of Ti-6Al-4V that was used for formation of an object by being subjected to thermal pre-bending, preheating and DED processing as described herein. The substrate was firmly clamped to the jig using insulated clamps around the full lengths of the long edges of the substrate, but no clamps were used as the short edges of the substrate. Four layers of alumina insulation plates, each having a thickness of about 3.2 mm (RS-1200 Keranova) having the same dimensions as the substrate was used between the substrate and the jig to thermally isolate the substrate from the jig.

A PTA torch was used to provided thermal energy to the first side of the substrate to create melting tracks in the substrate. The final aggregated residual stress distribution, determined by the combination of the DED and melting tracks, has lower tensile peak at the centerline of the DED, and lower balancing compressive stresses away from the centerline of the DED, when compared to the original residual stress profile of the DED, without pre-bending melting tracks (i.e. high tensile peak at the DED centerline and balancing compressive stresses further away. The pattern used for creating the melting tracks is shown in FIGS. 7C and 7D. As illustrated in the figure, the PTA torch acting as the DED thermal source was positioned at one edge of the substrate. The spacing between the melting tracks can be predicated on the shape of the workpiece to be produced. For example, the melting tracks can be formed in areas that are not in an area under a wall of the workpiece to be formed in order to minimize the final aggregated residual stress distribution in the workpiece. For example, a majority of the melting lines on the first surface can be formed at one or more locations other than those corresponding to one or more areas occupied by of one or more walls of the workpiece to be formed on the second side of the substrate. In order to induce the largest thermal stresses in the substrate, high energy density (e.g., an arc energy delivered at about 450 J/mm to about 550 J/mm) was applied at a speed of between 6 and 16 mm/s to rapidly melt a portion of the surface of the substrate to create autogenous weld lines, which were rapidly cooled using a gas jet device to direct a cooling gas at a temperature of 25° C. at high flow rate toward the weld line, thereby forming melting tracks that have a high tensile stress near the centerline of the melting track, and high compressive stresses at a distance away from the centerline. In exemplary embodiments, for a substrate thickness of 9.5-10 mm, a single heat source with a current of from about 150 A to about 250 A, a voltage of about 20V to about 30V, and a traverse speed of from 6 mm/s to 16 mm/s, was used to produce melt tracks that were approximately 3 mm wide and up to 1 mm deep.

When released from the jig, the pre-bent substrate bowed upward, exhibiting a deflection of about 15 mm, similar to that shown in FIG. 8A. This pre-bent substrate was then attached to a jig using a curved clamping mold as described as an underlying support and insulated clamps to attach the pre-bent substrate to the jig. The pre-bent substrate was positioned so that the side with the melting tracks was toward the curved clamping mold. Pre-heating of the pre-bent substrate was accomplished using two PTA torches delivering a lower energy density to the pre-bent substrate surface by positioning the PTA torches at a higher standoff distance to reduce the risk of producing local melting tracks, which could cause fusion issues at the baseplate interface during DED metal deposition. For example, pre-heating was performed with two PTA torches using a range between 150-250 A and with arc voltages between 20-30V. The traverse speed was between 6-12 mm/s. For example, an arc energy delivered by the first PTA torch could be 460 J/mm and an arc energy delivered by the second PTA torch could be 430 J/mm. Another important aspect is the fact that pre-bending tracks were performed with higher plasma gas flow compared to that used in pre-heating. Higher plasma gas flows produce stiffer electric arcs, thus with higher energy densities. With regards to standoff distance, a 25% to 50% higher standoff distance, or 30% to 40% higher standoff distance during pre-heating compared to that used in pre-bending can be used. No cooling gas was used during the pre-heating process.

After the temperature of the substrate reached between 450° C. and 550° C., DED deposition of metal to form the object was performed within a closed chamber containing an argon inert atmosphere. The DED process used two PTA torches. The first PTA torch directed thermal energy to a target area of the base material to form a preheated area, and the second PTA torch directed thermal energy onto (1) an end of a consumable electrode or metal wire positioned above the preheated area of the base material, and (2) towards the preheated area. The energy from the second PTA torch melted the end of the consumable electrode or metal wire, forming droplets of molten metal that dropped onto the preheated area of the base material beneath the end of the consumable electrode or metal wire. The process included use of the gas jet device to direct a cooling gas at a temperature of 25° C. at high flow rate toward the as-solidified material adjacent to the liquid-solid boundary of the molten metal. The deposition continued until the workpiece was completed. The workpiece was allowed to cool down within the deposition chamber to a temperature below 400° C. or less. The workpiece then was removed from the deposition chamber, and the pre-bent substrate then was removed from the jig. Depending on how fast the operators remove the workpiece, the pre-bent substrate can be removed from the jig at a temperature between 200-300° C., or lower. In this instance, the pre-bent substrate was removed from the jig at a temperature of about 250° C.

As shown in FIG. 13C, the workpiece exhibited a small (only about 0.5 mm) movement upwards at the short edges of the substrate, indicating that a significant amount of residual stress that was observed in the test substrate when conventional DED processes were used was eliminated using the curved clamping mold in combination with pre-bending and pre-heating.

Repeatability was tested by using similar substrates and the same workpiece design, under the same conditions described above. The method exhibited consistent reproducible results across all three workpieces produced. The deviation in substrate deformation between workpiece #1 and workpiece #2 was about 0.5 mm, while the deviation in substrate deformation between workpiece #2 and workpiece #3 was about 0.1 mm.

Stress relief heat treatment did not have a significant impact on overall dimensions of the workpiece. For example, after stress relief only a small movement upward occurred by approximately 0.5 mm at the shorter edges of the plate. This means the residual stress in the workpiece in the as-deposited condition is very low as a result of the described stress mitigation.

Example 2

Figure 15:
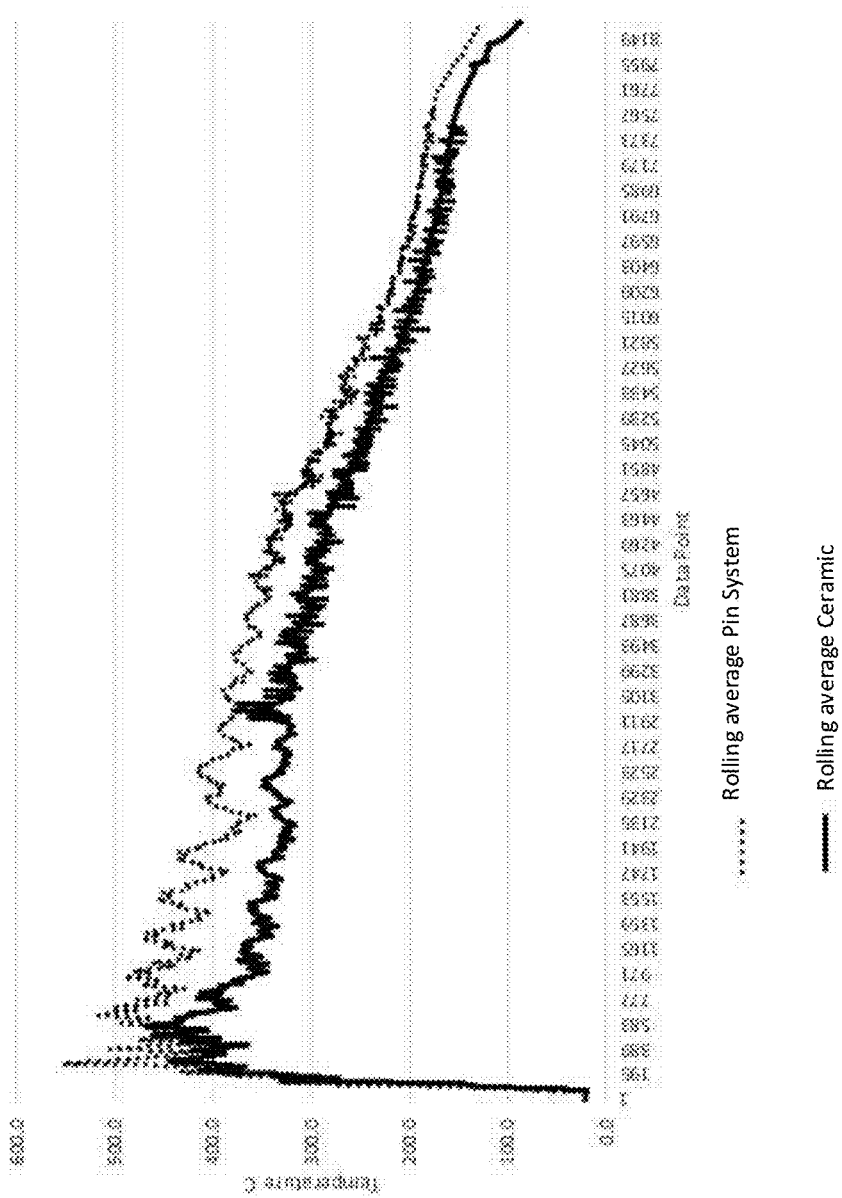
FIG. 15 illustrate comparative data of heat retained by a substrate during a DED manufacturing process when using conventional ceramic pylons versus a mount system implemented as a pin support system as described herein.

A comparative experiment was made to contrast a temperature gradient of a substrate undergoing DED manufacturing when using a ceramic sheet support as known in the art versus a pin support system as described herein. The same DED manufacturing process was performed on two equal titanium substrates. In a first instance, during the DED process as described herein, the substrate was clamped onto a set of pins. While in a second instance, during the DED process as described herein, the substrate was clamped onto a set of ceramic pylons. The overall thickness of the ceramic pylons was greater than the substrate support height of the pins. Thermocouples were used to measure the heat transfer and the heat of the various components. The data was gathered and plotted over different locations of the substrates being processed. The results are shown in FIG. 15. As illustrated, the rolling average temperature of the substrate during DED process while clamped to a set of pins remained higher throughout the DED process than when the substrate was clamped to a set of ceramic pylons. This indicates a reduced heat loss from the substrate may be obtained by using a pin support system as described here as a supporting structure when compared to the known ceramic pylon supports.

Example 3

Figure 16A:
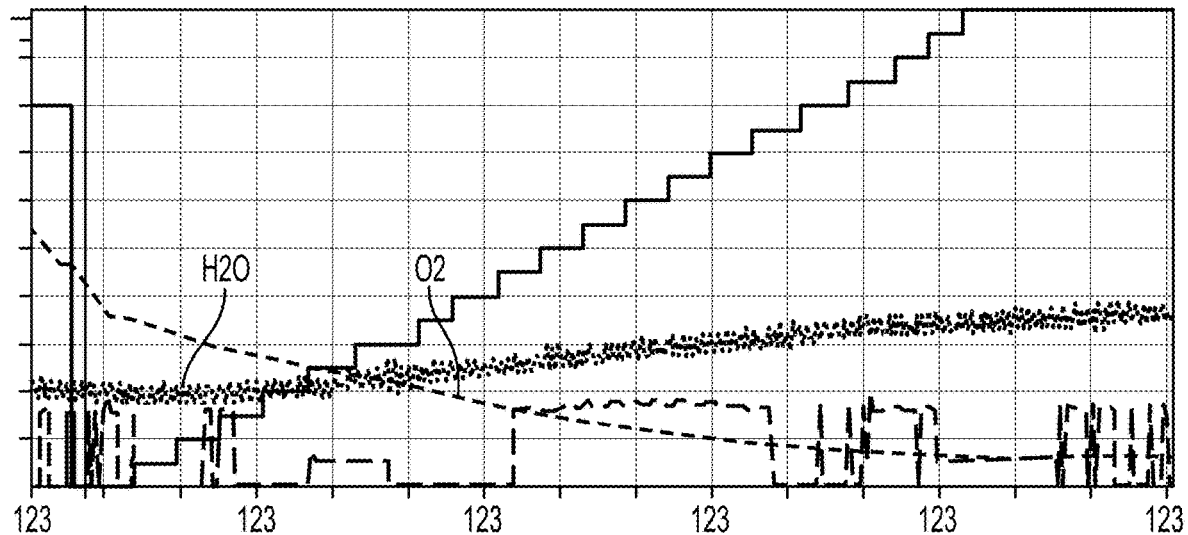
FIGS. 16A-16B illustrate comparative data illustrated a decrease amount of moisture in a DED atmosphere that may be achieved by the elimination of ceramic in place of a mount system implemented as a pin support system as described herein.
Figure 16B:
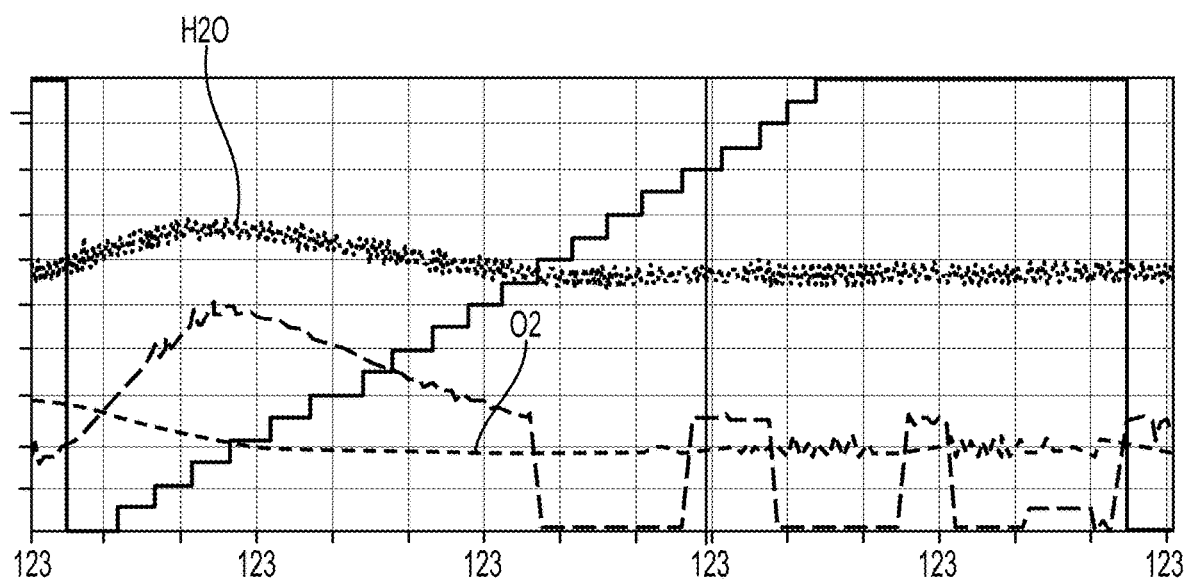

A comparative experiment was also made to demonstrate the reduced amount of moisture achieved during a DED process when using a support system that does not include a ceramic sheet, plate, or pylon, such as a pin support system as described herein, versus a support formed of ceramic pylons. In examples, a DED process was run as in Example 2 on two equal substrates. During first run of the experiment, a substrate was clamped onto a pin support system as described herein that did not include any ceramic sheets, plates, or pylons. During a second run of the experiment, a substrate was clamped to a ceramic pylon support. The water and oxygen contents in the atmosphere were monitored and those measurements are reflected in FIG. 16A for the case in which the substrate was supported by a ceramic free pin support system and FIG. 16B for the case in which the substrate was supported by ceramic pylons. The measured data illustrates that the amount of moisture in the DED atmosphere is much lower throughout the process when using a pin support system as described herein without any ceramic sheets, plates, or pylons versus when using a ceramic pylon support.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

REFERENCE SIGNS LIST

The following is a listing of the reference numerals used in the description and the accompanying Drawings.

| | |
|---|---|
| 100 | Substrate Mount System |
| 101 | Mount System element |
| 102 | Mount System Curved Profile |
| 103 | Knurl |
| 104 | Peripheral rim portion |
| 105 | Knurl spacing |
| 106 | Mount system substrate interface area |
| 107 | Bond coat |
| 108 | Ceramic coating |
| 110 | Pin Support System |
| 112 | Pin |
| 114 | Pins with uniform width |
| 115 | Pins with non-uniform width |
| 116 | Pins with combined shapes |
| 118 | Pin head portion |
| 119 | Pin substrate contact surface |
| 120 | Pin head flat region |
| 122 | Collar portion of pin |
| 124 | Pin base or engagement portion |
| 126 | Welding jig fittings for pin structures |
| 128 | Pin spacer |
| 130 | Substrate interface area of pin support system |
| 150 | Lattice Support System |
| 151 | Lattice element |
| 152 | Curved surface of Lattice Support System |
| 153 | Flat surface of Lattice Support System |
| 154 | Peripheral area of Lattice Support System |
| 155 | Substrate surface interface of Lattice Support System |
| 156 | Lattice element substrate contact surface |
| 158 | Lattice cavity |
| 170 | Curved clamping mold |
| 172 | Knurled or corrugated surface |
| 174 | Top surface/Substrate interface area |
| 176 | Mold Edge |
| 178 | Knurl |
| 180 | Knurl spacing |
| 182 | Flat rim |
| 184 | Ceramic coating |
| 186 | Bond coat |
| 188 | Cavity |
| 190 | Cavity |
| 192 | Cavity |
| 194 | Cavity |
| 196 | Stiffening member |
| 198 | Maximum height |
| 200 | Gas jet device |
| 210 | Nozzles |
| 230 | Support |
| 250 | PTA torch |
| 300 | Substrate |
| 310 | First side |
| 320 | Second side |
| 330 | DED backwall of preform |
| 350 | Melting track |
| 355 | Space between melting tracks |
| 370 | First pre-bending heating path |
| 371 | Second pre-bending heating path transfer distribution |
| 372 | Third pre-bending heating path |
| 373 | Fourth pre-bending heating path |
| 374 | Fifth pre-bending heating path |
| 375 | Sixth pre-bending heating path |
| 380 | Preform wall |
| 382 | Preform wall |
| 384 | Preform wall |
| 400 | Jig |
| 410 | Nominal substrate deflection |
| 500 | Clamp |
| 501 | Threaded hole |
| 502 | Hole |
| 505 | Bottom contact facet |
| 506 | Side contact facet |
| 540 | Alumina insulation plate |
| 541 | Alumina insulation plate |
| 507 | Top surface of clamp |
| 509 | Ceramic-coated surfaces |
| 510 | Countersunk screw |
| 515 | Tip of countersunk screw |
| 520 | Bolt |
| 525 | Nut |
| 530 | Top surface of jig |
| 542 | Alumina insulation plate |
| 543 | Alumina insulation plate |
| 544 | Area of non-uniform pressure and heat transfer distribution |
| 545 | Area of non-uniform pressure and heat |
| 546 | Area of non-uniform pressure and heat transfer distribution |
| 547 | Area of non-uniform pressure and heat transfer distribution |
| 548 | Area of non-uniform pressure and heat transfer distribution |
| 549 | Area of non-uniform pressure and heat transfer distribution |
| 550 | Baseplate |
| 575 | Box showing areas of uniform pressure and heat transfer distribution |
| 576 | Box showing areas of uniform pressure and heat transfer distribution |
| 577 | Box showing areas of uniform pressure and heat transfer distribution |
| 578 | Box showing areas of uniform pressure and heat transfer distribution |
| 600 | Preform |
| 600' | Preform |
| 610 | Clamping entity |
| 615 | Clamping entity |
| 620 | Clamping entity |
| 625 | Clamping entity |
| 630 | Clamping entity |
| 650 | Non-optimal clamping area |
| 700 | First pre-heating heating path |
| 705 | Second pre-heating heating path |
| 710 | Third pre-heating heating path |
| 715 | Fourth pre-heating heating path |
| 720 | Fifth pre-heating heating path |
| 725 | Sixth pre-heating heating path |
| 730 | Seventh pre-heating heating path |
| 735 | Eighth pre-heating heating path |

The invention claimed is:

1. A system for directed energy deposition, comprising:
a welding jig for securing a pre-bent substrate;
a pin support system configured to be positioned between the welding jig and the pre-bent substrate;
clamps securing the pre-bent substrate to the welding jig;
one or more melting tools comprising a DED thermal source to melt a source of metal into metallic molten material that is deposited on a surface of a base material;
a gas jet device to direct a cooling gas to impinge upon the as-solidified material adjacent to a liquid-solid boundary of the liquid molten pool to influence temperature gradients;
a supply of the cooling gas; and
an actuator for positioning and moving the base material relative to the melting tool and the gas jet device,
wherein the pin support system comprises one or more pins arranged on the welding jig defining a curved profile configured to interface with
a surface of the pre-bent substrate.

2. The pin support system of claim 1, wherein: at least one of the one or more pins comprises:
a pin head portion comprising a substrate contact area;
a collar portion; and
a base portion configured to engage the welding jig.

3. The pin support system of claim 2, wherein the pin head portion further comprises a flat portion on at least a portion of a lateral profile.

4. The pin support system of claim 2: wherein the pin head portion further comprises a welding jig interface area.

5. A directed energy deposition method for producing a metal workpiece,
comprising:
bending a substrate of a metal material with thermal energy by forming a plurality of melting tracks on a first surface of the substrate using a melting tool to produce a pre-bent substrate;
securing the pre-bent substrate to a pin support system coupled to a jig such that a first surface of the pre-bent substrate contacts the pin support system, the pin support system comprising one or more pins arranged on the welding jig and defining a curved profile; and
forming the metal workpiece on a second surface of the substrate by an additive manufacturing process that comprises melting a metal feedstock to deposit a layer of molten metal on the second surface of the substrate to form a base material and deposits subsequent layers of molten metal on the base material to form the workpiece, the first surface of the substrate being opposite the second surface of the substrate.

6. The method of claim 5, further comprising:
applying, with the pre-bent substrate secured to the pin support system and prior to forming the metal workpiece, thermal energy to the second side of the substrate to heat the pre-bent substrate to a temperature of about 400° C. to about 900° C.

7. The method of claim 5, wherein the bending the substrate comprises inducing thermal gradients in the substrate.

8. The method of claim 5, wherein the melting tool comprises a thermal source selected from among a laser beam, an electron beam, a plasma arc, a gas tungsten arc, a gas metal arc and any combination thereof.

9. The method of claim 5, wherein the bending the substrate comprises heating an area of application of thermal energy on the first surface with the melting tool to a temperature that is a melting point of the substrate, or a temperature from about 5° C. to about 50° C. less than or greater than the melting point of the metal material.

10. The method of claim 5, wherein formation of the melting tracks results in formation of tensile stress at a centerline of each of the melting tracks and formation of a compressive stress in an area away from the centerline of each of melting tracks upon cooling of the substrate.

11. The method of claim 10, wherein the tensile stress at the centerline is within about 10% of a yield strength of the substrate and/or exceeds the magnitude of the yield strength of the substrate.

12. The method of claim 5, wherein the bending the substrate comprises directing a cooling gas toward the melting tracks using a gas jet device to accelerate cooling of the melting tracks.

13. The method of claim 12, wherein directing the cooling gas toward the melting tracks forms a thermal gradient in the substrate, and imparts a residual stress in the substrate upon cooling.

14. The method of claim 13, wherein the cooling gas comprises an inert gas selected from among argon, helium, neon, xenon, krypton and combinations thereof.

15. The method of claim 13, wherein:
the gas jet device comprises a plurality of nozzles directing the cooling gas in a direction away from the thermal source of the melting tool, and at least one nozzle of the plurality of nozzles directing the cooling gas to an as-solidified metal of the melting track.

16. The method of claim 5, further comprising:
determining a centerline of each wall of a preform that is to be formed on the second surface of the substrate; and
positioning the melting tracks on the first surface of the substrate from about 10 mm to about 20 mm away from the centerlines of the majority of walls of the preform to be formed on the second surface of the substrate.

17. The method of claim 5, further comprising forming a majority of the melting lines on the first surface at one or more locations other than those corresponding to one or more areas occupied by of one or more walls of the workpiece to be formed on the second side of the substrate.

18. The method of claim 5, further comprising pre-bending of the substrate while the substrate is clamped to a jig and thermally insulated from the jig.

19. The method of any one of claim 5, further comprising:
positioning the melting tool at a standoff position greater than a standoff position used for forming the workpiece; and
pre-heating the second side of the pre-bent substrate using a DED thermal source as the melting tool under conditions that:
a) form melting tracks but do not melt the surface of the pre-bent substrate; or
b) form melting tracks and melt the surface of the pre-bent substrate at the melting tracks.

20. The method of claim 5, wherein the forming of the metal workpiece comprises:
a) providing the metal feedstock in the form of a wire;
b) using a first melting tool to heat at least a portion of a surface of the substrate to form a preheated area on the substrate;
c) using a second melting tool to heat and melt the wire such that molten metallic material is deposited onto the preheated area to form a base material;
d) moving the base material relative to a position of the first melting tool and second melting tool in a predetermined pattern;
e) using the first melting tool to heat at least a portion of a surface of the
base material to form a preheated area on the base material and depositing molten metallic material produced by the second melting tool melting the metallic material onto the preheated area on the base material; and
f) repeating steps d) and e) such that the successive deposits of molten metallic material onto the preheated areas on the base material solidifies and forms the three-dimensional object.

* * * * *